US007555448B2

(12) United States Patent
Hsieh

(10) Patent No.: US 7,555,448 B2
(45) Date of Patent: Jun. 30, 2009

(54) ONLINE INTELLIGENT INFORMATION COMPARISON AGENT OF MULTILINGUAL ELECTRONIC DATA SOURCES OVER INTER-CONNECTED COMPUTER NETWORKS

(76) Inventor: Victor Hsieh, 1214 S. 9th St., Alhambra, CA (US) 91801

( * ) Notice: Subject to any disclaimer, the term of this patent is extended or adjusted under 35 U.S.C. 154(b) by 525 days.

(21) Appl. No.: 09/967,233

(22) Filed: Sep. 27, 2001

(65) Prior Publication Data

US 2003/0167209 A1     Sep. 4, 2003

Related U.S. Application Data

(60) Provisional application No. 60/236,574, filed on Sep. 29, 2000, provisional application No. 60/299,360, filed on Jun. 19, 2001.

(51) Int. Cl.
*G06Q 40/00* (2006.01)
(52) U.S. Cl. .............................. 705/35; 705/38; 707/3; 707/10
(58) Field of Classification Search ............. 705/35–45; 707/3–5, 7, 10
See application file for complete search history.

(56) References Cited

U.S. PATENT DOCUMENTS 6,006,260 A    12/1999  Barrick, Jr. et al. ......... 709/224
6,789,073 B1 *  9/2004  Lunenfeld ..................... 707/3

FOREIGN PATENT DOCUMENTS

EP      1 024 448 A2    8/2000
WO   WO 98 32289 A      7/1998

OTHER PUBLICATIONS

Gralla, Preston, How The Internet Works, 1999, Que, Millennuium Edition, p. 167.*
Gralla, Preston, "How the Internet Works", 1999, Macmilan Computer Publishing, Millennium Edition, pp. 184-189.*
AltaVista—"translation service" from Wayback machine from Apr. 8, 2000 4 pages attached.*

(Continued)

*Primary Examiner*—Mary Cheung
*Assistant Examiner*—Kirsten S Apple
(74) *Attorney, Agent, or Firm*—DLA Piper LLP (US)

(57) ABSTRACT

A method and system for real-time online search processing over inter-connected computer networks, in which an offline database information is maintained for a plurality of vendor sites from the inter-connected computer networks. The information includes URLs, search form URLs, description of domains, and vendor descriptions, and while the vendor descriptions comprise generalized rules about how product information is organized on each of the vendor sites. Parameters are processed for a price comparison request for a desired product using the information maintained in the offline database whereas price comparison request is received from an online user or buyer and/or from the system of the present invention. Real-time price and product information is then extracted from identified ones of the plurality of vendor sites, wherein the extracted price and product information are in a native language of the site; and the extracted price and product information are displayed to the user.

28 Claims, 36 Drawing Sheets

OTHER PUBLICATIONS

BizRate.com—from Wayback machine from Oct. 19, 2000 4 pages attached.*

International Search Report dated Mar. 6, 2003.

PriceGrabber: "PriceGrabber and Tom's Hardware Guide team up for comparison shopping," Business Wire, Aug. 14, 2001, Proquest 77407123, 3 pgs.

PriceGrabber: www.pricegrabber.com; Internet Archive Wayback Machine, www.archive.org; Jul. 10, 2001, 2 pgs.

PriceGrabber: "PriceGrabber.com distributes comparison shopping links on major portals using LookSmart subsite listings," PR Newswire, May 9, 2001, Proquest #72647065, 3 pgs.

Randall, Neil, "Informing-syndicated content freshens up a site and keeps visitors informed at the same time," *PC Magazine*, Feb. 20, 2001, Dialog file 47 #05994192, 3 pgs.

PriceGrabber: Meislin, Richard, "Basics: a personal shopper for online bargains," New York Times, Nov. 29, 2001, Dialog file 471 #04174696, 4 pgs.

Koh, Cindy, "XML for e-business," *Computimes Malaysia*, Jun. 7, 2001, Proquest #73750748, 3 pgs.

Business Wire, "Deal Time to bring wireless comparison shopping to Nextel online subscribers," Aug. 8, 2000, Proquest #57648348, 3 pgs.

Floyd, Michael, "Coming to terms with extensible markup," *Web Techniques*, May 2001, v6i5pg66, Proquest #70517800, 5 pgs.

PRN: "CNET Networks and Edmunds.com ally to transform the delivery of automotive information," *PR Newswire*, Sep. 28, 2000, Proquest #61200354, 3 pgs.

PR Newswire, "CNET Networks provides technology content to Nextel Online (SM) Wireless Customers," Aug. 1, 2000, Proquest #57302767, 3 pgs.

AltaVista: "AltaVista announces the largest wireless index through raging search unplugged," PR Newswire, Aug. 14, 2000, Proquest #57902337, 4 pgs.

AltaVista: AltaVista enhances search, PR Newswire, Feb. 28, 2001, Proquest #69102308, 4 pgs.

Sullivan, Danny, "Getting off the beaten track: specialized web search engines," Oct. 1998, v6i9pg49, Proquest #35212581, 7 pgs.

BE: "BizRate.com solves e-commerce woes with launch of new c3 marketplace," Business Wire, Oct. 17, 2000, Proquest #62629149, 4 pgs.

Rappoport, Avi, "Search Engines: the hunt is on," Network Computing, Oct. 16, 2000; v11i20pg48, Proquest #62725694.

Verity: "Alis Technologies and Verity Offer Multilingual Search and Retrieval," Business Wire, Mar. 13, 1998: Dialog file 810 #0821104, 3 pgs.

* cited by examiner

{7,"<B>",""</B>",""<I>",""</I>",""<TABLE>"} procedure pcwrapHLRT (page P)
    *scan* to the line 7 in P
    while the next occurrence of *li* in P occurs before the next occurrence of *t*
        scan in P to next occurrence of $l_i$; save position as start of item attribute
        scan in P to next occurrence of $r_i$, save position as end of item attribute
        scan in P to next occurrence of $l_p$; save position as start of price attribute
        scan in P to next occurrence of $r_p$; save position as end of price attribute
    return extracted . . . . ., (item,price), . . . .} pairs

FIGURE 1
(PRIOR ART)

| Element Name | Element Description |
|---|---|
| Vendor Name | Name of the online shop |
| Vendor URL | The URL of the online shop |
| Form URL | The URL to submit search data |
| Learning Domain | The domain used to learn the vendor description |
| Head | The end of header position of vendor's product pages. This element to learnt to reduce the product page searching space and thus shorten the product information extraction time |
| Tail | The start of footer position of vendor's product pages. Same as Head element, with this element the product information extraction time for Shopper Agent is shorten. |
| Left Delimiter of Item | The Shopper Agent uses this two delimiters to identify a product |
| Right Delimiter of Item | |
| Left Delimiter of Price | The Shopper Agent uses this two delimiters to locate a product's price information |
| Right Delimiter of Price | |

FIGURE 4

| EXAMPLE ||
|---|---|
| Element Name | Element Description |
| Vendor Name | 800.com |
| Vendor URL | http://www.800.com |
| Form URL | http://www.800.com/search/srchrslts.asp?qs=1&slteentry=All&entry= |
| Learning Domain | Md |
| Head | 1230 |
| Tail | </BODY> |
| Left Delimiter of Item | /td width="12"> |
| Right Delimiter of Item | </fon |
| Left Delimiter of Price | Your Price: $ |
| Right Delimiter of Price | </b> |

FIGURE 5

| MD PRICE | | <HTML> |
|---|---|---|
| | | <TITLE><B>A Simple Product Catalogs</B></TITLE> |
| Model Number | PRICE (US$) | <BODY><br><H2> MD Price </H2><br><TABLE BORDER=1> |
| HM381MD | 399.95 | <TR BGCOLOR=ORANGE><TH> Model Number </TH> |
| MD2070 | 599.95 | <TH> PRICE(US$)</TH></TR> |
| MD203 | 249.95 | <TR><TD><B> HM381MD</B></TD><TD><I>399.95</I></TD></TR> |
| MDR3 | 399.95 | <TR><TD><B> MD2070</B></TD><TD><I>599.95</I></TD></TR> |
| | | <TR><TD><B> MD203</B></TD><TD><I>249.95</I></TD></TR> |
| | | <TR><TD><B> MDR3</B></TD><TD><I>399.95</I></TD></TR> |
| | | </TABLE> |
| | | <P> |
| | | <HR WIDTH=200 ALIGN=LEFT> |
| | | <P> |
| | | <B> End Of The Product Catalog </B> |
| | | </BODY> |
| | | </HTML> |

FIGURE 7

| Product Entry | Labels |
|---|---|
| { HM381MD, 399.95} | {<<174, 180>, <197, 202>>} |
| { MD2070, 599.95} | {<<229, 234>, <251, 256>>} |
| { MD203, 249.95} | {<<283, 287>, <304, 309>>} |
| { MDR3, 399.95} | {<<336, 339>, <356, 361>>} |

FIGURE 8

| Product Entry | Labels |
|---|---|
| { PRODUCT, PRICE} | {<PRODUCT LEFT DELIMITER, PRODUCT RIGHT DELIMITER>, <PRICE LEFT DELIMITER, PRICE RIGHT DELIMITER>} |
| * * * | * * * |

FIGURE 9

| Delimiter | Candidates |
|---|---|
| Item Left Delimiter | \<TR>\<TD>\<B><br>TR>\<TD>\<B><br>R>\<TD>\<B><br>>\<TD>\<B><br>\<TD>\<B><br>TD>\<B><br>D>\<B><br>>\<B><br>\<B><br>B><br>> |
| Item Right Delimiter | \</B>\</TD>\<TD>\<I><br>\</B>\</TD>\<TD>\<I<br>\</B>\</TD>\<TD>\<<br>\</B>\</TD>\<TD><br>\</B>\</TD>\<TD<br>\</B>\</TD>\<T<br>\</B>\</TD>\<<br>\</B>\</TD><br>\</B>\</TD<br>\</B>\</T<br>\</B>\</<br>\</B>\<<br>\</B><br>\</B<br>\</<br>\< |
| Price Left Delimiter | \</B>\</TD>\<TD>\<I><br>/B>\</TD>\<TD>\<I><br>B>\</TD>\<TD>\<I><br>>\</TD>\<TD>\<I><br>\</TD>\<TD>\<I><br>/TD>\<TD>\<I><br>TD>\<TD>\<I><br>D>\<TD>\<I><br>>\<TD>\<I><br>\<TD>\<I><br>TD>\<I><br>D>\<I><br>>\<I><br>\<I><br>I><br>> |

FIGURE 10A

| Delimiter | Candidates |
|---|---|
| Price Right Delimiter | </I></TD></TR<br></I></TD></T<br></I></TD></<br></I></TD><<br></I></TD><br></I></TD<br></I></T<br></I></<br></I><<br></I><br></I<br></<br>< |
| Head | <<br><H<br><HT<br><HTM<br><HTML<br><HTML><br>… …<br>… … … … |
| Tail | ><br>L><br>ML><br>TML><br>HTML><br>/HTML><br>… …<br>… … … … |

FIGURE 10B

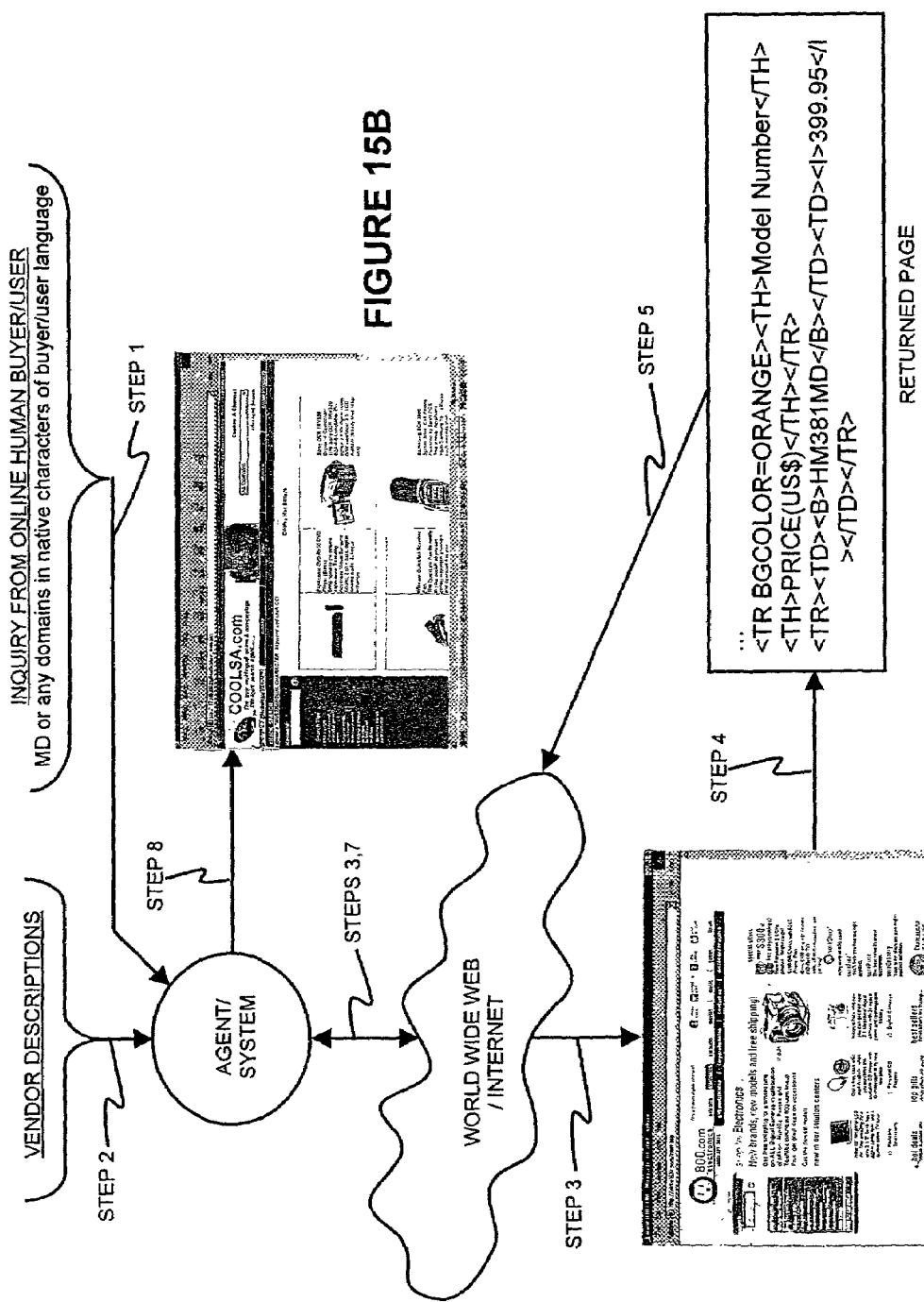

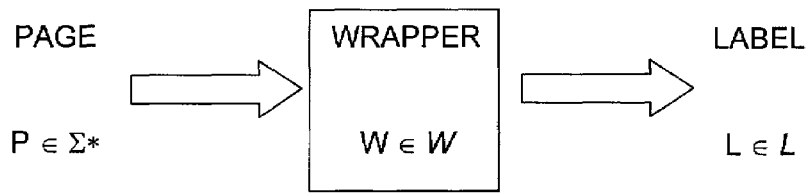

FIGURE 24

```
procedure execHLRT (wrapper (h, l_i, r_i, l_p, r_p, t), page P)
    m ← 0
    scan in P to line h
    while the next occurrence of l_i in P occurs before the next occurrence of t
        m ← m + 1
        scan in P to the next occurrence of l_i in P; save position as b_{m,i}
        scan in P the next occurrence of r_i ; save position as e_{m,i}
        scan in P to the next occurrence of l_p in P; save position as b_{m,p}
        scan in P to next occurrence of r_p; save position as e_{m,p}
    return label { . . ., <<b_{mi}, e_{mi}>,<b_{mp}, e_{mp}>>}
```

FIGURE 25

Procedure learnHLRT (examples ε)

1. Generate the candidate sets Cands_r(l, ε), Cands_l(l, ε ), Cands_r(p, ε), Cands_l(p, ε ).

2. Enumerate the cross product of these candidate sets; each element W = (h, l_i, r_i, l_p, r_p, t), of this cross product is a wrapper. Halt if W is satisfactory i.e., execLR(W, P_n) = Ln, for every (P_n, Ln) ∈ ε.

FIGURE 26

```
/*
 * The main problem
 */
  procedure learnHLRT (examples ε) for each 1 <k <K
    for each u ∈ cands_l(p, ε): if valid_l(u, p, ε) then l_p ← u and terminate this loop
    for each u ∈ cands_r(i, ε): if valid_r(u, i, ε) then r_i ← and terminate this loop
    for each u ∈ cands_r(p, ε): if valid_r(u, p, ε) then r_p ← u and terminate this loop
    for each u_li ∈ cands_l(i, ε)
    for each u_h ∈ cands_h(ε)
      for each u_t ∈ cands_t(ε)
        if valid_{l,h,t}( u_li, u_h, u_t, ε) then
          l_i ← u_li, h ← u_h, t ← u_t, and terminate these three loops
  return HLRT wrapper (h, l_i, r_i, l_p, r_p, t)

/*
 *Generate a set of candidates for left delimiter of price attribute
 */
procedure cands_l(attribute price, examples ε)
  return the set of all suffixes of the shortest string in neighbors_l(price, ε)

/*
 *Generate a set of candidates for right delimiter of attribute a. Here a could be item or price
 */
procedure cands_r(attribute a, examples ε)
    return the set of all prefixes of the shortest string in neighbors_r(a, ε)
/*
 * Generate a set of candidates for a page's head
 */
procedure cands_h (examples ε)
    return the set of all substrings of the shortest string in heads(ε)

/*
 *Generate a set of candidates for a page's tail
 */
procedure cands_t(example ε)
    return the set of all substrings of the shortest string in tails(ε)

/*
 *Determine whether a particular candidate for the left delimiter of price is valid
 *This procedure applies constraints C3
 */
  procedure valid_l(candidate u, attribute price, examples ε)
      for each s ∈ neighbors_l(price, ε): if u is not a proper suffix of s then return FALSE
```

Figure 27A

```
    for each s ∈ tails(ε): If u is a sub string of s then return FALSE
    return TRUE /*
*Determine whether a particular candidate for the right delimiter of item or price is
*valid
*This procedure applies constraints C1 and C2
*/
    procedure valid_r(candidate u, attribute a, examples ε)
for each s ∈ attribs(a, ε): if u is a sub string of s then return FALSE
for each s ∈ neighbors(a, ε): if u is not a prefix of s then return FALSE
    return TRUE
/*
*Determine whether a particular combination of candidate uh, ut, and uli for h, t, and
*li respectively are satisfactory.
*/
procedure valid_{li,h,t}(candidates u_{li}, u_h, u_t, example ε)
    for each s ∈ heads(ε)
        if is not a sub string of s then return FALSE
        if U_{l1} is not a proper suffix of scan (s, Uh) then return FALSE
            if Ut occurs before U1_1 in scan (s, Uh), then return FALSE
    for each s ∈ tails (ε)
        if Ut 1S not a sub string of s then return FALSE
        if Uli occurs before Ut in s then return FALSE
    for each s ∈ seps(ε)
        if Uli is not a proper suffix of s then return FALSE
            if Ut occurs before Uli in s then return FALSE
    return TRUE /*
*Return a set of containing all values of a attribute, either item(i) or price(p) in each
*example
*/
    procedure attribs(attribute a, examples ε)
            return U_{(Pn,Ln)} ∈ ε(Pn[b_{m,a}, e_{m,a}] |<. . ., (b_{m,k}, e_{m,k}), . . . > ∈ Ln}

/*
*Return all strings to the left of an attribute, whether these strings are in the heads
* or the bodies of the pages
*/
    procedure neighbors_i(attribute a, examples ε)
        if a=i then return seps (i, ε) U heads (ε) else return seps (a, ε)
/*
```

| | | | | Choose a Channel |
|---|---|---|---|---|
| | NAVIGATION BUTTONS TO OTHER PAGES IN WEBSITE | | | |
| WEBSITE LOGO | | | | All G2B Tender Procurement Domains ▽ |
| | | | | Advanced Search |
| DOMAIN A | DOMAIN B | DOMAIN C | DOMAIN D | OTHER DOMAINS |

ADVANCED SEARCH AGENTS ARE ON!

Enter a "MULTILINGUAL CHARACTER" keyword and click GO!

| ☐ Select All | | Multilingual Government Networks | | |
|---|---|---|---|---|
| Public Body | Speed | Air/Shipping/Ground/Free Overnight Del. | Ease of Navigation |
| ☐ G2B Company G | ↑↑↑↑↑ | ⇨ | EEEE |

SEARCH TIPS

* * *

Time Out [ ]

Reserved Price Range   From $ [ ]   To $ [ ]

Manufacturer or OEM [ ]

Keyword: [ ]   (GO!)

FIGURE 34

| | | | | |
|---|---|---|---|---|
| | NAVIGATION BUTTONS TO OTHER PAGES IN WEBSITE | | | |
| WEBSITE LOGO | | | | Choose a Channel ▽ |
| | | | | All Ontological Domains |
| | | | | Advanced Search |
| DOMAIN A | DOMAIN B | DOMAIN C | DOMAIN D | OTHER DOMAINS |

QUICK SEARCH

Enter a "MULTILIGUAL CHARACTER" keyword and click GO!

Keyword: [____] (GO!)

SEARCH TIPS
* 
* 
*

| For B2B Trading Exchanges, Auctions, Vertical Portals, Production and Non-Production e-Procurement Supplies | Agricultural / Farming | More Business to Business | |
| --- | --- | --- | --- |
| | Apparel | MRO/Raw Materials | Reverse Advertising Sites |
| | Automotive/ Transportation | Office Furnishings | |
| | Business Machines | Office Supplies | |
| | Computers & Electronics | Real Estate | |
| | Industrial Equipment | Restaurant/Hospitality | |
| | Medical & Scientivic Equipment | Services | |
| | | Travel & Entertainment | |

△ Feedback [____] Submit

△ Registered Vendor Links
Abcd.com    cdef.com
1234z.com   23ezid..com
pkkw.com    er5lcin.com

FIGURE 35

WEBSITE LOGO

| | | | | Choose a Channel |
|---|---|---|---|---|
| | | NAVIGATION BUTTONS TO OTHER PAGES IN WEBSITE | | All Ontological Domains ▽ |
| | | | | Advanced Search |
| DOMAIN A | DOMAIN B | DOMAIN C | DOMAIN D | OTHER DOMAINS |

ADVANCED SEARCH AGENTS ARE ON!

Enter a "MULTILIGUAL CHARACTER" keyword and click GO!

Multilingual B2B Suppliers

| ☐ Select All | | | | |
|---|---|---|---|---|
| Online Stores | Speed | Air/Shipping/Ground/Free Overnight Del. | | Ease of Navigation |
| ☐ B2B Company 1 | fffff | ⇧ | | EEEE |
| ☐ B2B Company 2 | fffff | | | EEEEE |
| ☐ B2B Company 3 | fffff | ⇧ | | EEEE |
| ☐ B2B Company 4 | fffff | ⇧ | | EEEE |

Time Out [          ]

Price Range  From $ [     ]  To $ [     ]

Manufacturer [          ]

Keyword: [          ]  (GO!)

SEARCH TIPS
* . .

WEBSITE LOGO

NAVIGATION BUTTONS TO OTHER PAGES IN WEBSITE

Choose a Channel
ALL DOMAINS ▼
Advanced Search

| DOMAIN A | DOMAIN B | DOMAIN C | DOMAIN D | OTHER DOMAINS |

QUICK SEARCH

Enter a "MULTILIGUAL CHARACTER" keyword and click GO!

Keyword: [    ] (GO!)

SEARCH TIPS
* * *

Search Results

Products
Your search for XX returned 5 Domain C items.

| Model / Features | Store | Price |
|---|---|---|
| AMS7 XX Widget [Features] | Store 1443A | $399.95 Buy now |
| AMS2 XX Widget [Features] | Store 1443A | $329.95 Buy now |
| AMS7 XX Widget [Features] | Store DRGWS4 | $459.95 Buy now |
| AMS7 XX Widget [Features] | Store 4U$U$ | $499.95 Buy now |
| ZRTQ XX Widget [Features] | Store OOHE | $529.95 Buy now |

ONLINE INTELLIGENT INFORMATION COMPARISON AGENT OF MULTILINGUAL ELECTRONIC DATA SOURCES OVER INTER-CONNECTED COMPUTER NETWORKS

RELATED APPLICATIONS

The present application claims priority under 35 U.S.C. §119(e) from provisional applications No. 60/236,574, filed Sep. 29, 2000, and 60/299,360, filed Jun. 19, 2001.

COMPUTER PROGRAM LISTING APPENDIX

Reference is made to the computer program listing appendices submitted herewith in a total of two (2) compact discs (including one duplicate compact disc). A single file is included in the submitted discs and is entitled "implementation.txt," bears a date of creation of Sep. 18, 2001, and has a size of 14K bytes. The material contained in the compact discs is hereby incorporated by reference herein.

FIELD OF THE INVENTION

The present invention relates generally to automating tasks on the World Wide Web (the "Web") and more particularly to automating tasks for an online buyer or user such as comparison shopping or interacting with the multilingual vendors on the World Wide Web through a single interface to increase communication efficiencies and to provide a personalized buying experience.

DESCRIPTION OF THE BACKGROUND

Since the creation of the World Wide Web in the mid 1990's, the size of the Internet has exploded a thousand-fold. People are now inter-connected, not by means of direct face-to-face interaction, but through virtual communication channels. This new revolution of technology has fundamentally changed the way people live.

A parallel development with the World Wide Web is the "Information Technology Age" that presents a stunning variety of online information resources ranging from product information to academic papers. These elements have enabled the exponential growth of Electronic Commerce that capitalizes on the convenience and low cost which the Internet delivers.

There are several million or more online vendors on the World Wide Web. Although current comparison shopping or price comparison search engines can retrieve from different online competitors, according to an online buyer's or user's query, somewhat relevant search results pertinent to any desired products requested and their desired prices, the buyer or user can be confronted with an endless sea of information. Sometimes, the buyer or user receives a "failure page" of search results because the search engines have missed other Websites of online multilingual vendors existing in the rest of the Internet-connected countries (currently numbering 245) selling exactly what was requested. Furthermore, although information about products and vendors is easily accessible on the Web, buyers or users are still in the loop in all stages of the buying process.

The potential of the Internet for transforming the present mode of e-commerce into a truly global ensemble marketplace is largely unrealized today, and electronic purchases are still non-automated. Buying on the Internet is far from being simple, efficient, or enjoyable. Search engines and centralized directory services are insufficient for locating products the online buyer wants and the merchants willing to sell such products or services. Furthermore, the typical online purchase procedure is mostly manually driven and requires the buyer to enter all terms and keywords for which he or she wants to search. Therefore, a prospective buyer is faced with a daunting task, with responsibility for collecting and interpreting information about merchants and products, making decisions about them, and ultimately entering purchase and payment information. The scenario is that the user or buyer is easily overloaded with information without sufficient time and expertise.

In order of complexity, there are two imperfect strategies presently adopted and implemented to partially automate an online catalog price comparison process as follows:

(1) Non real-time approach (2) Real-time hard-coded wrappers approach

The non real-time approach is the simplest way to implement a price comparison agent. Its implementation involves manually collecting all necessary information from the Web, and then writing a separate HTML file for each item of the search results in order to visually display the search results.

The benefits of the above are obvious—easy implementation and short searching time. Notwithstanding those benefits, there are three main undesirable drawbacks. Firstly, as the price comparison is done manually, maintaining a large wrapper repository becomes very costly, particularly in view of the continuing growth of the Internet. Secondly, great effort must be invested to keep the price and other information up-to-date. Lastly, the size of the database required to store and coordinate all of the above information is extremely large.

The real-time hard-coded wrappers approach is an alternative to the non real-time approach. Instead of fetching the items directly as in the non real-time approach, the real-time approach tries to generalize the HTML page into a specific format. To perform this extraction task, a customized wrapper procedure named pcwrapHLRT—programming acronym—is invoked. FIG. 1 provides an example of the pertinent portion of the program that has one "while" loop. In this example, the algorithm behind the creation of a wrapper is to confine the target data on the HTML page by a pair of delimiters. The pcwrapHLRT procedure works because the site exhibits a uniform formatting convention. Product items are rendered in bold whereas prices are in italics. PcwrapHLRT operates by scanning the HTML document for particular strings {"<B>, "</B>, "<I>," "</I>"} that identify the text fragments to be extracted. These strings are identified by pcwrapHLRT as $l_i$, $r_i$, $l_p$ and $r_p$, respectively. The notation $l_k$ ($k \in \{i, p\}$) indicates that the string delimits the left-hand edge of an attribute to be extracted whereas $r_k$ indicates a right delimiter. Other possible attributes to be extracted by a wrapper are product names, graphics, terms and conditions, etc.

When a HTML page is given, pcwrapHLRT sequentially scans the entire page starting from the head line number. The outer loop checks whether there are additional model numbers and/or price pairs to extract by searching for delimiter "<B>" on the non-scanned portion of the page. As long as the beginning of a model number is found, the inner loop is invoked to extract the appropriate page sub-strings.

Few Websites publish their formatting conventions. Thus, the designer of an information-gathering system using pcwrap<sub>HLRT</sub> would manually construct such a wrapper for each resource. Unfortunately, this hard-coding process is tedious and error-prone, as a common HTML page may consist of several thousand lines of code. Moreover, most sites periodically change their formatting conventions that usually will break a wrapper.

Another disadvantage of pcwrapHLRT is that the speed of search time is moderate, as the agents have to contact the vendor Website upon receiving a request from the user. Because this kind of wrapper is partially automated, extra administrative work must be performed to manually analyze the format of the HTML page in order to determine the wrapper.

SUMMARY OF THE INVENTION

In view of such commonly encountered afore-mentioned problems, an alternative to manual and partially automated manipulation, based upon a new Internet strategy, is automatic manipulation—online intelligent price comparison agents that can relieve the price comparison process of online catalog buying or shopping, (auctioning, etc.), and can meanwhile provide a better navigational environment with an Internet-friendly interactive-agent-character graphical user interface (IACGUI). This will be particularly useful when the so-called 4th Generation Global Ensemble Marketplace Framework—agent-mediated B-to-C, C-to-C, B-to-B e-procurement and auction, G-to-B/C (Government-to-Business/Consumer) tendering e-commerce and m-commerce (mobile commerce)—becomes widely implemented. Thus, the system of the present invention provides a better environment for consumer-to-business transactions.

To put it simply, online intelligent price comparison agents are automated online buying or shopping assistants that scour global online multilingual stores and ferret out deals on every product. They also deliver value-added (customer rated) Business-Web services to the online buyer/ user. Such agents are attractive because they can relieve users of the tedium of manually carrying out every operation in the Consumer Buying Behavior model.

Conventionally, a buyer/user communicates with a Web server of an online service through the interface at the front-end, which presents a form completed by the buyer/user for entering the terms to be searched. Once the buyer/user submits the search request, the online service's Web server queries its database for matches, and presents the results to the user's Web browser.

In the present invention, user agents (online intelligent price comparison agents acting on behalf of the human buyer/user) in the online catalog price comparison process carry the terms and keywords to be searched for, and communicate with numerous multilingual Web servers of any of the 246 Internet-connected countries over inter-connected computer networks on the World Wide Web for the buyer's/user's best interests. The user agent then ranks the online vendor sites it finds and presents a summary of search results via the Web browser to the online human user.

The advantages of applying the system of the present invention to multiple e-commerce segments are very significant. Communication efficiency and effectiveness can be increased considerably, and time and cost-savings for online vendors as well as online buyers can be maximized. Most importantly, the user/buyer will have access to an unprecedented and countless number of sources of information and a myriad of products sources on a global scale, as well as an immeasurable number of business opportunities. The system and method of the present invention will also help to collapse time and languages barriers, demographic boundaries, and truly enable the globalization of e-commerce. Besides, the personalized, continuously running, autonomous nature of the user agents makes them well suited for mediating buyer/consumer behaviors. It is believed that the present invention will help to optimize the whole buying experience and revolutionize current e-commerce.

It is therefore an object of the present invention to provide an improved price comparison of online vendors' products or services.

It is yet another object of the present invention to construct vendor descriptions of the online shop.

It is yet another object of the present invention to collect data, including sample products and URLs, which are used for training.

It is yet another object of the present invention to retrieve training data before performing learning of vendor sites or online shops.

It is yet another object of the present invention to collect training pages from online vendors using information given in the training data.

It is yet another object of the present invention to generate vendor descriptions from the training data and collected training pages.

It is yet another object of the present invention to store the generated vendor descriptions in an offline database.

It is yet another object of the present invention to provide an interface for a system administrator to add, modify and delete vendors supported by the system.

It is yet another object of the present invention to provide an interface for an administrator to view vendor information.

It is yet another object of the present invention to provide a price comparison method whereby a customer can initiate the price comparison.

It is yet another object of the present invention to parse HTML pages into useful data.

It is yet another object of the present invention to provide filtering and sorting of desired products/services.

It is yet another object of the present invention to provide a single interface to compare prices of different online multilingual vendors and different domains on the Internet or World Wide Web.

A first user agent is embodied in the system of the present invention, and is implemented in the form of a Semantics Recognition Learner Agent (SRLA). It conducts a real-time autonomous wrapper induction using an inductive learning method to learn the URL of a vendor's site and its domain description, and generalized rules about the organization of the vendor's site based upon previously compiled or prepared training examples provided by the system administrator. (In one embodiment, the SRLA connects a Microsoft brand back-end SQL-compliant server or Microsoft Access database to produce a vendor and products description only once per online store.) The wrapper induction is done by constructing in real-time a wrapper of examples that is extracted from vendor and products descriptions stored in the offline database. Then with the examples, the SRLA autonomously zaps through the Internet in real-time to the remote host of the vendor site to access the Web pages exhibiting the specified examples according to the URL provided, then intelligently fills-in a relevant search form with the domain or product information, and then virtually "presses enter" to thereby submit a search request to the site. Result pages that are returned in response to the search criteria are either a successful page containing accurate information or a failure page. These result pages, having vendor and products descriptions that are unique to a particular vendor (either a registered or non-registered vendor with the system), are consequently stored in a vendor description list in the offline database (such as in an SQL-compliant server or Microsoft Access database)

maintained by the system administrator. Vendor URLs, vendor descriptions and other information, are preferably automatically updated once daily on schedule.

A second user agent embodied in the system of the present invention is referred to as a Semantics Recognition Buyer Agent (SRBA). The SRBA uses the vendor descriptions previously "learned" by the Semantics Recognition Learner Agent to search for a match while accessing simultaneously various online multilingual vendor sites on the World Wide Web. The SRBA intelligently fills-in a vendor's search form with the product information provided by an online buyer or user and virtually "presses enter." The vendor then returns search result pages to the SRBA through the World Wide Web in such a manner that result pages arrive at about the same time as other ones being returned from other vendors. (The Semantics Recognition Buyer Agent stores these returned pages in a separate memory or cache location as hits for later use by other SRBAs.) The SRBA analyzes the returned pages according to the corresponding vendor descriptions, extracts from them relevant information and data, sorts prices and model numbers, and displays them in a formatted summary on the screen of a client-machine via a Web browser to the online buyer/user.

In accordance with the present invention, a method is provided for a computer-implemented Semantics Recognition Learner Agent to perform an inductive learning. The method comprises retrieving training data specific to an online vendor to generate a corresponding vendor description from inter-connected computer networks. The method comprises collecting training pages using the given training pages using the given training data stored in the vendor list. Using the training data as well as the retrieved training pages, the method comprises an inductive learning method to generate a vendor-specific vendor description from information that is extracted from the training data and retrieved training pages.

A method is provided for storing the retrieved and/or extracted vendor descriptions in an offline database that will be later used by a Semantics Recognition Buyer Agent (SRBA).

A method is provided in accordance with the present invention for price comparison of products or services from online vendors. The method comprises an online user initializing a request for a specific product or service, then a Semantics Recognition Buyer Agent constructs parameters of a search request using pre-defined vendor descriptions. The method comprises posting requests to different online vendors, preferably at the same time, extracting data from result pages returned from the online vendors using a parser that comprises the vendor descriptions. The method comprises constructing/composing sorted and filtered data by a Semantics Recognition Buyer Agent in a HTML format for presenting the data to the online buyer/user.

A method is provided and implemented through the Semantics Recognition Buyer Agent for parsing returned pages from online vendors to retrieve useful data. The method comprises retrieving vendor descriptions from an offline database, parsing the returned page from online vendors for any of the (currently 246) Internet-connected countries on the World Wide Web, and collecting useful data using information from the returned vendor descriptions.

In one embodiment of the invention, the above functionality is only available on member Web pages after an online buyer signs up as a registered temporary trial or life member.

In accordance with the present invention, a method is provided for real-time online search processing of selected types of information over inter-connected computer networks. The method comprises a number of steps: assembling site descriptions for a plurality of sites in the inter-connected computer networks including for each of the plurality of sites (a) a URL for the site; a search form URL for the site; (b) generalized rules of how the selected types of information on the site is organized; (c) sample data retrieved from the site corresponding to the selected types of information; and (d) descriptions of domains found on the site; receiving a request for specified types of information from an online user; identifying from the site descriptions, sites which may have the specified types of information; constructing search requests for the specified types of information using the site descriptions for each identified site; submitting the constructed search requests to the identified sites; receiving search results from the identified sites, and upon locating accurate matches in the received search results, extracting information corresponding to the specified types of information in a native language of the site, and displaying the extracted information to the user.

More generally, the present invention involves a method for real-time online search processing over the inter-connected computer networks. The method comprises the steps of: (a) maintaining in an offline database information for a plurality of vendor sites from the inter-connected computer networks; the information includes URLs, search form URLs, description of domains, and vendor descriptions, wherein the vendor descriptions include generalized rules about how product information is organized on each of the vendor sites; (b) processing parameters for a price comparison request for a desired product using the information maintained in the offline database, while the price comparison request is received from an online user and/or the Semantics Recognition Buyer Agent; (c) extracting real-time price and product information from identified ones of the plurality of vendor sites, wherein the extracted price and product information are in a native language of the site; and (d) displaying the extracted price and product information to the user.

DESCRIPTION OF THE DRAWINGS

FIG. 1 is an example of the pertinent portion of the pcwrapHLRT program used in a prior real-time hard-coded wrappers approach for retrieving information from a vendor's Website.

FIG. 4 provides a description of the kinds of information that can be included in a vendor description in accordance with the present invention.

FIG. 5 provides an example of data that can populate the vendor description fields in accordance with the present invention.

FIG. 7 provides an example of an alignment's portion of a page from a Website as it would appear to a person browsing that page on the Internet, and the corresponding HTML codes that are used to generate or define such alignment.

FIG. 8 provides an example of the labels that, in accordance with the present invention, are used to identify the locations of item description and price information in a training page.

FIG. 9 is a generalized description of what is represented by the labels used during the training procedure of an example of the present invention.

FIGS. 10A and 10B provide examples of possible delimiter candidates in the example of the training process illustrated in FIGS. 5 to 9.

FIG. 15B is a generalized illustration of the operation of the Semantics Recognition Buyer Agent of the present invention that accessed the vendor site "www.800.com" at a time after the learning process of vendor descriptions, as shown in FIG. 14, such that vendor logo's design has subsequently changed to the one as exhibited in FIG. 15B.

FIG. 17 is a provided example in which training information has been filled-in for the vendor "1 cache.com."

FIG. 18 is an illustration of a the Learner interface screen that can be used to display vendor description information which has been learned.

FIG. 19 is a screenshot of the Learner Interface with the labeled tab "vendor information" through which vendor information can be entered or searched for.

FIG. 23 exhibits the learned results for vendor "1cache.com."

FIG. 24 illustrates the wrapper induction problem formulated with the defined solution of a simple model of information extraction.

FIG. 25 provides a pseudo-code for the procedure "execHLRT."

FIG. 26 is a module of a simple method in pseudo-code for learning head and tail delimiters.

FIGS. 27A and 27B provide a detailed table and related subroutines for the procedure learnHLRT.

FIG. 32 is a simplified illustration of a "main menu" screen of a GUI or Interactive-Agent-Character Shopper/Buyer Interface (IACS/BI) for use with the present invention. It is to be noted that there is a choice of "channels" (categories) of products provided for the user in the upper right hand corner of this "main menu" screen. A "Quick Search" feature is also provided in the left hand side of the screen. Right beneath it, there is a provided box in which an animated feature of self-typing instructs the online human user how to use the quick search option. The left hand screen panel also provides a set of boxes for member sign-in as a temporary trial or life member. (Note that most of the portal's functions of the present invention are disabled until the user authentication is validated.) At the bottom left hand corner is provided a set of links to online vendors that have been registered with the portal of the present invention whereas on the right, it can be observed that a big message box labeled "feedback" is provided for the online user to enter a message with comments through e-mail to the e-mail server, preferably running the Outlook Express brand e-mail application of Microsoft Corporation.

FIG. 34 is a simplified illustration of a screen display of a GUI or Shopper/Buyer Interface for use with the present invention in which details are provided about a company selected by the user from among the choices provided after the user has clicked the "Advanced Search" option on the screen of FIG. 33. Note that on this screen, the banner in the frame of the panel just right below the tabs for the five types of domains, the capitalized message "ADVANCED AGENTS ARE ON!" is observed. Besides, at the bottom of the screen, the user is provided with dialog boxes which can be filled-in for running a search using the Semantics Recognition Buyer Agent functionality provided by the present invention. Again, however, note that this very screen cannot function because this company, or so-called Government-to-Business e-commerce service or platform provider currently restricts strictly for member's privilege the access to their Web server's databases by incorporating an authentication security interface in entirely closed-connected computer networked environment.

FIG. 35 is a simplified illustration of a screen of a GUI or Shopper/Buyer Interface for use with the present invention in which companies are displayed in response to "Business-to-Business" textual icon which has been clicked on a previous screen (not shown) by the online buyer/user. However, note that this very screen cannot function because these companies, or so-called Business-to-Business e-commerce service/platform providers currently restrict strictly for member's privilege the access to their Web servers' databases by incorporating an authentication security interface in entirely closed-connected computer networked environment.

FIG. 36 is a simplified illustration of a screen display of a GUI or Shopper/Buyer Interface for use with the present invention in which details are provided about companies selected by the user from among the choices provided after the user has clicked the "Advanced Search" option on the screen in FIG. 35.

FIG. 37 is a simplified illustration of a screen of a GUI or Shopper/Buyer Interface for use with the present invention in which selected items and their descriptions are displayed in response to the user selecting the "Domain A" tab on the screen.

FIG. 39 is a simplified illustration of a screen display of a GUI or Shopper/Buyer Interface for use with the present invention in which details are provided of the results of a search conducted using the Semantics Recognition Buyer Agent's feature of the present invention. The Shopper/Buyer Interface responds to the user submitting a search request through the search parameters interface as shown at the bottom of the screen in FIG. 38.

DETAILED DESCRIPTION OF PREFERRED EMBODIMENTS

Figure 2:
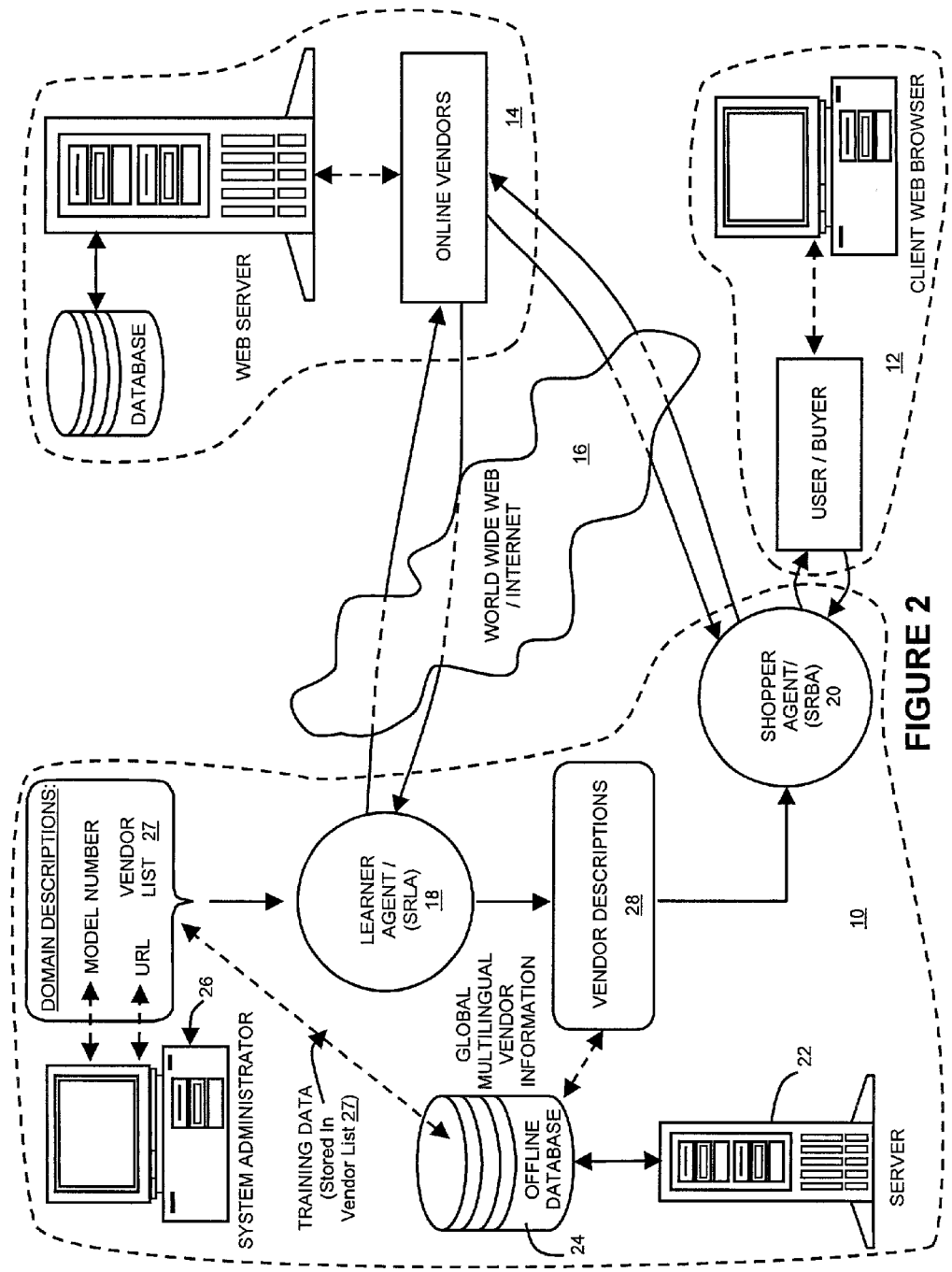
FIG. 2 is a generalized diagram illustrating the interaction between a preferred embodiment of the present invention, user agents of the present invention, a user/buyer, and online vendors, by way of the World Wide Web/Internet.

Referring to FIG. 2, a generalized diagram is provided illustrating the interaction between a preferred embodiment 10 of the present invention, a user/buyer 12, and online vendors 14, by way of the World Wide Web/Internet 16.

In the preferred embodiment 10 of the present invention, a Learner Agent 18 (also referred to as a Semantics Recognition Learner Agent) and a Shopper Agent 20 (also referred to as a Semantics Recognition Buyer Agent) are provided. A server 22 is employed to provide access to an offline database 24 that stores global multilingual vendor information. A system administrator 26 prepares/compiles training data about selected vendor sites and stores them in a "vendor list" 27 in offline database 24 through server 22. The system administrator 26 can then employ the training data and the Semantics Recognition Learner Agent 18 to conduct "inductive learning" from training pages retrieved from vendor sites by way of the World Wide Web 16. The "inductive learning" results in vendor descriptions in the form of vendor description list 28 which are stored in the offline database 24.

A user/buyer 12 can use the preferred embodiment of the present invention to retrieve designated information about designated subjects by using Semantics Recognition Buyer Agent (SRBA) 20. The SRBA 20 processes a request from the user/buyer 12 by using information contained in the previously learned vendor descriptions 28. The information in the vendor descriptions 24 permits the Semantics Recognition Buyer Agent 20 to instantly prepare and issue searches on many vendor Websites substantially simultaneously by way of the World Wide Web 16. The vendor descriptions also permit the Semantics Recognition Buyer Agent 20 to instantly process received search results, and to present to the user/buyer 12 the results of the search from all vendor sites searched which have been filtered of extraneous and irrelevant information.

Figure 3:
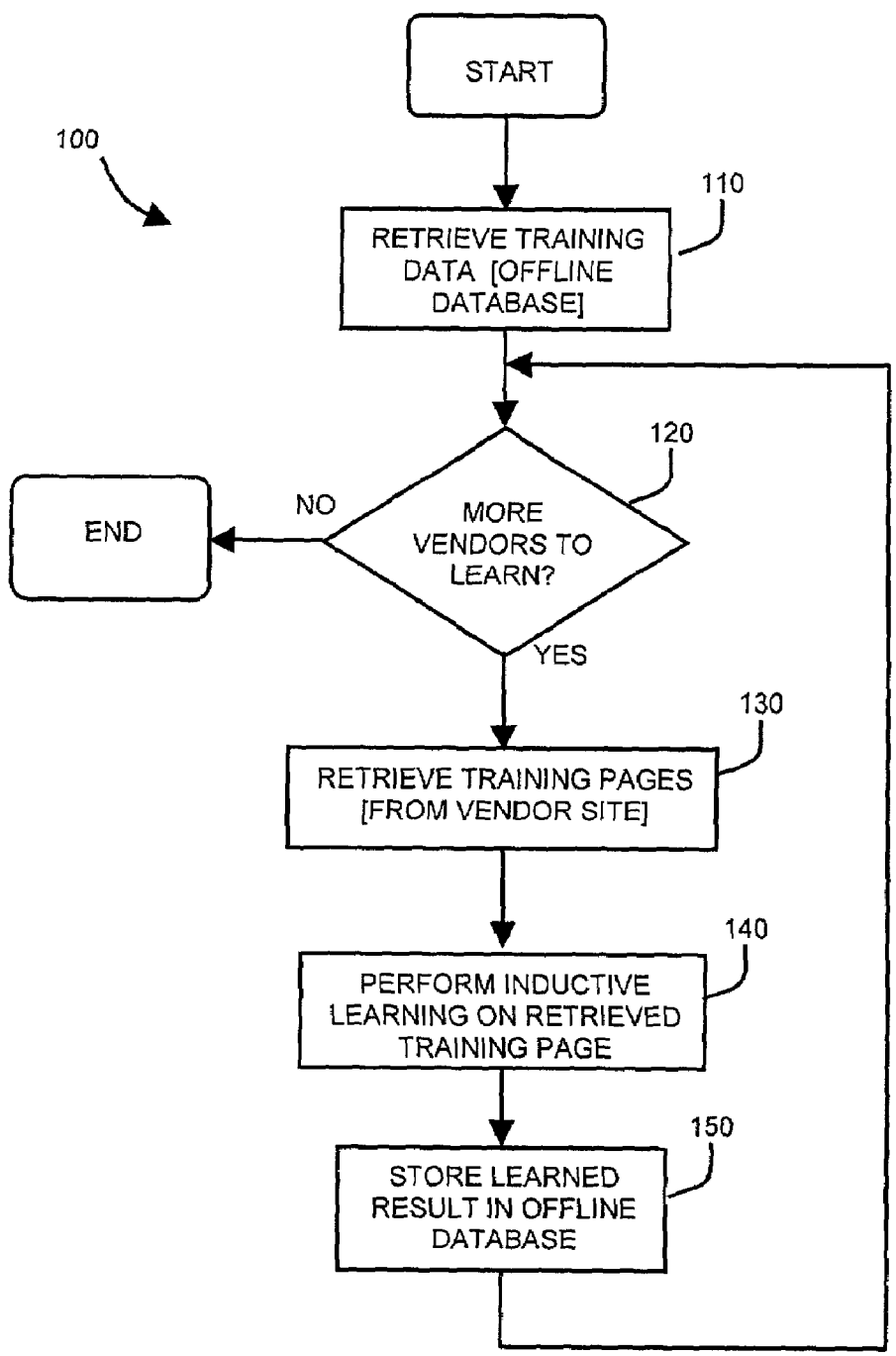
FIG. 3 is a simplified flowchart 100 of an overview of how the Semantics Recognition Learner Agent (SRLA) works with training data to generate a vendor description.

Referring now to FIG. 3, flowchart 100 illustrates the operation of an embodiment of the present invention of the Semantics Recognition Learner Agent (SRLA) 18. In the preferred embodiment of the present invention, the Semantics Recognition Learner Agent 18 is embodied in a computer program running on a server or personal computer. In step 110, the Semantics Recognition Learner Agent 18 retrieves pre-defined or earlier-prepared training data from the "vendor lists" 27 stored in the training database 24. The training database 24 is preferably offline.

The training data includes a bundle of data pertaining to the online vendors from which information is to be learned. These data may include URLs, domain descriptions, sample products and attributes and other domain-specific information as shown below in the right column:

| | |
|---|---|
| Vendor's Name | 1cache.com |
| Vendor's URL | http://www.cache.com |
| Vendor's Search Form URL | http://st4.yahoo.com/cgi-bin/nsearch?catalog=1 cache&query= |
| Learning Domain | dvd |
| Training Examples | i). DVD Virtual Notebook Theater with I-Glasses |
| | ii). JVC XV523GD Dolby Digital DVD Player |
| | iii). Pioneer DVL-919- Combination LC/DVD/CD Player |

FIG. 4 provides an example of the types and description of name labels of trained or "learned" data in accordance with the present invention. FIG. 5 is the illustrated example of the table for the learned actual "data elements" which have been generated during the vendor descriptions learning process for FIG. 4, and are stored in the vendor description list in the offline database, and maintained by the system administrator 26.

The "trained" data is preferably stored in an SQL-compliant or a Microsoft Access database. This adds extra extensibility to the selection of the data container from different vendors. Typically, the trained data is independent of the product domain, written characters and presentation style of the online vendor. One exception is the URL path in the trained data, which is required to uniquely identify different vendors.

Returning to FIG. 3, in step 120 a check is imposed to see if more vendors are required to be learned by the Semantics Recognition Learner Agent 18. If there are vendors pending to be learned, the Semantics Recognition Learner Agent 18 will proceed to step 130; otherwise, the learning session terminates. In step 130, using the pre-defined training data, the Semantics Recognition Learner Agent 18 intelligently accesses specified online vendors to which the pre-defined training data corresponds. For each of the specific products specified in the training data, the Semantics Recognition Learner Agent 18 searches the specific product via the searching feature of the vendor's site. Typically, the Semantics Recognition Learner Agent 18 retrieves several pages of training data to be learned from the system of the present invention or from manual input of the system administrator, which are called "training pages," and which will later be used to perform inductive learning. In the preferred embodiment, control data (training data to induce error pages in the vendor sites) is also included in this phase.

Next, in step 140, the computer program performs an inductive learning on the training pages obtained by the Semantics Recognition Learner Agent 18. The objective of the inductive learning is to obtain a generic description of the site and how it organizes the product data and logically presents the product data to a potential online customer. The product of this learning is called a "vendor description" 28—this phase will be further described and explained in accordance with FIG. 6.

Then, in step 150, the Semantics Recognition Learner Agent 18 stores the learned result preferably in an SQL-compliant or Microsoft Access database 24. (The vendor information or "vendor descriptions" 28 stored in offline database 24 will later be used by the online Semantic Recognition Buyer Agent 20.) Following the completion of the storing step 150, the Semantics Recognition Learner Agent 18 returns to the step 120 to see if there are more vendors to be learned. If so, steps 130 through 150 are repeated. Otherwise, the learning process terminates.

Vendor Description Learning Process

Referring now to FIG. 7, the vendor descriptions learning process will be explained in further detail using is a simple model of information extraction, and a simplified training page example. The left hand side of FIG. 7 shows the alignment of model and price information as it appears to a potential customer browsing a vendor site. The right hand side of FIG. 7 shows the HTML coding which generates the alignment. For example, the first three (3) lines on the right hand side identify the coding as HTML, provide the name of the alignment—"A Simple Product Catalogs," and indicate the start of the information to be displayed. Line four (4) provides the text for the title of the table—"MD PRICE." Lines six and seven (6,7) provide the text for the names of the columns, "Model Number" and "PRICE (US$)," respectively. Lines eight through eleven (8-11) provide model number and price information. The remaining lines identify such information as the end of the table, the alignment of the table, and the end of the body of the Product Catalog.

Firstly, a wrapper function generates a set of "labels" for the given training page. A label is used to identify the location of information for the training products in the training page. FIG. 8 illustrates for the simple product training page of FIG. 7, a set of labels generated by the Semantics Recognition Learner Agent 18. The "labels" in FIG. 8 indicate that the simple product catalogue page of FIG. 7 contains four (4) "tuples," where each tuple consists of an "item" value and a "price" value. A pair of integers represents each value.

Consider the first pair, <174, 180>. These integers indicate that the attribute of the first tuple is the sub-string between position 174 and 180, i.e. the string 'HM381MD' is located between position 174 and position 180. As used in this example, position means the number of characters from a designated beginning point, such as the beginning of a page, or the end of the "head" of a page. Spaces between text characters are counted as a character position. Inspection of the FIG. 7 reveals that the letter "H" in the string "HM381MD" occurs 174 character positions from the "<" character in the first line; and that the "D" in that string occurs at character position 180. Similarly, the last "tuple" or pair of integers, <356, 361>, indicates that the last attribute's price occurs between character positions 356 and 361 and identifies the string "399.95." It is to be understood that while character position is used in this example to identify "labels," other criteria can be used within the spirit of the present invention. Other criteria can be used with the methodological application of the present invention. For example, inspection again of FIG. 7, consider that the Semantics Recognition Learner Agent 18 of FIG. 2 autonomously assigns values to the model number and "Your Price" for the four electronics products—while it expresses them as set forth in the following formula:

|  | Model Number | Price ($US) |
| --- | --- | --- |
| $L = \begin{cases} <b_{1,i}, e_{1,i}>, <b_{1,p}, e_{1,p}> \\ <b_{2,i}, e_{2,i}>, <b_{2,p}, e_{2,p}> \\ <b_{3,i}, e_{3,i}>, <b_{3,p}, e_{3,p}> \\ <b_{4,i}, e_{4,i}>, <b_{4,p}, e_{4,p}> \end{cases}$ | HM381MD<br>MD2070<br>MD203<br>MDR3 | 399.95<br>599.95<br>249.95<br>399.95 |

Thus, if "b" stands for beginning and "e" stands for ending, then values identifying the positions of the second tuples comprise string $b\_,i$, which is the value of the beginning of the model number, "M," whereas string $e\_,i$ is the value of the ending of the model number, "0." Analogically, it is to be understood that the present invention enables the automation of the labeling by invoking a modular heuristic search based upon a standard relational data model comprising an "Item Recognizer" and an "Intelligent Price Recognizer" in which, reiteratively, a tuple is a vector <b2, i, b2,p> of two strings. String $b\_, i$ is the value of item attribute, and string $b\_, p$ is the value of price attribute. So, attributes represent columns whereas tuples represent rows. The numeric value "$\underline{b}2,i$" between the "b" and the "," connotes a position on the second row—the computation of positional values (labeling) are hence performed in real-time, automatically, on-the-fly during the invocation of efficient learnable wrapper induction of vendor descriptions in corroborating to label the entire Ppc (Page of product catalogue—a page "P" is the Web page containing the desired information) regardless of whether the Web pages formatted on the vendor site (in this example, www.800.com) are in native character strings of any language, or in natural language or coded in HTML, XML, cXML, Java, etc.

The labeling of the content of a training page is represented more generally in FIG. 9. In the first column, the information being labeled is identified—in this example, product and price are the information being sought. In the second column, the "labels" are identified to which the "tuple" entries correspond—<PRODUCT LEFT DELIMITER, PRODUCT RIGHT DELIMITER> and <PRICE LEFT DELIMITER, PRICE RIGHT DELIMITER>.

After the system administrator has executed the learning system once, it then retrieves the training page from the vendor list in the offline database in compiling a set of possible delimiter candidates in parallel with the compilation with the possible sets of delimiter candidates in FIGS. 10A and 10B. And continually, it uses another set of training page in contemporaneously performing automatically (labeling) computation in real-time, on-the-fly, containing position values, as shown in the above stated example. As the intersection of the two sets of candidates yields a valid candidate set, the Semantics Recognition Learner Agent 18 then chooses one of the valid candidates as a vendor description.

Referring now to FIG. 2, the flowchart 200 illustrates an embodiment of the Semantics Recognition Learner Agent 18 of the present invention. The methodology makes use of three (3) environmental regularities that govern the layout of product descriptions provided in shopping Websites which permit the information extraction to proceed independently of the domain. The regularities include navigation regularity with searchable index, uniformity regularity, and vertical separation regularity.

Figure 11:
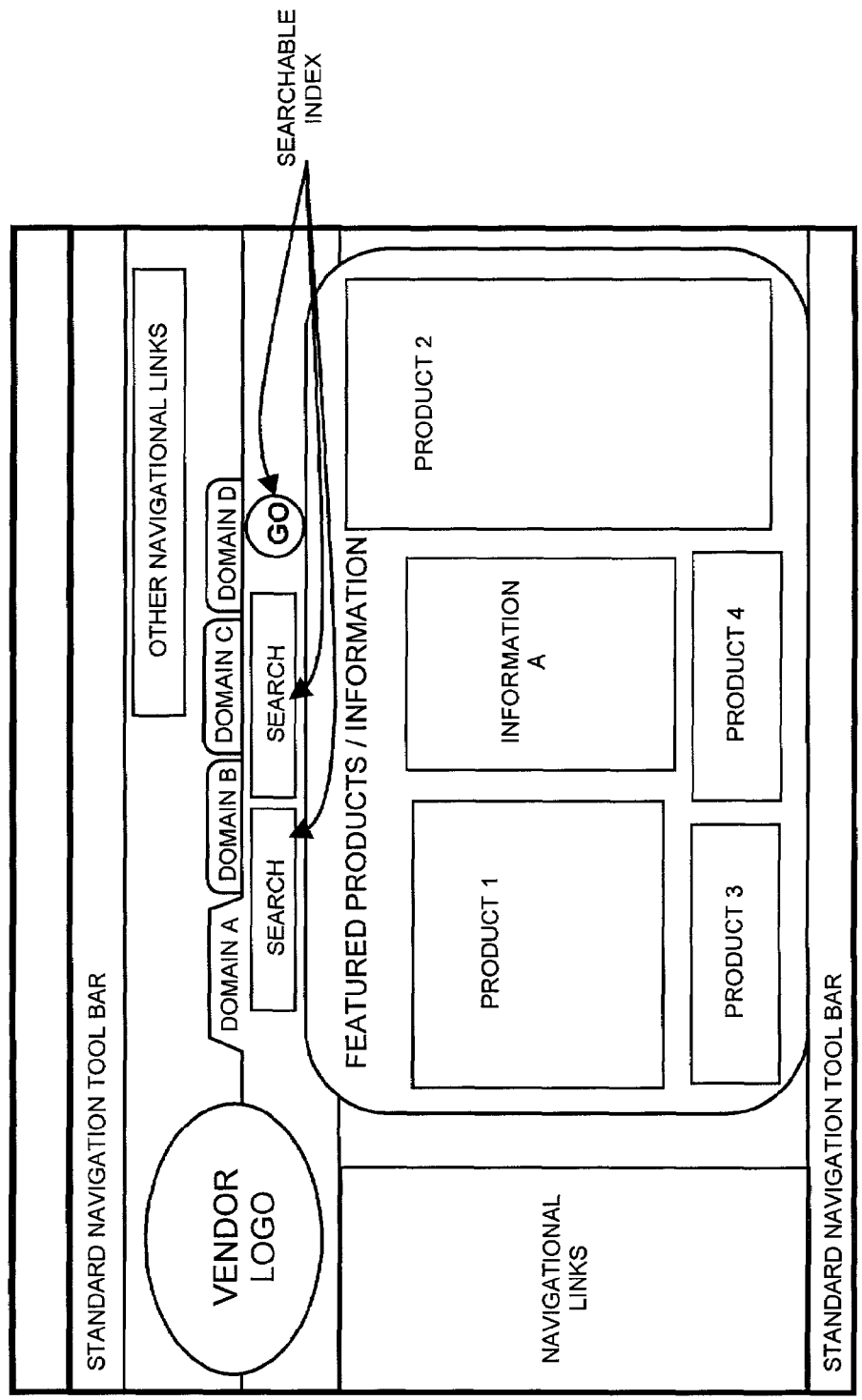
FIG. 11 is a simplified depiction of a Web page's screenshot having Navigational Regularity with a searchable index and product domain fields for easy access to a specific inquired database in accordance with the present invention.

As to navigational regularity, online stores or vendor sites are designed to service consumer and business buyer inquiries. Thus, almost all online vendors provide a searchable index for easy access to specific inquired database. Using the searchable form of a vendor site enables the Semantics Recognition Learner Agent 18 to generalize the formatting fashion of multilingual home and Web pages. FIG. 11 is a simplified drawing depicting a home page with a searchable index and product domain fields.

Figure 12:
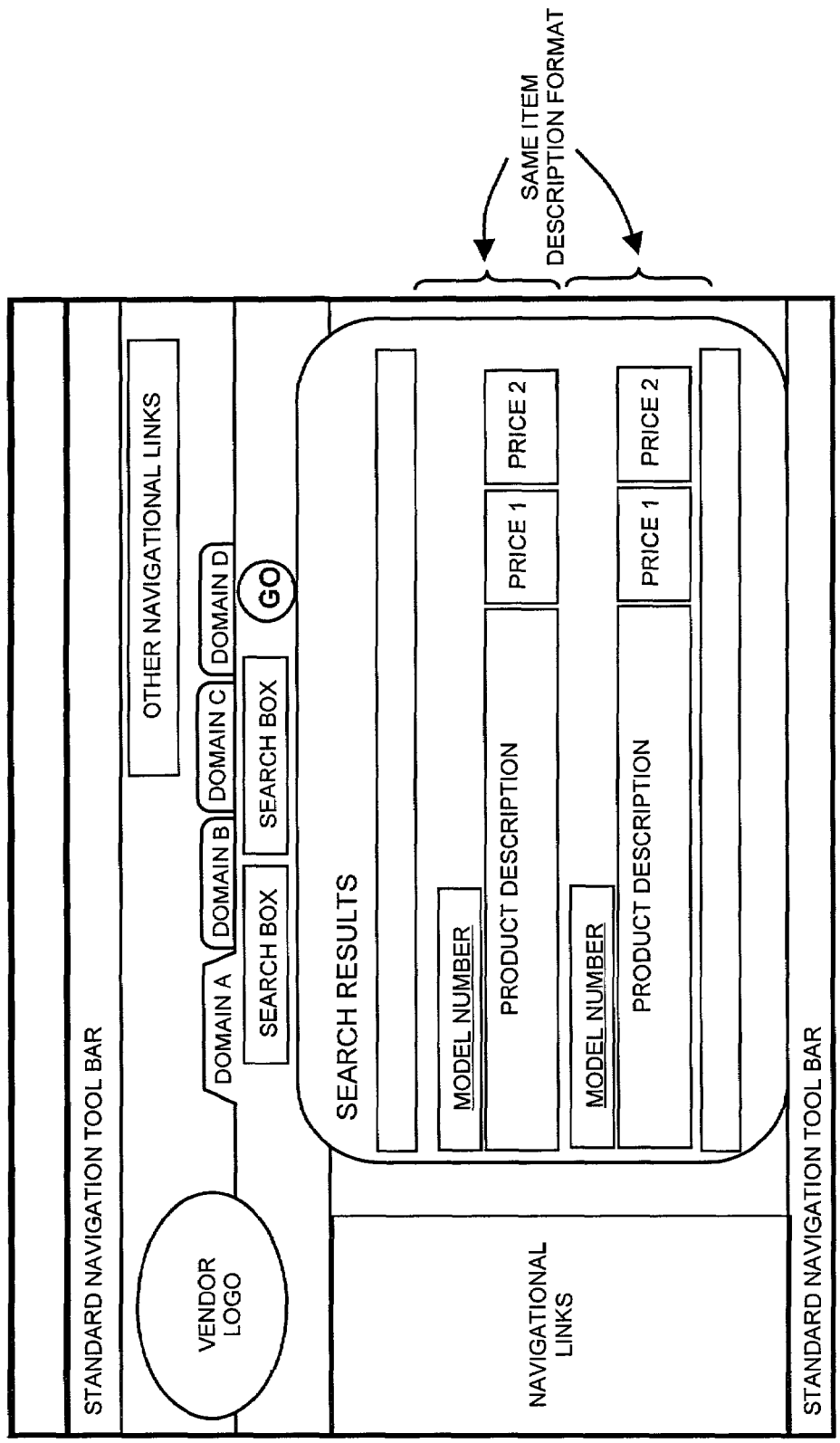
FIG. 12 provides a simplified depiction of a screenshot of a Web page that illustrates the use of Uniformity Regularity with all items typically laid out in a simple consistent format. In the page is a frame, and the frame contains the search results of the information inquired about, which results are formatted uniformly.

With regard to uniformity regularity, although online stores or vendors differ widely from each other in their product description formats, any given online vendor typically lays out all item descriptions in a simple consistent format. FIG. 12 is a simplified drawing of a Web page's screen depicting the layout of search results formatted uniformly. Thus, it can be seen that each search result listed begins with a "model number" string below which is provided a "product description." Besides, a "PRICE 1" and a "PRICE 2" are to the right of the "product description."

Figure 13:
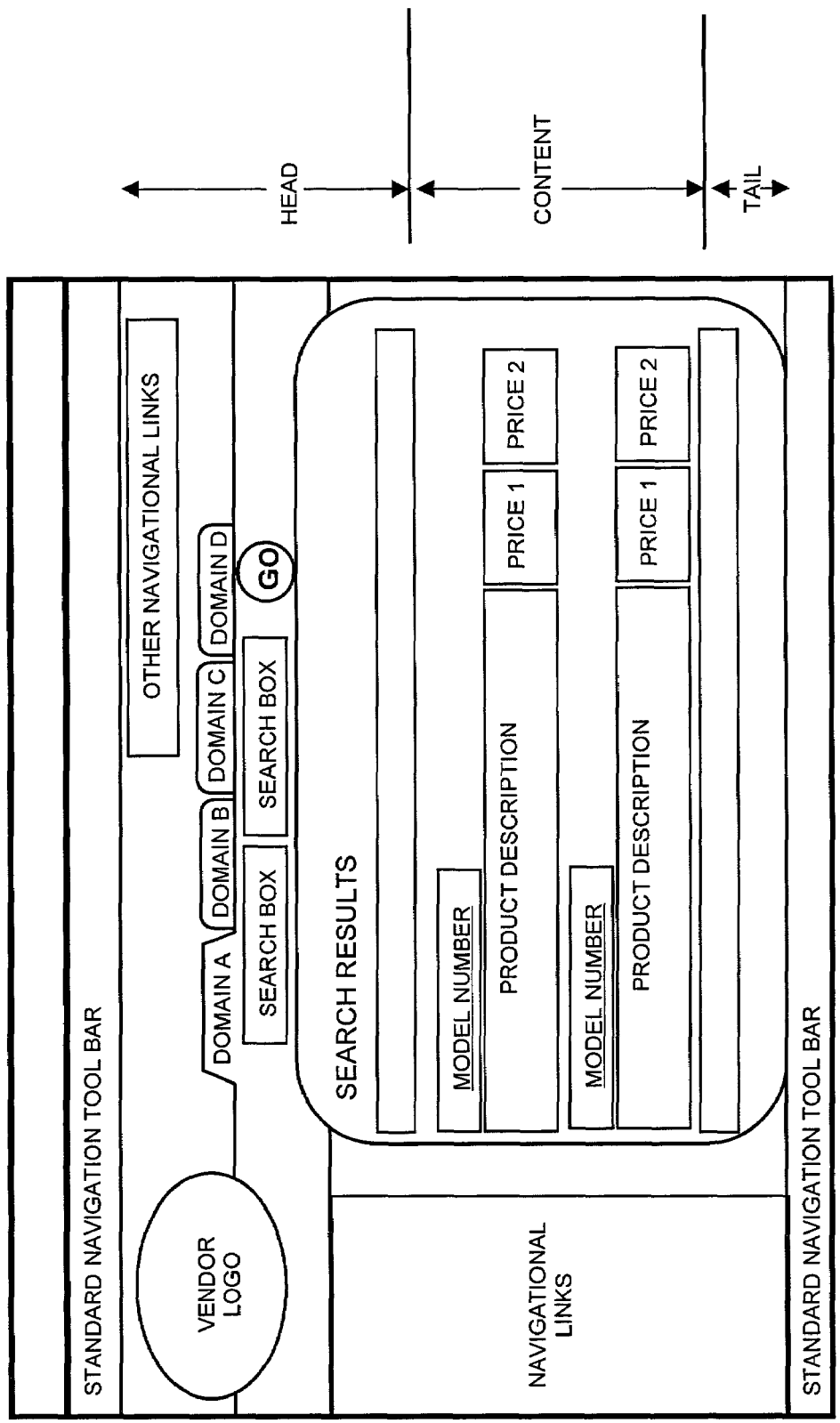
FIG. 13 is a simplified depiction of the same screenshot, as shown in FIG. 12, that illustrates the use of Vertical Separation Regularity with the search results displaying aligned catalogs of products which are positioned in the center between the head and tail.

FIG. 13 provides the simplified drawing of the same screen for the search results that illustrates the use of vertical separation to display catalogs of products. This vertical formatting can be classified as the head, content, and tail of the document.

As originally devised the information infrastructure of the Internet—site architecture, formatting of online vendor's products description and expression of technologies—was intended for use by humans. This is apparent in the use of query mechanisms and output standards which are particularly suited for direct human manipulation. Online vendors comply with these regularities because they enable online sales to human shoppers or buyers. Although there is no guarantee that what makes an online store easy for humans to navigate will make it user-friendly for an intelligent software agent to master, the system—online intelligent information comparison of multilingual electronic data sources—of the present invention is designed to take advantage of these regularities.

In accordance with the present invention, wrapper construction is implemented through an inductive learning process. The methodology learns a vendor's wrapper by reasoning about a sample of the vendor's Web pages. In the methodology of the present invention, instances correspond to the vendor's pages, a page's label corresponds to its relevant content, and hypotheses correspond to the constructed wrappers.

Besides, in accordance with the present invention, an efficiently learnable wrapper class, such as the HLRT wrapper class, is incorporated.

Figure 15A:
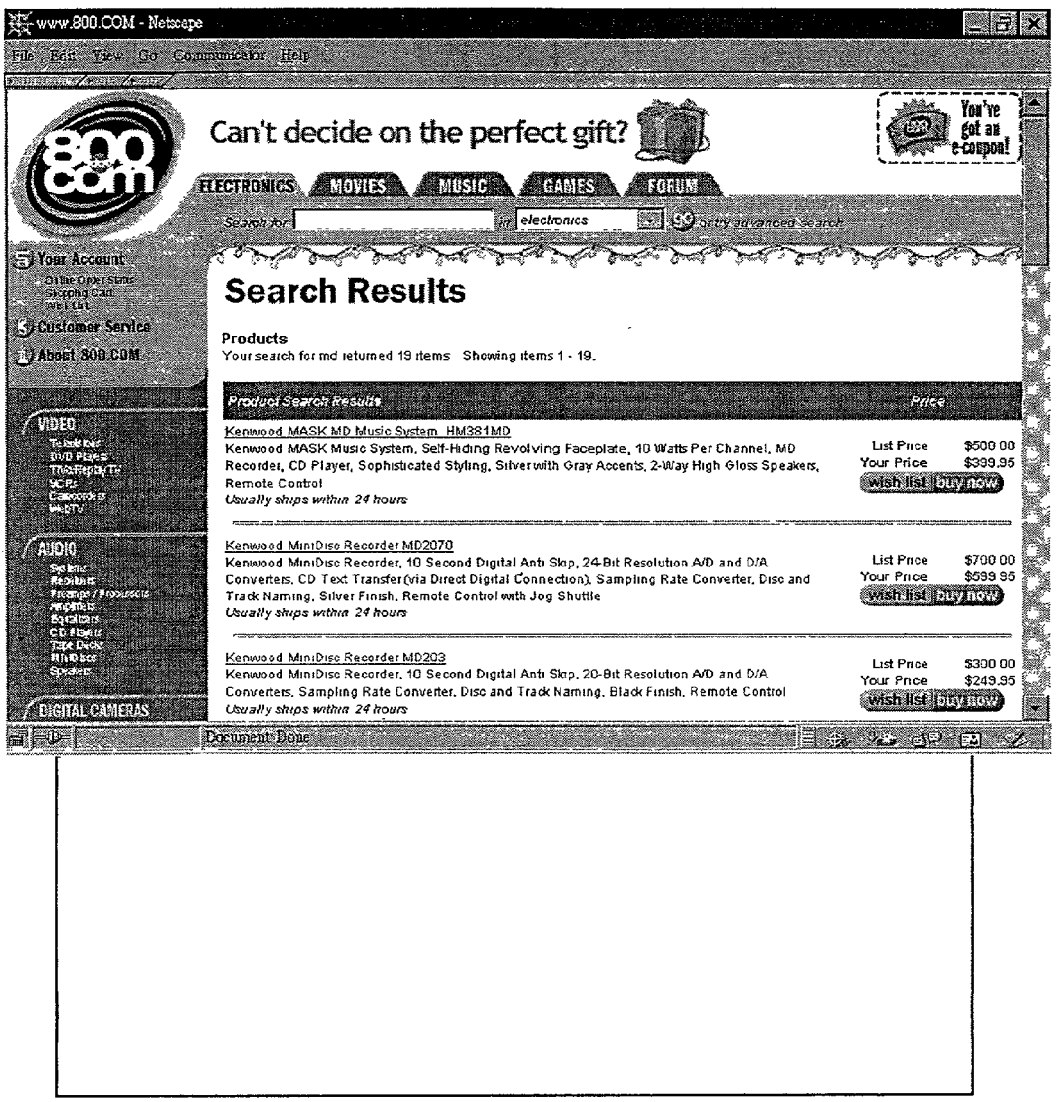
FIG. 15A is a screenshot that displays the search results for the keyword "electronics" on the vendor site "www.800.com," in which each product is summarized in a brief introduction of its features and functions (left and center of the aligned frame) and the relevant "List Price" and "Your Price" information appear on the right side of the aligned frame, and which information the intelligent price recognizer of the Semantics Recognition Learner Agent of the present invention can distinguish during the learning process of the vendor descriptions.

Furthermore, in order to make sure that the methodology performs well, noise-tolerant techniques are employed when training data exhibit high levels of noise. For instance, given the screenshot example of www.800.com in FIG. 15A, an intelligent price recognizer can distinguish between "List Price" and "Your Price." The recognized instances are then corroborated to label the entire page. Consider a recognizer for items and another for price, corroboration produces a Label methodology that labels pages containing pairs of these attributes.

In effect, vendors attempt to create a sense of identity by using a uniform look for all types of products. To exemplify, a vendor presents an MD product information in the same format as a DVD product. By taking advantage of this regularity, every product is assumedly described in the same format.

The Semantics Recognition Learner Agent 18 in FIG. 2 learns a wrapper only from a specific domain of examples and attempts to fit this domain to all other domains (all other product categories in entirely different ontological terms) organized in consistent format and catalogued online on all the rest of Websites in the 245 Internet-connected nations on the World Wide Web. Thus, it is feasible for the Semantics Recognition Learner Agent 18 in FIG. 2 of the present invention to maintain a thoroughly updated nomenclature of a global products databank without writing code onto modules of a SQL-compliant database nor manually entering each product in every domain onto a Microsoft Access database.

Figure 6:
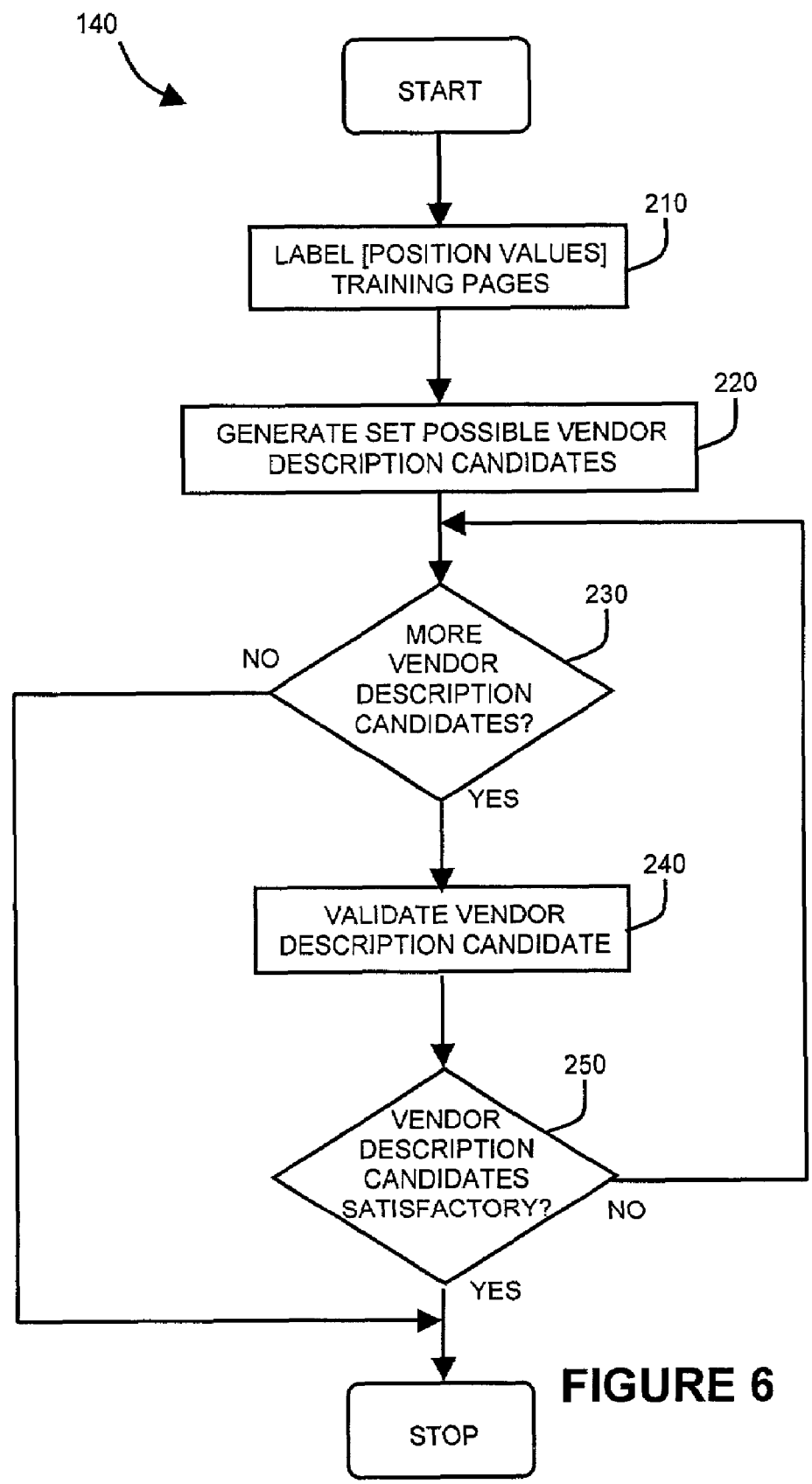
FIG. 6 is a flowchart 200 of an overview of how the Semantics Recognition Learner Agent (SRLA) performs inductive learning and generates a generalized cross-page valid vendor description.

Continuing with FIG. 6, in step 210, the Semantics Recognition Learner Agent 18 generates a set of labels to represent the content of the training page. Stated in another way, the methodology of labeling position values is to identify the location of information for the training products in the training page. Again, the Semantics Recognition Learner Agent 18 in FIG. 2 automatically generates labels in real-time on-the-fly containing position values as follows:

$$L = \left\{ \begin{array}{ll} <b_{1,i}, \ e_{1,i}>, & <b_{1,p}, \ e_{1,p}> \\ <b_{2,i}, \ e_{2,i}>, & <b_{2,p}, \ e_{2,p}> \\ <b_{3,i}, \ e_{3,i}>, & <b_{3,p}, \ e_{3,p}> \\ <b_{4,i}, \ e_{4,i}>, & <b_{4,p}, \ e_{4,p}> \end{array} \right\}$$

For further detail, see the right-hand column in FIG. 8.

In step 220 the Semantics Recognition Learner Agent 18 performs inductive learning on the retrieved training pages using the associated labels to output a set of possible "vendor description" candidates. Since the candidates are generated from a particular training page with specific training data, there is no way the candidates can be invalid for those pages. However, if the candidates are to be valid throughout the vendor's entire site, a cross page validation should be performed to derive a generalized vendor description which will be valid across the vendor's site.

In step 240, a vendor description validator (VDV) validates a possible vendor description candidate against another set of training pages (retrieved in step 130, FIG. 3). If a vendor description is satisfactory, the learning process will stop, see step 250, otherwise the validation process will continue to refine the vendor description selection by using the rest of the candidates and looping back through steps 230, 240 and 250. One criteria for a "satisfactory" vendor description is that the candidates for each subsequently analyzed training page are the same in number and character as for the previous training page. If a subsequently analyzed training page has a different number of candidates, then another training page should be analyzed.

FIGS. 10A and 10B provide as examples of vendor description candidates left and right delimiters for the Item description, the Price information, the Head, and the Tail of a training page. An example of a "vendor description" is provided in FIG. 5, which includes delimiters identified for the Head, Tail, Item, and Price information of an example page.

Training data for use with a particular vendor is preferably compiled by the system administrator 26. As will be described in further detail herein, to add a specific vendor to the system of the present invention, the vendor's name, vendor's URL, submit form's URL, domain data for the corresponding training examples are provided and stored in the offline database 24, which can be, for example, a Microsoft Access database. The vendor's name will be the primary key of a record. Manual wrapper input can be provided as an option. In order to provide an accurate set of data for the training example, which in turn will greatly enhance the accuracy and efficiency of the vendor information learned by the Semantics Recognition Learner Agent 18 in preparing itself for generating vendor descriptions in real-time, automatically, on-the-fly, it is important that the system administrator, or other individual, who prepares the training example data be knowledgeable about Web page URLs, and domain name setup, be somewhat knowledgeable of the native language used in any multilingual vendor's Website being processed, and be able to identify the information types which are targeted for learning. This person need not be knowledgeable about coding.

Once a vendor's information is provided, administrator 26 can run the Semantics Recognition Learner Agent process for each vendor. After the administrator has executed the Semantics Recognition Learner Agent 18 one time for a vendor, he or she then navigates through the learning process with a step-by-step walkthrough of the screens of the Interactive-Agent-Character Learner Interfaces (IACLIs) in running any desired options as shown in FIGS. 16 through 23. Ultimately, the result set of "vendor descriptions" that are retrieved from returned trained pages, will then be stored in the offline database 24, such as a Microsoft Access database. To delete/remove a specific vendor, the administrator may delete the record directly from "vendor list" or "vendor description list." To modify/edit a specific vendor, the administrator may modify the record from the "vendor list" or "vendor description list" in the database.

In a nutshell, the Semantics Recognition Learner Agent 18 of the present invention generates a vendor description that is unique to a particular vendor. The vendor description is the set of generalized rules of how a vendor organizes its product information in a specific format. Hence, the input to the wrapper construction system of the present invention is essentially a sample of the behavior of the wrapper to be learned. Under this formulation, wrapper construction becomes a process of reconstructing a wrapper based on a sample of its behaviors.

Figure 14:
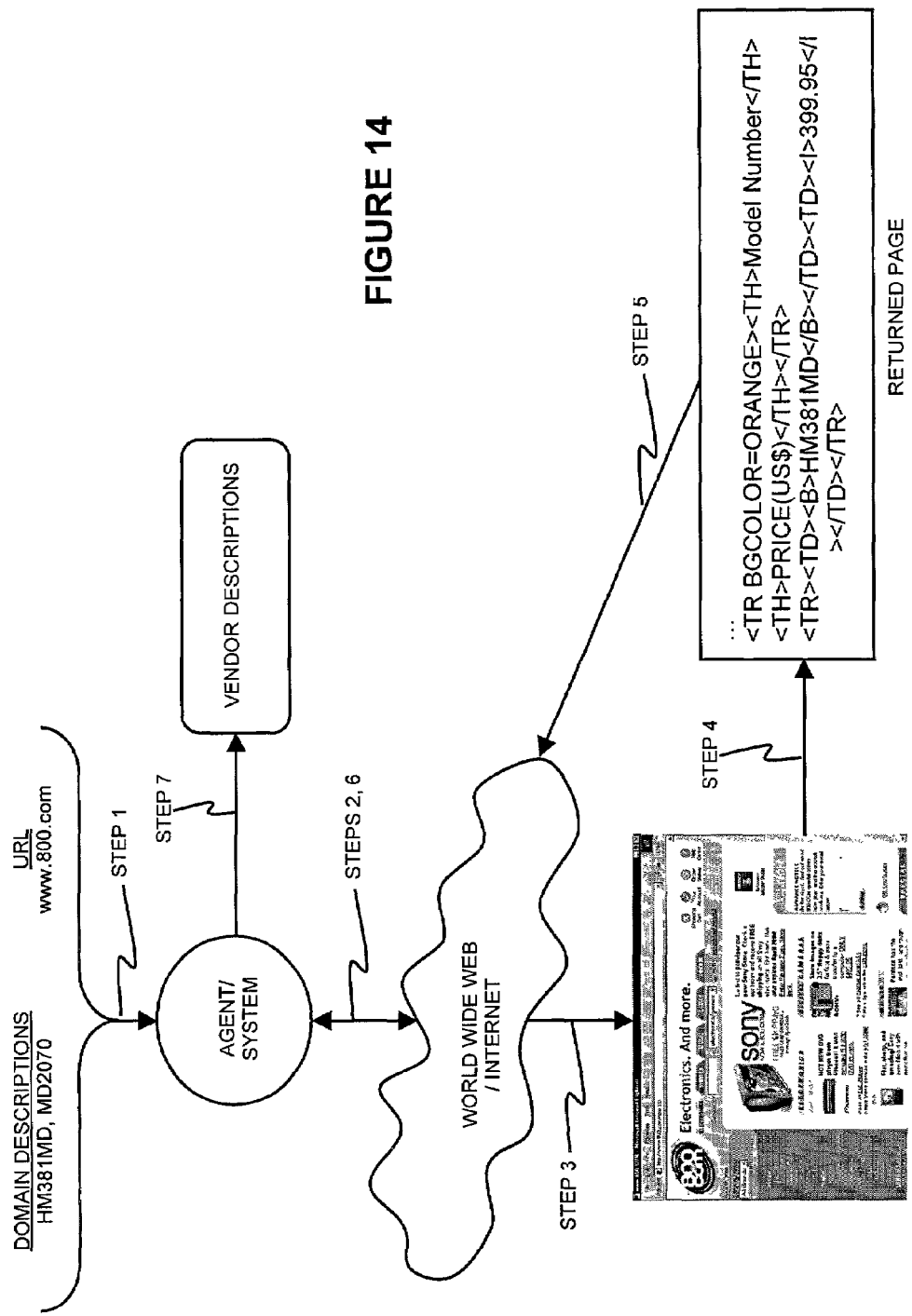
FIG. 14 is a generalized illustration of the operation of the Semantics Recognition Learner Agent of the present invention.

The methodology of the Semantics Recognition Learner Agent (SRLA) 18 is summarized in FIG. 14 by way of a simplified example. In step 1, two pieces of information are fed into the system in order to conduct the wrapper induction: (1) the URL of the vendor's Website (e.g. http://www.800.com), and (2) the domain description, which contains some of the training examples of that particular domain. For example, a domain description may be "electronic products," and a record of that domain may be "Sony HM381MD," which is a model number used to fill-in a vendor's search form. In steps 2 and 3, the Semantics Recognition Learner Agent 18 automatically goes through the Internet to the vendor's Website using the URL and the domain/model number from the training examples. For the specific example, the Learner Agent will go to www.800.com's Web page according to the URL provided in step 1. Then it will fill-in the necessary product information (i.e. domain description—"electronic products" and "HM381MD") in the relevant search form. Finally, it will "submit" the search form to request a search and await a response.

Referring to step 4, a result page is returned according to the searching criteria. The result may be a successful result page with relevant product descriptions, or may be a failure page. It is to be noted that the content of interest in the returned page are the HTML codes, the item description, the item price, and the locations of such information with respect to the HTML codes.

In steps 5 and 6, the search result page is returned by way of the Internet to the Learner Agent 18 for analysis. In step 7, the analysis conducted is called "Wrapper Induction," in which the page is generalized to a set of layout and formatting rules that the vendor follows to present its product description in a logical manner. With these rules, during the Semantics Recognition Buyer Agent process of the present invention, the Buyer Agent 20 may extract product information from the same vendor when a user/buyer is searching for some product information from the same domain on the vendor site.

It is to be understood that in accordance with the present invention, the Semantics Recognition Learner Agent process will be performed for each vendor from which a vendor description is desired. Because of the information delimiter approach used by the present invention, vendor descriptions can be obtained from any vendor sites in any language—concisely, although the language presented to a user might be of a particular native character string, the underlying codes which can be identified as delimiters for the desired information, remain the same regardless of the native character strings of the language. In other words, information of the vendor descriptions will be obtained from a vendor site in the native language used by that site. There is no need for any translation of the native language used into a standard language. Moreover, because the delimiter candidates identified for each vendor site are not coded in underlying codes of the programming language used for that site, subsequent searching can be done without the need for different programming languages used among the sites to be searched for. This permits the Semantics Recognition Buyer Agent 20 to conduct searches on multilingual and multiple domains (product categories) bases, and independently of any programming language.

Figure 15C:
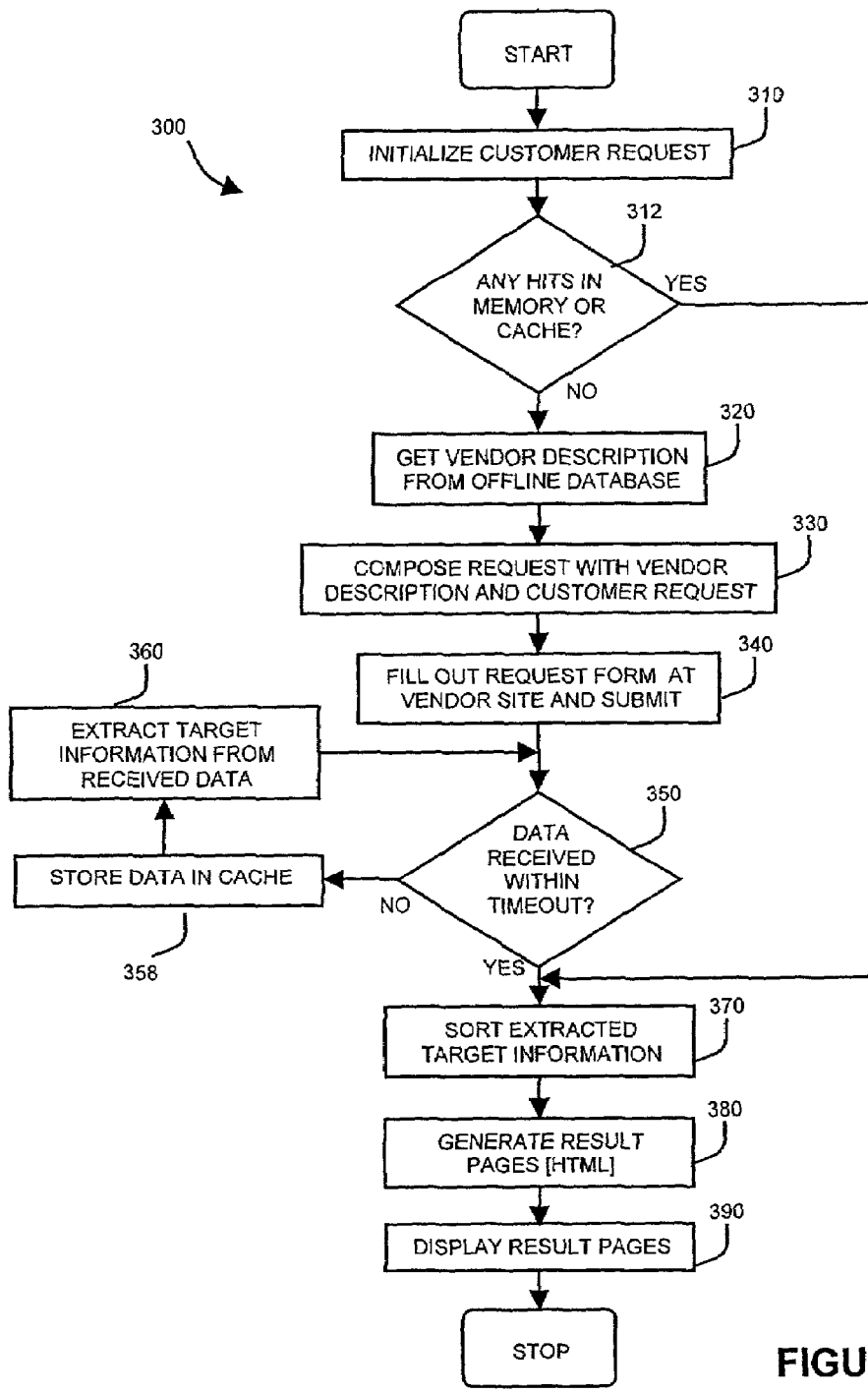
FIG. 15C is a flowchart 300 of an overview of how the Semantics Recognition Buyer Agent (SRBA) 20 in FIG. 2 interacting with a vendor description to respond to an online buyer's/user's request for price comparison for one, up to all, available online multilingual vendors.

Referring to FIG. 15C, flowchart 300 illustrates an embodiment of the Semantics Recognition Buyer Agent 20 of the present invention. In step 310, the Buyer Agent 20 receives a request from a buyer/user 12 in FIG. 2, who wants a price comparison for a product. In step 310, the Buyer Agent 20 also preferably establishes a connection to the buyer/user 12 with an ActiveX component for the communication. The user 12 must provide at least one parameter that may contain, for instance, the desired product name, the range of the desired price, the target online vendor or the sorting criteria. Step 312 checks to see if there are any "hits" in memory or cache containing the desired information of the identified vendor site; if yes, the Buyer Agent will go to step 370 for sorting extracted target information. The Buyer Agent will then go to step 380 to generate result pages from the target information in HTML, and then in step 390, the Buyer Agent will display the result pages to the online human user/buyer.

If any "hits" are not found in step 312, step 320 will invoke the Buyer Agent 20 to use the input parameters to retrieve the vendor descriptions from the offline database 24. These "vendor descriptions" are the ones previously defined by Semantics Recognition Learner Agent 18 during the vendor descriptions learning process. In step 330, Buyer Agent 20 will compose a user's new request to access different online vendors identified in the "vendor description list." The composed user's new request will be based on the parameters given by the user and the data in the vendor descriptions. Preferably, if there are N online vendors to whom a request (such as a product model request) will be made, there will be N new requests to be composed by the Semantics Recognition Buyer Agent 20.

The Semantics Recognition Buyer Agent 20 uses the vendor descriptions to get the price information from the vendor site in real-time. The Buyer Agent 20 uses the vendor's URL and the vendor's name that are included in the information that makes up the vendor descriptions, to navigate to the vendor's site. Also included in the vendor descriptions is the search form URL for the vendor. In step 340, after navigating to the vendor site, the Semantics Recognition Buyer Agent 20 "virtually" fills-in the vendor search form based on the user's new request, and "virtually" presses enter to submit it. This is done for each of the identified online vendors.

As mentioned above, the vendor descriptions in the offline database 24 include a field that provides information of the vendor's search form URL, such as "http://www.onlineshop.com/search.asp?item=." The Semantics Recognition Buyer Agent 20 uses the user's input parameter(s) and the search form URL to compose a new HTTP request for each of the identified online vendors. For instance, if the user wants to buy a "hard disk," the new request composed by the Semantics Recognition Buyer Agent 20 will be as follows:

"http://www.onlineshop.com/
search.asp?item=harddisk,"

and the Semantics Recognition Buyer Agent 20 will send this HTTP request to the online vendor as if the user submitted the request himself. If there are N identified vendors, the Semantics Recognition Buyer Agent 20 will initiate N threads to fill-in the search form for each of the N identified vendors. The Semantics Recognition Buyer Agent 20 preferably proceeds in parallel to each online vendor's searchable index, fills it in and submits a search request.

In step 350, the Semantics Recognition Buyer Agent 20 will wait for the response from the online vendor within a specified timeout or a user-defined timeout. If a timeout occurs, the Semantics Recognition Buyer Agent 20 proceeds to step 370; otherwise it will go to steps 358 and 360 to further process the received search result data.

Within the timeout period, the Semantics Recognition Buyer Agent 20 collects the search request's responses from different online vendors. In step 358, the Semantics Recognition Buyer Agent 20 receives the search result responses from the online vendors and stores them in cache or memory within the server 22. In step 360, the data of interest is extracted from the received responses. The Semantics Recognition Buyer Agent 20 extracts the desired data using the information in the vendor description list stored in the vendor description 28 or offline database 24. To exemplify, the vendor descriptions include fields that identify the codes for left and right wrappers. Firstly, the Semantics Recognition Buyer Agent (SRBA) 20 will use the left wrapper information to locate the start of the valid data in the response page. Afterwards, the data at the exact location (as defined by the information in the vendor description list) of the target data will be extracted and stored in the memory. (Recall that the information in the vendor descriptions are what have been learned by the Semantics Recognition Learner Agent 18 during the learning process of FIGS. 3 and 6.) The extraction of the target data will be repeated until the end of the page.

In the extraction process, for example, the product description and the product price will be extracted. It is to be understood that the information contained in the vendor descriptions defined by the Semantics Recognition Learner Agent 18 are domain independent and multi-language dependent. For example, assuming that the online buyer or user's platform uses a Windows 98 Operating System and is running a language version "B" (or preferably his or her platform is running Windows 2000 Professional in the English version and/or his or her platform has a Personal Web Server version "B" installed), the Microsoft Internet Explorer will prompt him or her to download "B" language display software after he or she logs on to the portal of the present invention. After the online buyer or user "A" enters a product model in the native characters of language "B" as a keyword in the text box provided at the portal of the present invention, the Semantics Recognition Buyer Agent 20 in FIG. 2 will perform the data extraction using pre-described example data (retrieved earlier in the vendor descriptions after real-time wrapper induction learning) and which contain native character string for the product model in language "B." These vendor descriptions are stored in the pre-defined data structure in the vendor description list in the offline database 24 (preferably a Microsoft Access database). The data extraction involves contemporaneously searching for "hits"—which contain price, description, and the related information of the product from the previous search results—that reside in the memory or cache stored in the server 22 using the exact native character string for the product model in language "B" entered by the user as exhibited in FIG. 15C, step 312. Because the character string in language "B" is in the specific native language, any "hits" that are found will be for that identified vendor site using the native language "B" and having the character string in language "B."

Recall that in step 7 of FIG. 14, during the learning process, the vendor descriptions are stored in the vendor description list in the database 24 (preferably a Microsoft Access database) or database server 22 (preferably an Microsoft SQL-complaint database server) after the Semantics Recognition Learner Agent 18 in FIG. 2 has learned the wrapper from the online vendors. Because it is inefficient for the Semantics Recognition Buyer Agent 20 to retrieve the data of vendor descriptions each time upon request for the online human buyer/user, the vendor descriptions preferably will only be retrieved from the offline database 24 or server 22 if it is the first time the Semantics Recognition Buyer Agent 20 requests a search-match-extraction of a desired set of them. Then the vendor descriptions will be stored in the memory or cache for more instantaneous retrieval and use in other later requests from the Semantics Recognition Buyer Agent 20 for the same or new online user.

The vendor descriptions in memory or cache are preferably automatically updated once a day.

In other words, the Semantics Recognition Buyer Agent (SRBA) 20 can use the data in the vendor descriptions to locate target data in different domains and different languages. This is because, for a particular vendor, although the language may change, the underlying coding corresponding to the target information will not. As the three "formatting regularities" predominate most vendor sites, such as B-to-C, C-to-B, C-to-C online stores, etc., different domains on a vendor site will consistently use the same formatting and underlying coding to present the target information, such as item description and price.

Therefore, for each returned search response, the Semantics Recognition Buyer Agent 20 will perform the data extraction using the vendor descriptions. If the time is out, the Semantics Recognition Buyer Agent 20 will go to step 370, in FIG. 15C. In step 370, the Semantics Recognition Buyer Agent 20 sorts the extracted data from different online vendors based on the user defined sorting criteria. If the user does not define the sorting criteria, the default will be the price of the product. Alternatively, the sorting criteria can be to identify the best price found, and to present to the user/buyer only the information from the vendor with the best price. (Incidentally, other sorting criteria can be used.)

After the sorting is done, the Semantics Recognition Buyer Agent 20 will go to step 380. In step 380, the Semantics Recognition Buyer Agent 20 composes HTML pages based on the filtered and sorted data from step 370. In step 390, Semantics Recognition Buyer Agent 20 responds to the user request by presenting the composed HTML page as a "result" page to the user using the ActiveX component established previously.

If time is not out in step 350, the Semantics Recognition Buyer Agent 20 will go to step 358. In step 358, the Semantics Recognition Buyer Agent 20 stores data of the search results pages in the memory or cache for use in instantaneously responding to further new requests of the same user/buyer or to the request of a new user/buyer. Following step 358, the Semantics Recognition Buyer Agent 20 will go to step 360 in which it extracts target information from the search results pages, sorts the results in step 370 and the extracted data retrieved from different online vendors based on the user-defined sorting criteria, then composes HTML pages in step 380 based on the filtered and sorted data from step 370, and finally in step 390 responds to the user/buyer using the ActiveX component established previously.

The default language of the Semantics Recognition Buyer Agent 20 is English. By default, the Semantics Recognition Buyer Agent 20 will go to all vendors when it receives the request of a user. When the responses return, the Semantics Recognition Buyer Agent 20 will use the vendor descriptions which have already been learned by the Semantics Recognition Learner Agent 18 to filter out invalid results.

In another embodiment of the present invention, the vendors can be classified to the user's locale so that the user 12 can choose an "advanced search" to search for that classified group of vendors.

The employed methodologies of the present invention are multilingual in nature. When the Semantics Recognition Learner Agent 18 learns a vendor site, such learning can be performed in the native language of that site. The results which are retrieved and used to populate the vendor descriptions for that site will be in the native language of that site. Thus, when an online user/buyer 12 submits a request in a particular native language in step 310 of FIG. 15C, the Semantics Recognition Buyer Agent 20, in step 312, will look in memory or cache for "hits" using the exact character string entered by the user. Because the character string will be in a particular native language, any "hits" which are found will be for that identified vendor site using the same native language and having the same character string. In view of this methodology, it is to be understood that, in accordance with the present invention, no "translation" step is needed to convert a search request submitted in one language into a "standard" language. By using the native language of the search request, the errors and ambiguities introduced by a translation step are avoided.

The computer program's modules built with the database server's development tool (preferably a Microsoft SQL-compliant database) used in the preferred embodiment of the system of the present invention are standard and the present invention can be used with any relational database, such as SQL database servers from Oracle Corporation of Redwood Shores, Calif., Sybase Corporation of Emeryville, Calif., and others, that support ODBC. As mentioned above, multi-threading for concurrent searching is important to the preferred embodiment of the present invention. In that regard, use of a Windows NT 4.0 platform (a product of Microsoft Corporation) can provide such a multithreading capability.

Figure 16:
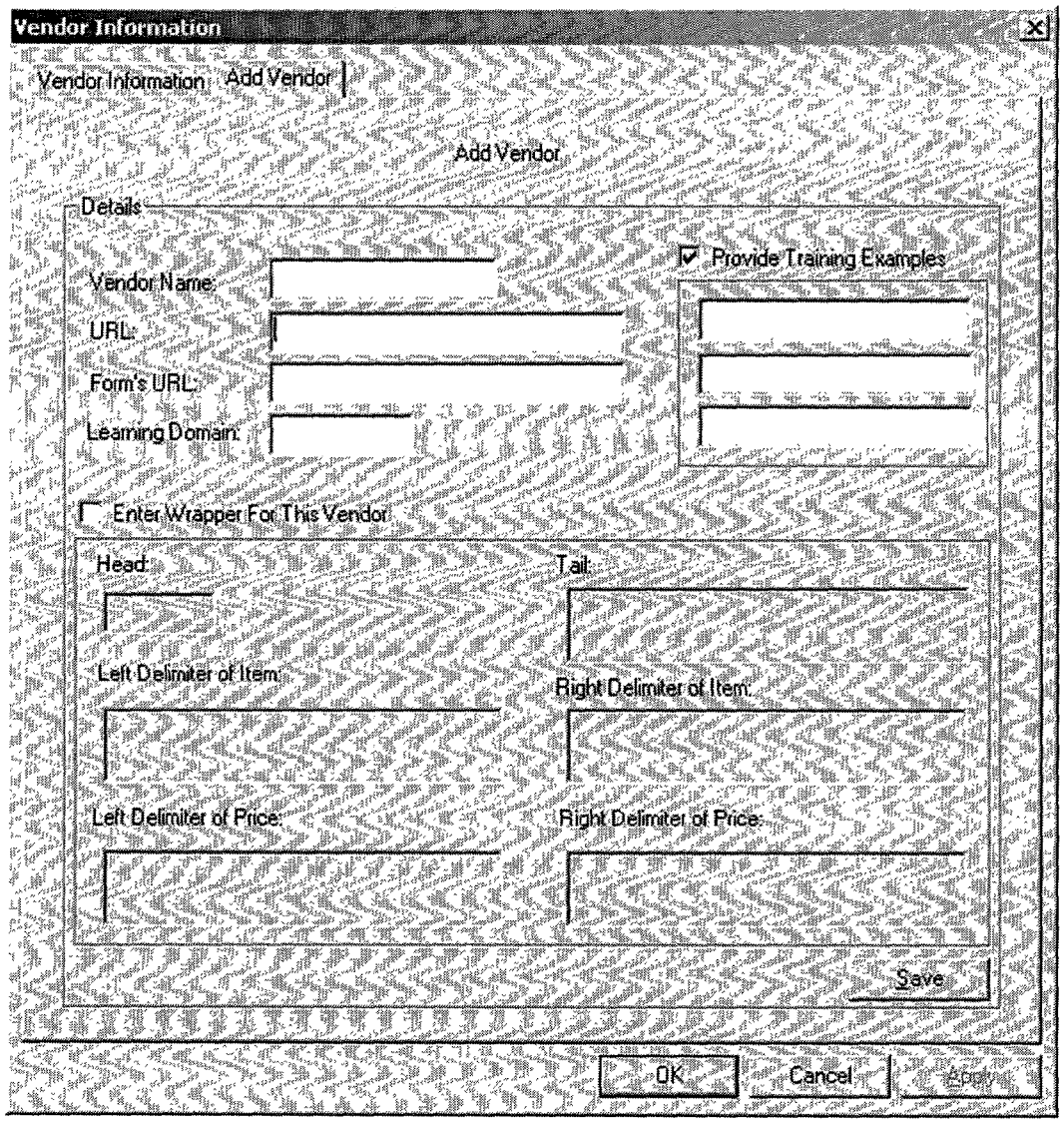
FIG. 16 is an example of an Interactive-Agent-Character Learner Interface screen that can be used to obtain training information for use in the present invention.
Figure 17:
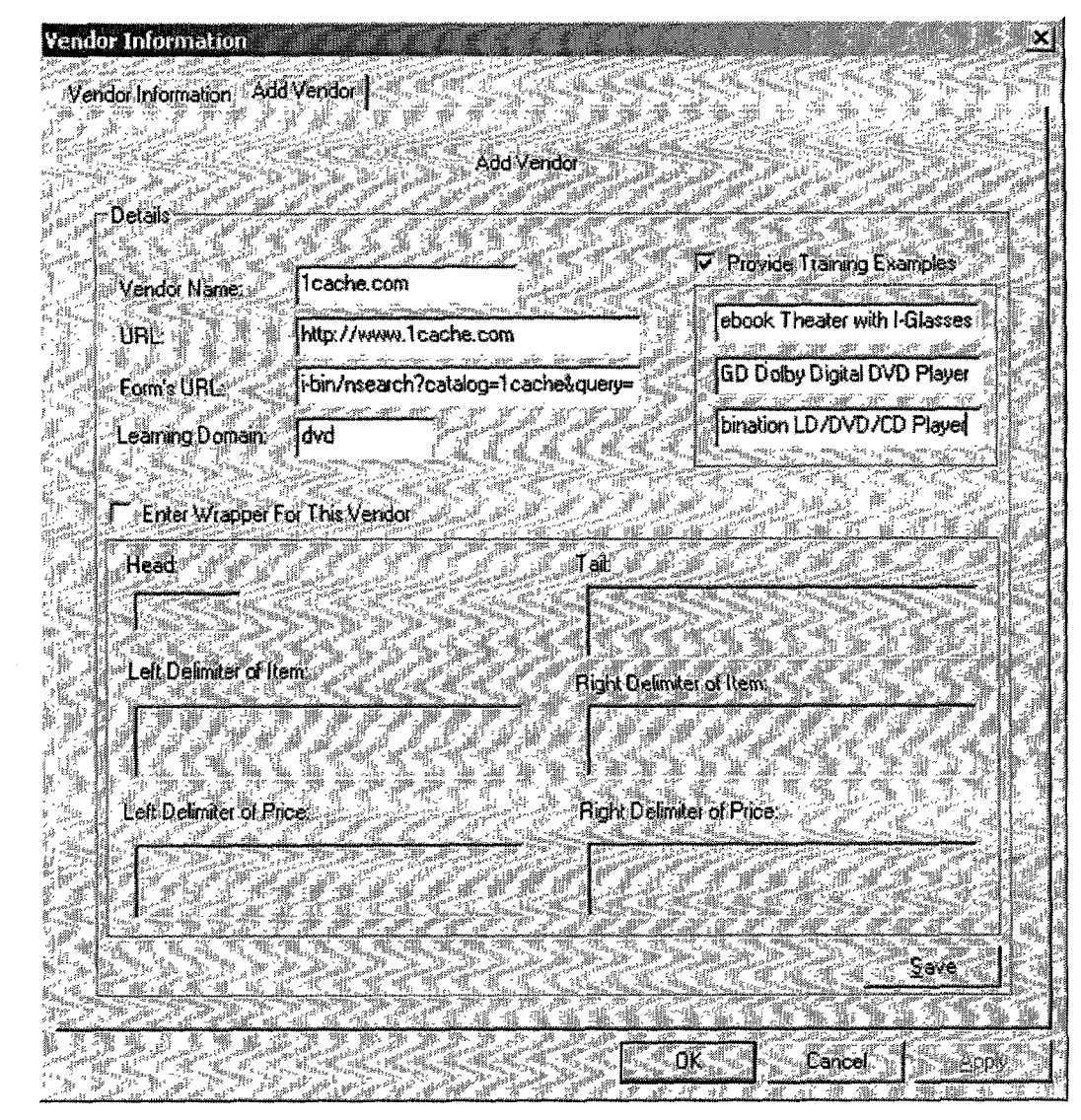
Figure 18:
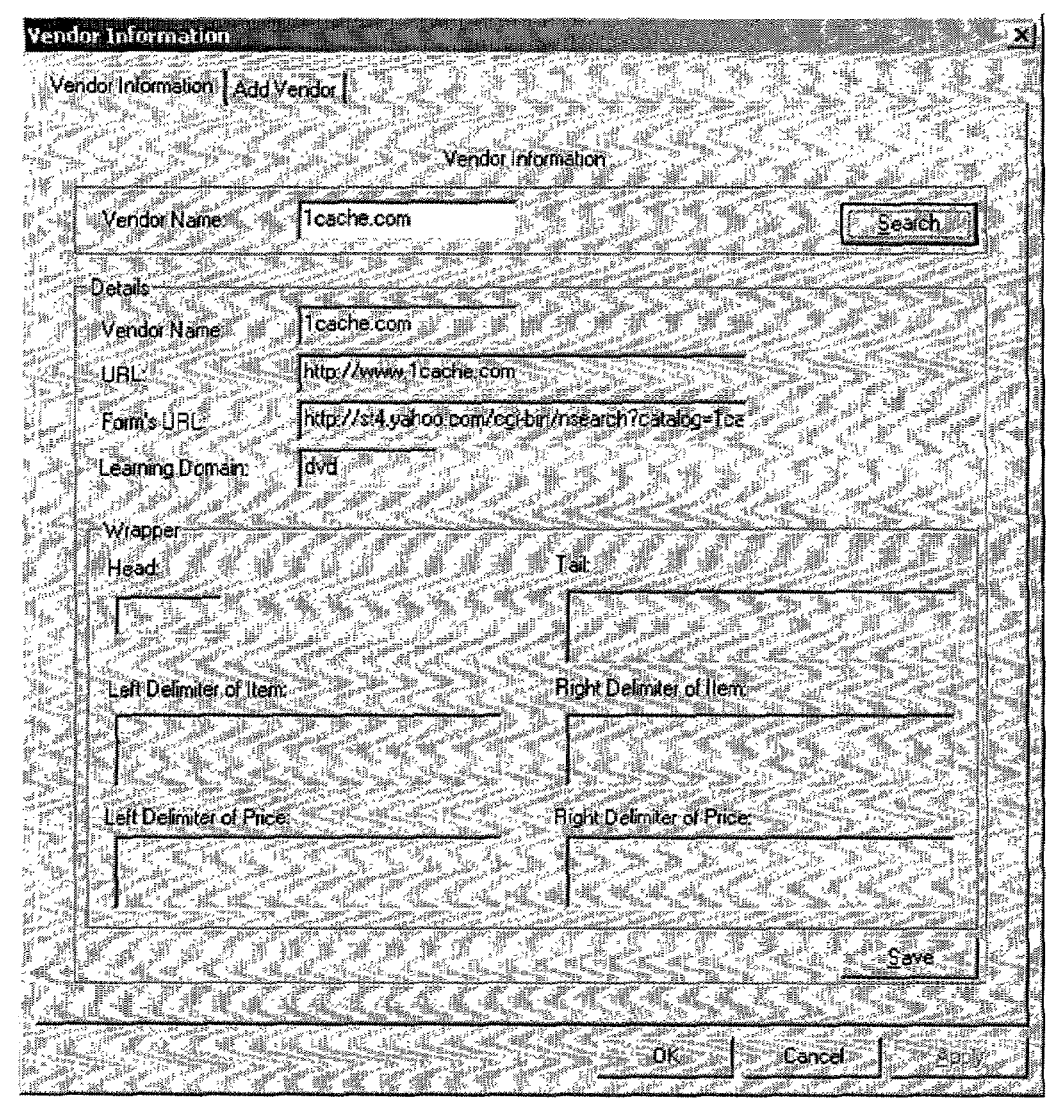
Figure 19:
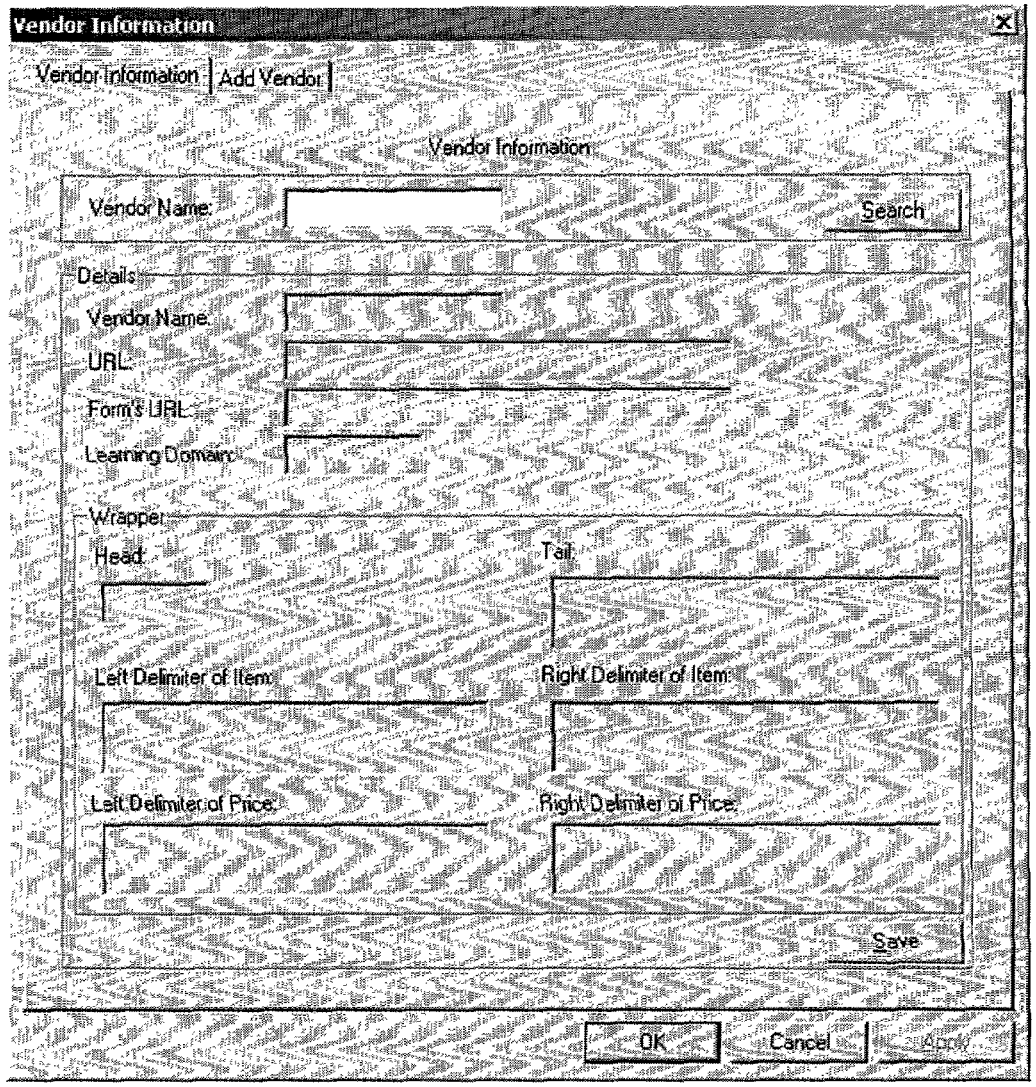

Referring now to FIGS. 16 through 23, the compilation or preparation of training data in the "vendor list" 27 and the data of vendor descriptions in the "vendor description list" 28 will be elaborated in greater detail. FIG. 16 is an actual screen of the Interactive-Agent-Character Learner Interface (IACLI) that can be used to obtain training information for use in the present invention. Using the screen corresponding to the "Add Vendor" tab as shown in FIG. 18, data entry points are provided for entry of information obtained by the system administrator after the administrator's review of the vendor Website, "1cache.com." Thus, in FIG. 17, an example is provided in which such information has been entered for the vendor "1cache.com." This information includes as shown below in the right column:

| | |
|---|---|
| Vendor's Name | 1cache.com |
| Vendor's URL | http://www.cache.com |
| Vendor's Search Form URL | http://st4.yahoo.com/cgi-bin/nsearch?catalog=1cache&query= |
| Learning Domain | Dvd |
| Training Examples | i). DVD Virtual Notebook Theater with I-Glasses |
| | ii). JVC XV523GD Dolby Digital DVD Player |
| | iii). Pioneer DVL-919- Combination LC/DVD/CD Player |

The above information is then saved to the vendor list 27 as training data in the offline database 24. It is to be noted that the training examples that have been entered are a list of specific products which will be searched for during the training process in real-time on the designated identified vendor site from which training pages will be obtained. The "vendor descriptions" will then be "learned" from these returned training pages.

The information can then be displayed on the screen as shown in FIG. 18 corresponding to the "Vendor Information" tab. The "Vendor Information" screen interface (see FIG. 19) provides a "Search" function for the Vendor Name. By entering a vendor name and pressing the "Search" button, the Vendor Information for the vendor entered is retrieved from the offline database 24 and displayed. On this "Vendor Information" screen, it is to be noted that the "Wrapper" fields—"Head," "Tail," "Left Delimiter of Item," "Right Delimiter of Item," "Left Delimiter of Price," and "Right Delimiter of Price"—are empty. These wrapper fields are to be "learned."

Figure 20:
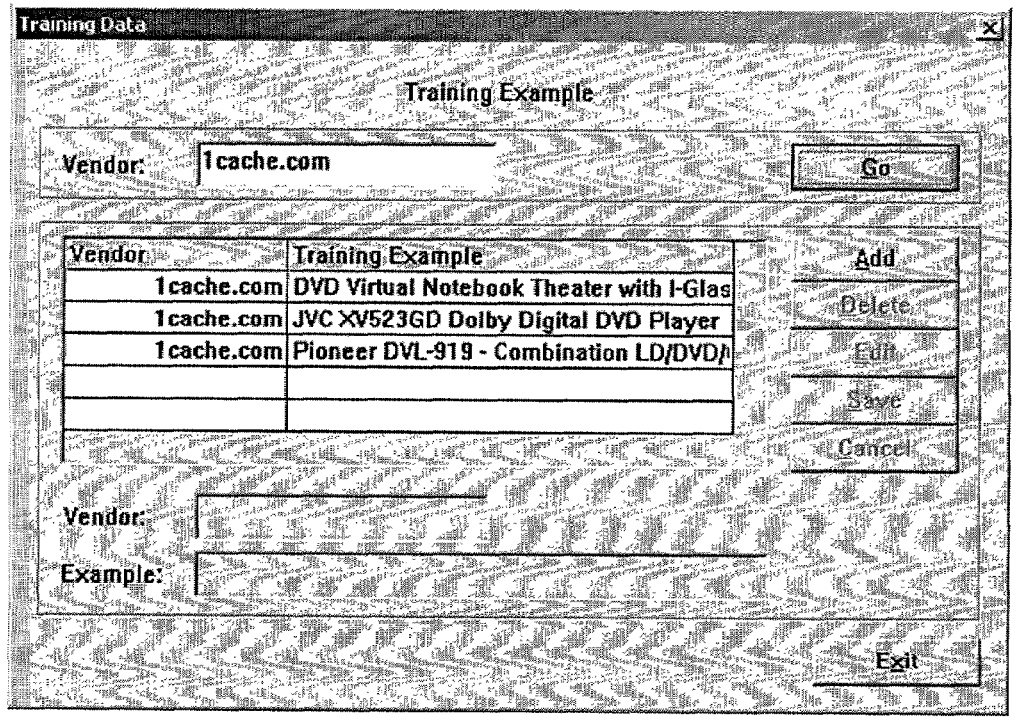
FIG. 20 provides a screenshot of the Learner Interface for displaying the Training Examples previously entered for a particular vendor.

FIG. 20 provides a screenshot of the Learner Interface for displaying the Training Examples previously entered for a particular vendor. The screen is displayed in response to opening a file called "Training Data." As to the "Vendor Information" screen of the Learner Interface, there is a search function screen provided for the "Training Data." To use the Training Data search function, the system administrator enters the vendor name and presses the "Go" button. This invokes the list of "Training Data" previously entered for the specified vendor to display as shown. It is to be noted that the "Training Data" interface provides other functionality, such as "Add" (to add additional examples), "Delete" (to delete a Training Example), "Edit" (to edit a Training Example), "Save" (to save the list of examples to its current state), "Cancel" (to cancel entered changes).

Figure 21:
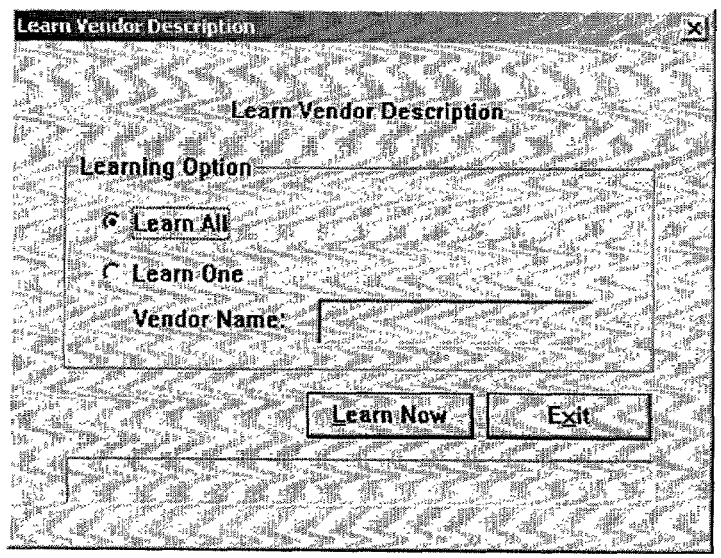
FIG. 21 is a screenshot of a Learner Interface which is displayed in response to opening a file called "Vendor Description."

Referring now to FIG. 21, a screenshot of the Learner Interface is displayed in response to opening a file called "Vendor Description." This interface begins the process of "learning" a Vendor Description, and provides for the system administrator the option to learn descriptions for "All" vendors for which training data has been entered, or "One" vendor of which the name has been entered by the administrator in the provided box.

Figure 22:
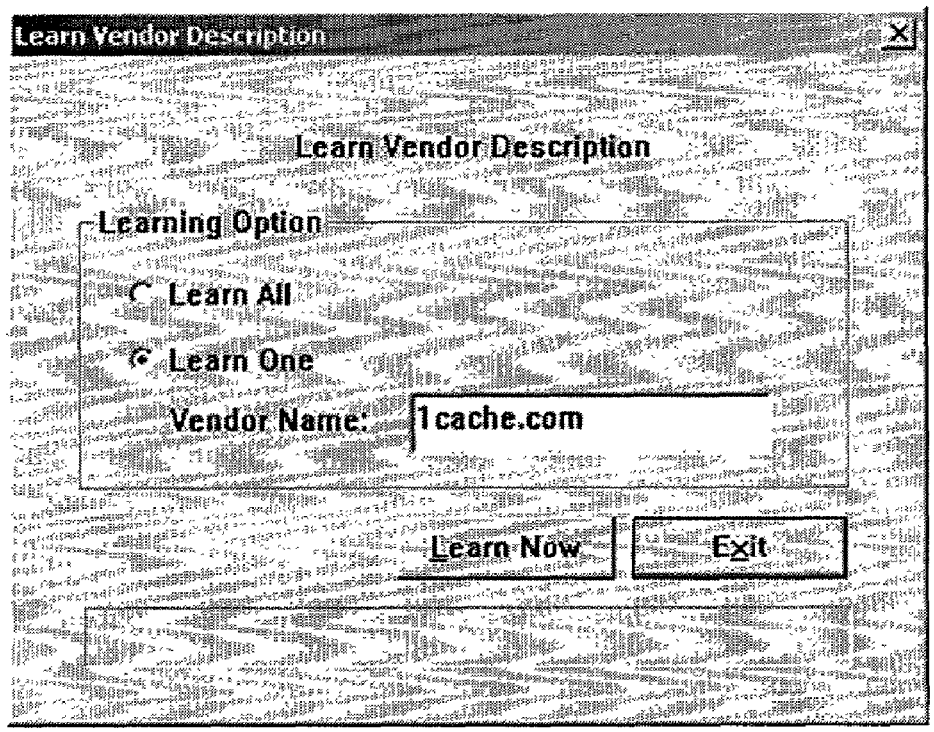
FIG. 22 illustrates the selection of learning options in accordance with the present invention, namely, the "Learn One" option is shown selected, and the vendor's name, which has been filled-in, is "1cache.com."

In FIG. 22, the "Learn One" option is shown selected, and the Vendor's name entered is "1cache.com." With the system being connected to the World Wide Web, the "Learn Now" button is to be pressed to launch the Semantics Recognition Learner Agent (SRLA) 18 to "learn" vendor information about the specified Vendor—1cache.com—in real-time on its Website using the training examples specified in the Training Examples for that vendor.

Figure 23:
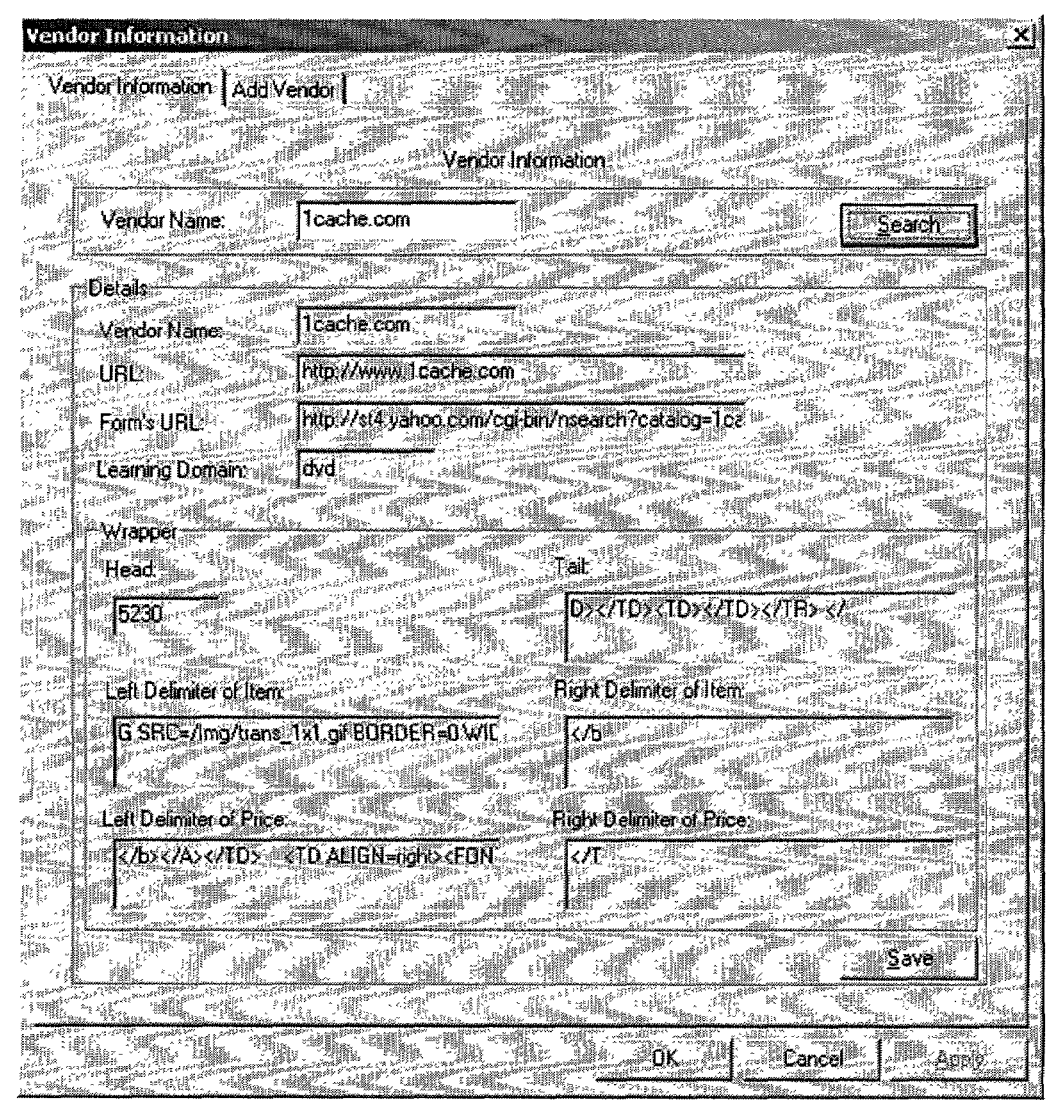

After the learning/training process is completed, the results of the trained or learned examples which have been returned from its site are displayed on the Learner Interface's screen as illustrated in FIG. 23. Again, to display this information, the system administrator can use the search function on the Vendor Information screen in FIG. 19, to enter the name of the vendor, in this case, "1cache.com," and press the search button. Instantaneously, FIG. 23 displays the learned results for the vendor, "1cache.com." It is to be noted that the "Wrapper" fields have now been completed. Also, the "Head" of the page is shown as occurring at value "5230." This value "5230" identifies lines, character positions, or other positional information. The "Tail" indicates that Items' locations as being identified by the delimiter string as follows:

"D></TD><TD></TD></TR></"

For the Item description information, the Left Delimiter is identified as the string below:

"G SRC=/Lmg/trans+1X1.gifBORDER-0WID... "

The Right Delimiter of the Item description is identified as the string: "</b>."

The Left Delimiter of the Price is identified as the string below:

"</b></A></TD><TDALIGN=right><FON... "

Finally, the Right Delimiter of the Price is identified as the string: "</T."

Although the character strings in FIG. 23 for the Left Delimiter of Item and the Left Delimiter of Price appear truncated due to the still-display state of the Learner Interface, it is to be understood that all of the characters in the left delimiter strings identified by the Semantics Recognition Learner Agent 18 will be stored in the vendor descriptions 28, preferably in a Microsoft Access database, and will be later used by the Semantics Recognition Buyer Agent 20.

The methodology underlying the Semantics Recognition Learner Agent 18 will now be described in more detail at a "proof-of concept" level.

Basic Concepts

The wrapper induction problem is framed in the form of a simple model of information extraction as shown in FIG. 24.

As exhibited in FIG. 24, a PAGE P is the Web page containing the desired information. P is taken to be a string over some alphabet. Typically, the alphabet is the ASCII character set, and the PAGES are HTML documents. To exemplify, FIG. 7 as elaborated earlier, is a very simple page obtained from a vendor site. In "labeling terminology," this page will hereafter be referred to as Ppc (Page of product catalogue). Note that the methodology of the present invention is motivated or invoked by, but does not rely on, the use of HTML. For instance, the pages might be natural language text or might comply with the XML standard.

A standard relational data model is adopted. Associated with each product record are two distinct attributes: item and price. Where "item" represents the product name or model number," and price represents the price of a product.

A "tuple" is a vector <Ai, Ap> of two strings. String Ai is the value of the "item" attribute, and string Ap is the value of "price" attribute, whereas attributes represent columns in the relational model, "tuples" represent rows. Thus, as illustrated in FIG. 8, the example of product catalogue page of FIG. 7 contains four "tuples," the first of which is <'HM381MD', '399.95'>.

The content of a page is a set of "tuples" that it contains. For example, the literal string notation is adequate, but since pages have unbounded length, a clearer and more concise representation of a page's content is used instead. Rather than listing the attributes explicitly, a Page's "label" is used to represent the content of a page in term of a set of indices in the Page.

For example, the "label," Lpc, for the simple product catalogue page (Ppc) is illustrated in the right-hand column of FIG. 8.

The "label" Lpc indicates that the simple product catalogue page contains four "tuples," where each "tuple" consists of item and price values. A pair of integers represents each of the values. Consider the first pair, <174, 180>. These integers indicate that attribute of the first tuple is the sub-string between position 174 and 180, i.e. the string 'HM381MD'. Inspection of the character strings of the right-hand side of FIG. 7 reveals that these integers correspond to character positions, starting from the "<" in "<HTML>" in the first line. Similarly, the last pair of integers in the fourth "tuple,"<356, 361>, indicates that the last attribute's price occurs between 356 and 361, i.e. the string '399.95'.

More generally the content of page P can be represented by label L.

$$L = \begin{cases} \langle b_{1,i}, e_{1,i}\rangle, \langle b_{1,p}, e_{1,p}\rangle \\ ... \\ \langle b_{k,i}, e_{k,i}\rangle, \langle b_{k,p}, e_{k,p}\rangle \\ ... \\ \langle b_{m,i}, e_{m,i}\rangle, \langle b_{m,p}, e_{m,p}\rangle \end{cases}$$

For a page with only single "tuple," the following label results:

$$L = \{<<b_{1,i}, e_{1,i}>, <b_{1,p}, e_{1,p}>>\}$$

Label L encodes the content of page P. The page contains |L|>0 "tuples," each of which has two attributes, item and price. The integers 1<m<|L| index "tuples" within the page. Each pair $<b_{m,i}, e_{m,i}>$ encodes an item value, and each pair $<b_{m,p}, e_{m,p}>$ encodes a price value. The value $b_{m,i}$ is the index in P of the beginning of an item in the mth "tuple," the value $e_{m,i}$ is the end index of an item value in the mth "tuple." Similarly, the value $b_{m,p}$ is the index in P of the beginning of a price in the mth "tuple," the value $e_{m,p}$ is the end index of a price value in mth "tuple." Thus, the item attribute of mth tuple occurs between $<b_{m,i}, e_{m,i}>$, the price attribute of mth "tuple" occurs between $<b_{m,p}, e_{m,p}>$. Thus, the pair $<b_{2,i}, e_{2,i}>$=<229, 234> in the example of FIG. 8 encodes the second (item) attribute of the second "tuple" in the simple product catalog of the page in FIG. 7.

As shown above, a wrapper W is a function from a page to a label; the notation W(P)=L indicates that the result of invoking wrapper W on a page P is label L. At this level of abstraction, a wrapper is simply an arbitrary procedure.

A wrapper class is a set of wrappers. As will be seen later herein, the wrapper employed by the present invention is called an HLRT wrapper class.

In view of the foregoing explanation of terminology and conventions used to describe the methodology of the present invention, further explanation will now be provided as to how the learner learns a wrapper for a vendor's product catalog pages.

Intuitively, the input to the learning system of the present invention is a sample of product catalogue pages and their associated "labels." At this point, it is assumed that the "labels" have already been identified and are given. A further elaboraion of the method used to generate labels for a sample page will be provided herein later. The output is a wrapper W∈W. Ideally, W outputs the appropriate label for all of sample pages. In general, such a guarantee cannot be made, so (in the spirit of inductive learning) it is required that W generate the correct labels for a given set of training examples.

Solutionwise, the wrapper induction problem (with respect to a particular class W) is as follows:

Input: a set $\epsilon = \{\ldots, <Pn, Ln>, \ldots\}$ of training examples, where each Pn is a page, and each Ln is a label;

Output: a wrapper W∈W, such that W(Pn)=Ln for every <Pn, Ln>∈$\epsilon$.

The HLRT Wrapper Class

As explained herein earlier, the pcwrapHLRT procedure illustrates a "programming acronym"—using head delimiter, left-hand delimiter, right-hand delimiter and tail delimiter to extract relevant product information and its price from a vendor product catalogue. The Head-Left-Right-Tail (HLRT) wrapper class is one way to formalize this acronym. The procedure "execHLRT" set forth in FIG. 25 is a generalization of pcwrapHLRT that allows the delimiters to be arbitrary strings, instead of the specific values "<B>," "</B>," etc., used in the previous implementation of pcwrapHLRT.

Note that although the delimiters in this example are entire HTML tags, the methodology of the present invention is not limited to operating with HTML tags. Furthermore, the text might not be HTML at all. Thus, the dollar sign symbol, "$," might be valid left delimiter for price such as "$399.95."

The execHLRT routine specifies how HLRT wrappers behave. Earlier it was stated that the W(P) is the label that results from invoking wrapper W on page P. The routine execHLRT is a procedure for determining W(P) and from W and P, for the case when W is an HLRT wrapper.

The values of $l_i$ and $r_i$, indicate the left-hand delimiters and right-hand delimiters for the item attribute, while $l_p$ and $r_p$ indicate the right-hand delimiters for the price attribute, and h and t indicate the head and the tail of the page, respectively. (Note that h is a line number instead of a string. For example, if h=100, then the first 100 lines of the page is the head, the Semantics Recognition Buyer Agent 20 may skip these lines immediately when it search for a product.) For example, if execHLRT is invoked with the parameters h=7, li="<B>," ri="</B>," lp="<I>," rp="</I>" and t="</TABLE>," then execHLRT behaves like pcwrapHLRT.

More generally, any HLRT wrapper for a vendor site is equivalent to a vector of $(h, l_i, r_i, l_p, r_p, t)$, and any such vector can be interpreted as an HLRT wrapper. Given this equivalence, the notation $(h, l_i, r_i, l_p, r_p, t)$, is used as shorthand for the HLRT wrapper obtained by partially evaluating execHLRT with the given delimiters.

Since an HLRT wrapper is simply a vector $(h, l_i, r_i, l_p, r_p, t)$, the HLRT wrapper induction example of FIGS. 7 and 8 thus is one of identifying four (4) delimiter strings $(h, l_i, r_i, l_p, r_p, t)$, on the basis of a set $\epsilon = \{\ldots (P,(P_n, L_n), \ldots\}$ of the example pages and their labels. More precisely, the following constraint satisfaction problem (CSP) is to be solved:

variables: Head delimiter of the page P: h
    Tail delimiter of the page P: t
    Left delimiter of the item attribute: $l_i$
    Right delimiter of the item attribute: $r_i$
    Left delimiter of the price attribute: $l_p$
    Right delimiter of the price attribute: $r_p$ domains: each delimiter is an arbitrary string, except the head delimiter;

constraints: W(Pn)=Ln for every <Pn, Ln>∈$\epsilon$, where HLRT wrapper $$W=(h, l_i, r_i, l_p, r_p, t),$$

The learnHLRT methodology will now be described which addresses the above constraint satisfaction problem.

Delimiter Candidates

To begin, it is to be noted that the domains of the delimiter variables are tightly constrained by the examples c. At the very least, the delimiters will be sub strings of the example pages. Of course, one can do much better. On the basis of just the single example (Ppc, Lpc), it can be seen that $r_p$ (the right-hand delimiter for the price attribute) must be a prefix of "</I></TD></TR>," where "⇓" indicates a new line character. By "prefix" it is meant combinations of the characters in the string, starting from the right-most character of the string; for example, ">," "D>," "TR>," etc.

Note that if $r_p$ is not a prefix of this string, then every wrapper with this delimiter will, at the very least, fail to extract "399.95" as the code attribute for Ppc's fourth "tuple." Thus the candidates for $r_p$ are all prefixes of "</I></TD></TR>." These candidates are illustrated in FIG. 10A.

In detail, the candidates for the delimiters for the simple product catalogue page are generated as follows:

Candidates for the $l_i$ and $l_p$

Consider $l_p$, the left-hand delimiter for the price attribute. Recall the fragments "HM381MD</B></TD><TD><I>," "MD2070</B></TD><TD><I>," etc., that precede the price in FIG. 7. Given these fragments, it can be seen that $l_p$, must be a suffix of "</B></TD><TD><I>." Thus the candidates for $l_p$ are the 16 non-empty suffixes of this string. These candidates can be seen in FIG. 10A. By "suffixes" it is meant combinations of the characters in the string, starting from the left-most character of the string; for example, "<," "<I," "</B," "</B>," etc.

Delimiter $l_i$ is more complicated because the string prior to the first attribute occurs between the first attribute and the last attribute of the previous "tuple," as well as between the head of the page and the first "tuple." In the example, the strings under consideration are "<TR><TD><B>" and "</I></TD></TR>⇓<TR><TD><B>." Clearly, $l_i$ is a suffix of this string. Thus, the candidates for $l_i$ can be generated by enumerating the suffixes of one such fragment.

To generalize this elaboration, it is concluded that the candidates for delimiter $l_i$ and $l_p$, given the example set and written cands$_l$(i, p, $\epsilon$), are generated by enumerating the suffixes of the shortest string occurring to the left of each instance of item attribute or price attribute in each example. (As mentioned in the previous paragraph, the case item attribute is somewhat special. The suffixes of the shortest string either between adjacent tuples or before the first tuple must be enumerated.) For example, if $\epsilon=\{(Ppc, Lpc)\}$, then:

$$Cands_l(i, \epsilon) = \{</I></TD></TR>\Downarrow<TR><TD><B>, \ldots\}$$

$$Cands_l(p, \epsilon) = \{</B></TD><TD><I>, \ldots\}$$

Candidates for the $r_i$ and $r_p$

The candidates for the right-hand delimiters are generated similarly. But there are two distinctions. Firstly, the strings under consideration occur to the right of the appropriate attribute (rather than to the left). Secondly, $r_i$ and $r_p$ must be a prefix (not a suffix) of these strings. For example, in the simple product catalogue example, the delimiter $r_i$ must be a prefix of the string "</B></TD><TD><I>," while $r_p$ must be a prefix of both "</I></TD><TR>" and "</I></TD><TR>⇓<TR><TD><B>."

In particular, the candidates for right delimiter given the example set $\epsilon$—written cands$_r$(k, $\epsilon$) are generated by enumerating the prefixes of the shortest string occurring to the right of each instance of attribute k in each example. (As stated above, $l_i$ is a special case. Similarly, $r_p$ is a special case. The prefixes of the shortest string occurring either between adjacent "tuples" or after the last "tuple" are enumerated. For example:

$Cands_r(i,\epsilon) = \{</B></TD><TR><I>, \ldots\}$ $Cands_r(p,\epsilon) = \{</I></TD><TR>⇓<TR><TD><B>, \ldots\}$ Candidates for the Head and Tail A similar analysis applies to delimiters for the head and tail. The "head" is the prefix of the page before the first item attribute occurs. Note that here, the "head" is represented as a string. When a wrapper is in actual implementation, in order to increase the performance of the invention, it is preferable to represent the "head" as an integer so that the human shopper or buyer, in using the wrapper to look for product information, can skip a page's head quickly without looking into the content. To convert a head string to an integer, simply find out the number of lines that are spanned by the head string.

Identifying the delimiter for the "tail" is quite similar to the right delimiter $l_i$ and $L_p$. The tail candidates are the suffixes of the string after the last price attribute of the page.

$Cands(\text{head},\epsilon) = \{<HTML>⇓<TITLE> \ldots PRICE (\$US)</TH></TR>, \ldots\}$ $Cands(\text{tail},\epsilon) = \{</I></TD></TR>⇓</TABLE> \ldots <HTML>, \ldots\}$ Delimiter Independence Given these candidates for each delimiter, a module of the simple method in pseudo-code for learning these two delimiters is provided in FIG. 26.

Because the module runs in time proportional to the product of the number of candidates for each delimiter, and because each delimiter can have many candidates, execution time can be slow.

A more efficient processing can be accomplished by observing that the delimiters $r_i$, $l_p$, $r_p$ are mutually independent. Furthermore, whether a candidate is valid for a particular delimiter in no way depends on any other delimiters. For example, it can be evaluated whether "</B>" is satisfactory for $r_i$ without reasoning about any of the other delimiters.

To see that this independence properly holds, recall the execHRLT procedure. At each point in its execution, execHRLT is searching for its input page P for exactly one of the delimiters $r_i$, $l_p$, $r_p$. If any of these searches fails to identify the correct location in P, then the label output by execHRLT will be incorrect. But whether these searches return the right answer depends only on the delimiter under consideration and the example pages—not on the other delimiters.

Put another way, once a particular candidate ($r_i$, $l_p$, $r_p$) is chosen for some delimiter, there is no way the candidate can be made invalid, no matter what candidates are selected for the other delimiters. The contrapositive of this assertion also makes intuitive sense: if a candidate is invalid, there is no way to repair it, no matter how carefully candidates are selected for other delimiters. Note that this independence property is guaranteed; it is not merely heuristics that facilitates learning.

The significance of this observation is that the three delimiters, $r_i$, $l_p$, $r_p$, can be learned in isolation. In pseudo-code, they can be learned as follows:
1. Generate the candidate sets
2. For each delimiter, select a valid candidate.

This methodology is much faster than the procedure of FIG. 26: it runs in time proportional to the sum (rather than product) of the number of candidates for each delimiter.

However, it is also observed that not all the delimiters are mutually independent. In contrast, as to delimiters h, t, and $l_i$, whether a particular character string is valid for one of these three delimiters depends on the choice for the other two. For example, is "<B>" valid for $l_i$? The answer depends on the choice for the choice for h and t. If h="<HTML>," then "<B>" is not a valid delimiter for $l_i$ because execHLRT will not skip the irrelevant bold text "<B>A Simple Product Catalogues </B>." On the other hand, if h="</TH></TR>," then $l_i$="<B>" causes no problem. Similarly, $l_i$ and t interact: $l_i$="<B>" is unacceptable if t="</HTML>," but acceptable if t="</TABLE>." As a result, candidates for the three delimiters h, t and $l_i$ must be considering jointly. Thus, all combinations of candidates for h, t and $l_j$ are enumerated, and the valid ones are selected.

Candidates Validity

The second step of this improved methodology involves precisely characterizing the conditions under which a delimiter candidate is valid.

Consider first the delimiter $r_i$ and $r_p$. After the method has identified the beginning of some instance of the attribute, the method attempts to locate the end of that instance of the attribute. Thus a candidate, "u" for delimiter $r_i$ or $r_p$ must satisfy two constraints:

Constraint C1: "u" must not be a sub string of any instance of an attribute in any of the example pages.
Constraint C2: "u" must be a prefix of the text that occurs immediately following each instance of the attribute in every example page.

If these constraints are violated by a candidate "u" for delimiter $r_i$ or $r_p$, then every wrapper will fail for at least one of the examples $\epsilon$. If constraint C1 is violated, then attribute k will be too short; if C2 is violated, it will be too long.

In summary, of interest are the conditions that must hold if some candidate "u" is to be valid as a value for delimiter $r_i$ or $r_p$, with respect to a given set of examples $\epsilon$. These conditions will be referred to as valid (u ,r, $\epsilon$). It is seen that valid$_r$(u ,r, $\epsilon$) holds if and only if candidate "u" satisfies constraints C1 and C2 for delimiter $r_i$ and $r_p$ with respect to example set $\epsilon$. Returning to the example, if the validr test is applied to the candidates generated by cands$_r$, it is found that:

For the right delimiter of the item attribute:

$validr(</B></TD><I>,i,\epsilon) = \text{TRUE}$

. . . . .

For the right delimiter of the price attribute:

$validr(</I></TD><TR>⇓<TR><TD><B>,p,\epsilon) = \text{FALSE}$

. . . .

Constraints on $l_p$

The execHLRT procedure searches for delimiter $l_p$. A candidate "u" for the delimiter $l_p$ must satisfy two constraints:

Constraint C3: "u" must be a proper suffix of the text that occurs immediately before each instance of the attribute k in every example page.

If this constraint is violated, then every wrapper will disagree with the examples $\epsilon$. At least, one of the starting indices $b_m$, p computed by execHLRT will be incorrect—either less or greater than the correct value, or undefined, depending upon how "u" violates the constraint.

In summary, of interest are the conditions that must hold if some candidates "u" are to be valid as a value for delimiter $l_p$ according to example set $\epsilon$. These conditions are referred to as $valid_j(u, l, \epsilon)$. It is seen that $valid_j(u, l, \epsilon)$ holds if and only if candidate "u" satisfies constraints C3 for delimiter $l_p$ with respect to C. Returning to the simple product catalogue example Ppc, it is seen that:

$$valid_j(</B></TD><TD><i>,p,\epsilon)=TRUE$$

. . . .

To determine whether a particular combination of candidates Uh, Ut, and $Ul_i$ for h, t, and $l_i$ are satisfactory, the constraints below are applied:

Constraint C4: Uh must be a proper suffix of the portion of every page's head.

Constraint C5: Uh must be a proper suffix of the portion of every page's head after the first occurrence of Uh.

Constraint C6: Ut must not occur between the first occurrence of h in any page and the subsequent occurrence of $l_i$.

Constraint C7: Ut must be a sub string of every page's tail.

Constraint C8: $Ul_i$ must not occur before t in every page's tail.

Constraint C9: $Ul_i$ must be a proper suffix of the text between "tuples" in every page.

Constraint 10: Ut must not occur before $Ul_i$ in the text between "tuples" in any page.

HLRT Induction

With this background in place, procedure learnHLRT will now be described. A table of the detailed procedure as well as the related subroutines are provided in FIGS. 27A and 27B.

Obtaining the Training Data

In the earlier description of the present invention it has been assumed that the training data was already in place for use by the Semantics Recognition Learner Agent 18. That is, a set $\epsilon=\{\ldots, <Pn>, Ln>, \ldots\}$ of training examples was already in existence, where each Pn is a page and each Ln is a label. To further understand how the Learner 18 works with the training examples, reference is made to FIGS. 7 and 13.

As stated earlier, at the shopping/buying phase, the Semantics-Recognition Buyer Agent 20 can perform five different functions which are as follows:

(1) To compose Labels (LabelOracle) using a modular heuristic search methodology as described in FIG. 15C. These are referred to as recognizers: One of which is an item recognizer and the other an intelligent price recognizer.

(2) Because it is inefficient for the Semantics Recognition Buyer Agent 20 to retrieve the vendor descriptions data each time it receives a request from the online human buyer or user, such descriptions will only be retrieved from the database (preferably a Microsoft Access database) or SQL-compliant database server 22 if it is the first time the Semantics Recognition Buyer Agent 20 requests the search-match-extraction of a desired set of them. Then the vendor descriptions will be stored in the memory or cache for more instantaneous retrieval use in other later Semantics Recognition Buyer Agent 20 requests.

(3) The vendor descriptions in memory or cache preferably will be automatically updated once a day.

(4) The system of the present invention creates multi-threads and zaps simultaneously several Semantics Recognition Buyer Agents to contact various designated online vendor sites through the World Wide Web. The use of this multi-threading methodology is preferably built on top of DCOM technology offered by Microsoft Corporation. Each Semantics Recognition Buyer Agent 20 intelligently fills-in the vendor's search form with the product information provided by the human buyer or user and presses "enter" virtually.

(5) On the other hand, the Semantics Recognition Buyer Agent 20 of the present invention addresses heavy network traffic on the World Wide Web, now dominating the whole process of a shopper/buyer's online purchase, by speeding up vendor response times and allocating returned search result pages to separate memory locations as enabled by multi-threading.

Training Pages Pn

Obtaining a training page involves making an example query to a vendor Website. For example, FIG. 12 illustrates the appearance of an example page from a query to a Website, such as to http://www.800.com.

The algorithm in which the recognizer, referred to as Label (LabelOracle), is composed from modular heuristics search methodology, will now be described in greater detail. A recognizer finds instances of a particular attribute on a page. For example, given the example page of FIG. 12, an item recognizer would identify all "items" contained in the page, e.g. the products "HM381MD," "MD2070," and "MD203." A recognizer should be intelligent enough to prune the noise.

For example, again, given the example of FIG. 12, an intelligent price recognizer is able to distinguish between "Price 1 and Price 2, which might be, for example, "List Price" and "Your Price," respectively. The recognized instances are then corroborated to label the entire page. For example, given a recognizer for "items" and another for "price," the corroboration produces a LabelOracle that labels pages containing pairs of these attributes.

Recognizing the "items" is a simple pattern-matching problem if the item recognizer knows all items in advance. Nevertheless, this is infeasible because this requires a big list of item names/model numbers. Moreover, it is costly to maintain such a large database of items. Thus, it is not practical to guarantee that such a list of item names/model numbers is complete and up-to-date.

Fortunately, vendors attempt to create a sense of identify by using a uniform look for all products. For example, a vendor presents mini-disc (MD) product information in the same format as for a DVD product. By taking advantage of this regularity, it is assumed that every product is described in the same format.

The present invention learns a wrapper only from a specific domain of examples and attempts to fit this domain to all other domains in foreign languages organized in a consistent format globally on the Internet. In the preferred embodiment, the training examples solely originate from one domain, such as the MD domains of the vendor Websites. This results in the item recognizer that merely needs to recognize a specific domain of product, such as MD. In this manner, it is then feasible to maintain a thoroughly updated nomenclature of a specific domain of item names.

The present invention identifies a "price" by invoking a modular heuristic search. For instance, a price always follows a dollar sign ($); and a price is often a floating-point number, etc. If more than one price is found for an item, the keywords, such as "your price," "our price," "list price," "original price," etc are then extracted accordingly.

Detailed Steps of the Shopping Phase

As described briefly earlier, the mechanism of how the Semantics Recognition Buyer Agent 20 works is illustrated in FIGS. 14 and 15A-15C. The flow of control consists of eight (8) steps that are labeled in the graphical diagram.

Step (1)

When a user identifies the need for a particular product, or services, instead of browsing into different multilingual vendors sites on the World Wide Web in a manual search for product information and price, ONE-BY-ONE, the present invention provides a portal through which the request for product information is entered once through an interactive-agent-character graphical user interface (IACGUI), commonly known as interactive-agent-character shopper/Buyer interface to achieve the same purpose, but with better, faster and more reliable results.

The resulting product description is stored in the member variable—m_ProdDesc—of the SRBA 20. The search also enables the user to customize how the agent works through the "Advanced Search" function, which provides selectable parameters such as vendors of choice, the time out (limit), price range, any manufacturers, keywords, and so forth.

Step (2)

Assuming, for example, that the online buyer or user's platform uses a Windows 98 Operating System and is running a language version "B" (or preferably his or her platform is running Windows 2000 Professional in the English version and/or his or her platform has a Personal Web Server version "B" installed), the Microsoft Internet Explorer will prompt him or her to download language "B" display software after he or she logs on to the portal of the present invention. After the online buyer or user "A" enters a product model in the native characters of language "B" as a keyword in the text box provided at the portal of the present invention, the Semantics Recognition Buyer Agent 20 in FIG. 2 will perform the data extraction using pre-described example data (retrieved earlier in the vendor descriptions after real-time wrapper induction learning) and which contain native character string in language "B." These vendor descriptions are stored in the predefined data structure in the vendor description list in the database 24 (preferably a Microsoft Access database). The data extraction involves contemporaneously searching for "hits"—which contain price, description, and the related information of the product from the previous search results—that reside in the memory or cache stored in the server 22 using the exact native character string in language "B" entered by the user as exhibited in FIG. 15C, step 312. Because the character string in language "B" is in the specific native language, any "hits" that are found will be for that identified vendor site using the native language "B" and having the character string in language "B."

Recall that in step 7 of FIG. 14, during the learning process, the vendor descriptions are stored in the vendor description list 28 in the offline database 24 (preferably a Microsoft Access database) or database server 22 (preferably an Microsoft SQL-complaint database server) after the Semantics Recognition Learner Agent 18 in FIG. 2 has learned the wrapper from the online vendors. Because it is inefficient for the Semantics Recognition Buyer Agent 20 to retrieve the data of vendor descriptions each time upon request of the online human buyer or user, the vendor descriptions will only be retrieved from the database 24 or server 22 if it is the first time the Semantics Recognition Buyer Agent 20 requests a search-match-extraction of a desired set of them. Then the vendor descriptions will be stored in the memory or cache for more instantaneous retrieval and use in other later requests from the Semantics Recognition Buyer Agent 20 for the same or new online user.

The vendor descriptions in the memory or cache preferably are automatically updated once a day.

Step (3)

Using the retrieved vendor descriptions, the system of the present invention creates multi-threads and zaps simultaneously several Semantics Recognition Buyer Agents 20 to contact various designated online vendor sites through the World Wide Web.

Step (4)

The use of this multi-threading methology is preferably built on top of DCOM technology offered by Microsoft Corporation. Each Semantics Recognition Buyer Agent intelligently fills-in the vendor's search form with the product information provided by the human buyer or user and presses "enter" virtually.

Step (5)

Each vendor then returns a search result page having the information of the requested product or an error message.

Steps (6), (7)

The search results pages are returned to the Semantics Recognition Buyer Agents 20 through the World Wide Web. It is noteworthy that several results pages may arrive back at the Semantics Recognition Buyer Agents 20 at the same time. The Semantics Recognition Buyer Agents 20 of the present invention address heavy network traffic on the World Wide Web which currently dominates the whole process of a shopper/buyer's purchase by speeding up vendor response times and allocating returned search result pages to separate memory locations as enabled by multi-threading.

Stage (8)

The Semantics Recognition Buyer Agent 20 analyzes the returned pages according to the corresponding vendor descriptions. Relevant information and data are extracted from the returned pages and are displayed in a formatted output fashion as shown in FIG. 15B after all search result pages have arrived or the search is timed out.

Figure 28:
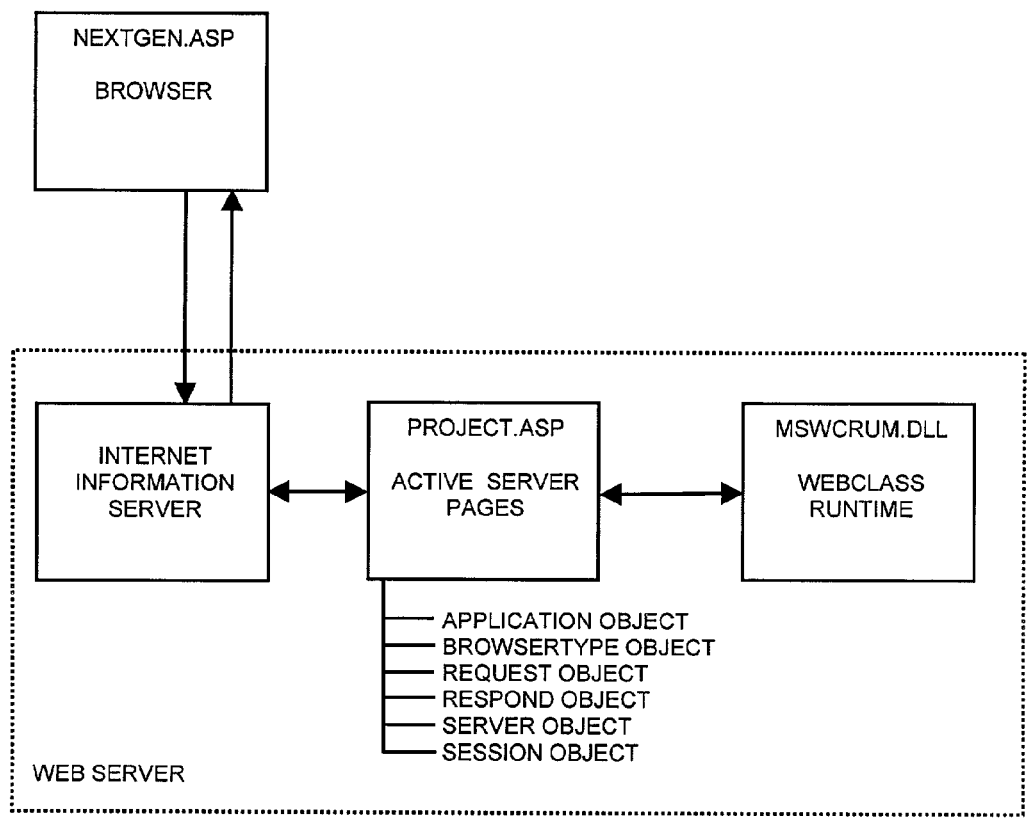
FIG. 28 illustrates how the user/buyer communicates with the server to run the in-process DLL file (NextGen.dll) on the server machine through an ASP (Active Server Page) file (NextGen.asp), in accordance with an embodiment of the present invention.

Referring to FIG. 28, the User/Buyer communicates with the server 22 to run the in-process DLL file (NextGen.dll) on the server machine 22 through an Active Server Page (ASP) file (NextGen.asp) as shown.

Preferably, developing the Semantics Recognition Buyer Agent 20 as an ActiveX Component produces several advantages. Firstly, overall performance can be improved. Writing the Semantics Recognition Buyer Agent 20 in Visual C++ permits the agent to be robust and makes available the powerful functionality of the ActiveX Component. There is no need to supply workaround solutions in the HTML and scripting code to meet the needs of the application. With the ActiveX Component, the agent can be run by adding a few lines of the code in the HTML file in the client side, while leaving aside all complex processes to be executed in the server side.

Secondly, ActiveX Components provide reusability to other applications instead of copying similar functions in every application module. An ActiveX component can be created to be accessible to all Active Server Pages modules. In other words, it is not required that all the logic be coded in ASP modules. Thus, this eliminates the redundancy in the application. Albeit the Semantics Recognition Buyer Agent is created within a single application, it does not hinder the ability to integrate with other applications as well. Furthermore, this feature can help reduce the development time significantly.

Thirdly, it is beneficial to connect an ASP Component to DLL (Dynamic Link Library) files as they are compiled and linked independently. No additional recompilation and relinkage are needed to update the ASP Component. Hence, speed improvement or new functionality of later upgraded version can benefit the ActiveX Components that use the DLLs. Besides, DLLs can reduce memory and disk space requirements by sharing a single copy of common code and resources among multiple modules.

If there are several components using the same static link libraries, several identical copies of the library are required to be stored and executed. Then there will be several identical copies in memory if they run simultaneously. So, it is obvious that using static link libraries may result in redundancy and space wastage.

Only one copy of the code and resources are needed if a DLL is used in lieu of static link libraries. This can keep the server at a minimum workload as there are many concurrent connections from the Internet.

The Semantics Recognition Buyer Agent 20 is preferably an ActiveX Component that is developed as an in-process DLL. It can allow user to create an object of the SRBA through the World Wide Web. To communicate between the user and the server, ASP is used to act as the gateway between the user and the server.

ASP is an open application environment in which HTML pages, scripts, and ActiveX Components are combined to create Web-based applications. In addition, it is built as an Internet Server Application Program Interface (ISAPI) that runs on top of the Internet Information Server (IIS) product of Microsoft Corporation, or on a peer Web server relative of IIS.

To implement ASP, Microsoft ActiveX Scripting is used, such as Visual Basic (VB) script that is used in the process of managing ActiveX Components. It makes the language dynamic by adding the ability to invoke ActiveX Components running on the server as DLLs.

Program Logic—Create an Object of the Semantics-Recognition Buyer Agent

An object of the Semantics Recognition Buyer Agent 20 is created when the user starts searching for the price of the desired product.

In the Active Server Page, the module in pseudo-code is coded as follows:
Start sub session
  Set agent=server
  Create object ("NextGen . . . )
End sub The above module creates an object of the Semantics Recognition Buyer Agent component 20 when the page is loaded, while NextGen is the name of the ActiveX Component. Semantics-Recognition Buyer is the name of the Agent in the NextGen component.

Connection Between the User and the Server

Figure 29:
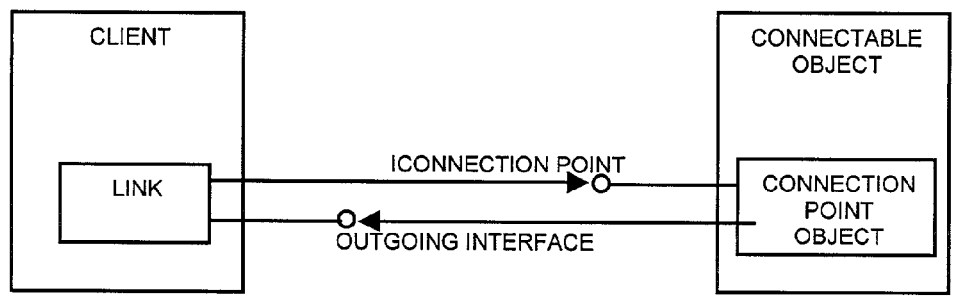
FIG. 29 illustrates the manner in which the Semantics Recognition Buyer Agent facilitates communication between the user and the database server.

A connection is established between the user and the server after an instance of the Semantics Recognition Buyer Agent 20 has been created, as shown in FIG. 29.

The Semantics Recognition Buyer Agent uses a connectable object to maintain a "one-to-one" (channel) through which the user communicates with the server, such as a user request to the Server to compare the price, while the Outgoing Interface is used by the Semantics Recognition Buyer Agent 20 as the connection (channel) through which the Server communicates with the user, such as a response in which the Server returns the search result requested to the user. The user can access the properties and invoke the methods of the Semantics Recognition Buyer Agent through the IConnectionPoint.

Semantics Recognition Buyer Agent 20 employs the methodologies set forth below:

1. OnStartPage (Unknown Agent)

This methodology is used to initiate the object of the Semantics Recognition Buyer Agent that is called automatically when the ASP is loaded.

2. OnEndPage( )

This methodology is used to terminate the object of the Semantics Recognition Buyer Agent that is called automatically when the ASP is unloaded.

3. GetSearch (BStr input, BStr*output)

This methodology is used to search the required product price on the Internet after the user has provided the product description, such as model number. Input is the product description of the user whereas Output is the output of the search result page. The syntax to call this method is:

OutputName=AdObjectName.GetSearch("Product Name")

In the above code, AdObjectName is the object's instance name whereas "Product Name" is the product name which the buyer/user agent wants to compare the price, and the OutputName is the variable that gets the returned value. Refer to the pseudo-code below as an example,
If result=Agent
  Get search ("Radar detector")

Figure 30:
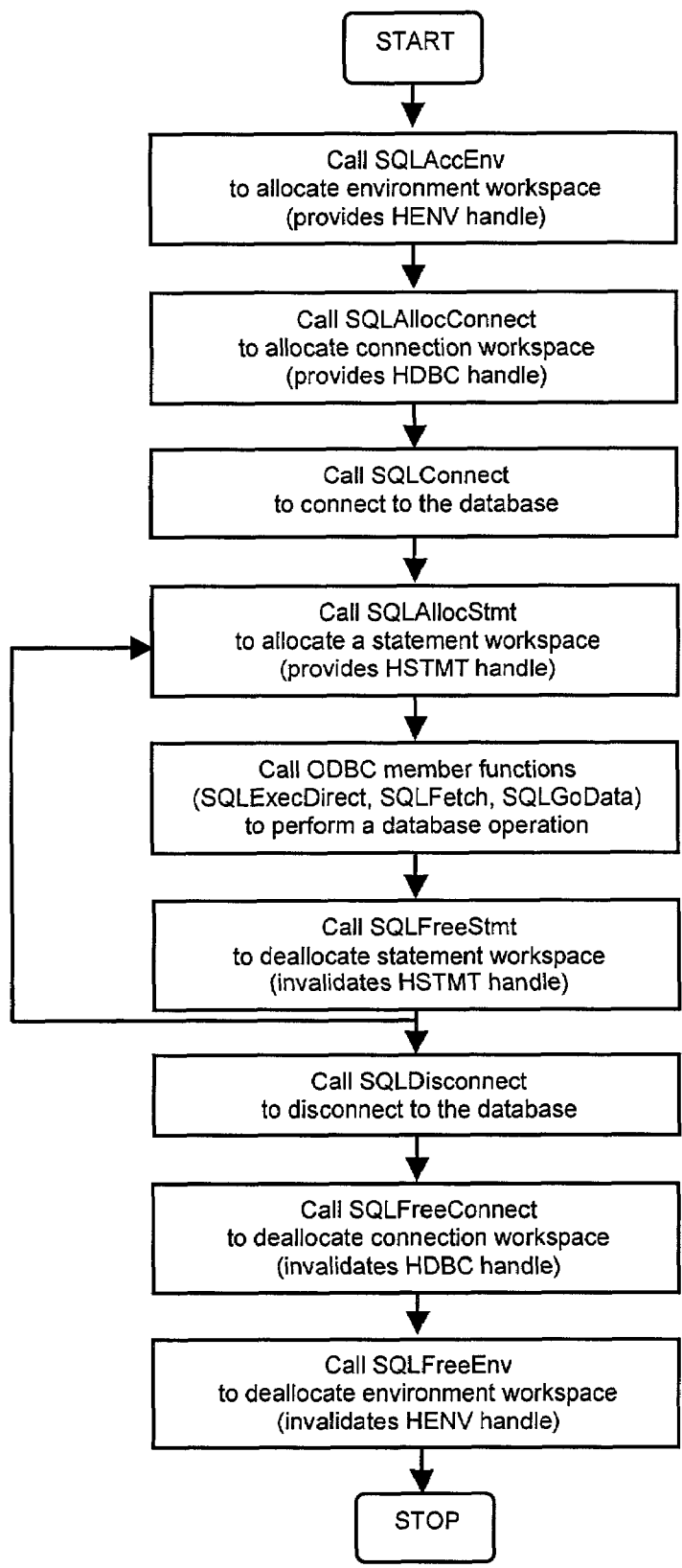
FIG. 30 provides a detailed flow chart of how to set up the SQL server database in accordance with one embodiment of the present invention.

Server Side Program Logic
  Register the component
  Before the user can initiate an object of the Semantics-Recognition Buyer Agent, its component must be registered in the server by the following command:

Register path\Nextgen.dll where path is the absolute path the Nextgen.dll is saved.
  Response to the User Request
  As the object of the Semantics Recognition Buyer Agent calls the method of GetSearch through the IconnectionPoint, an instance of the Semantics-Recognition Buyer Agent in the server machine executes the Dynamic Link Library (DLL). See FIG. 30.
  Connecting Database
  Data Source Name (DSN), identify (ID) and Password are needed to be provided to connect to the SQL Server through ODBC. RETCODE is a variable that stores the returned value from the SQL server. SQL_SUCCESS indicates a successful retrieval.

```
CString sDSN = "NextGen";
CString sID = "NextGen";
CString sPassword = "NextGen";
RETCODE rc;
rc = SQLConnect(hdbc,sDSN,"",sID,"",sPassword,"");
if(rc == SQL_SUCCESS)
{
    . . . execute query . . .
}
else
{
    . . . error handling . . .
}
```

Execute an SQL Query

Before retrieving the desired data from SQL, a specified query is needed.

```
//Allocating a statement handle
SQLAllocStmt(hdbc, &hstmt);
//query statement; model is the model number from the user
CString sQuery="select*from tbl_electronic where model=+"model";
rc=SQLExecDirect(hstmt,sQuery,"");
if(rc == SQL_SUCCESS)
{
    . . . retrieving fields . .
}
```

Retrieving Fields

After succeeding in executing the query, the vendor description will be stored into an array called vendor_description. There are two member variables in this array: a wrapper and a vendor URL.

```
rc = SQLGetData(hstmt,column_number,
    data_type,sWrapper,sizeof(sWrapper));
if(rc==SQL_SUCCESS)
    vendor_description[i].wrapper = sWrapper;
rc = SQLGetData(hstmt,column_number,data_type,sURL,
    sizeof(sURL));
if(rc=SQL_SUCCESS)
    vendor_description[i].url=sURL;
```

Filling-In the Forms

If there are N vendor descriptions, the buyer agent will initiate N threads to fill-in the form in each vendor specified in the vendor descriptions.

To run each thread, the syntax is:

//nNoVendor is the number of the vendor description;
Int nNoVendor=no_of_vendor_description;
For(Int nCount=0;nCount<nNoVendor; nCount++)
{
//ThreadFillForm is a class that implements the form filling;
Thread*ThreadFillForm;
Thread=AfxBeginThread(RUNTI ME_CLASS(Thread FillForm), . . . )
}

For each thread, the time limit preferably is about 5 seconds. If the vendor does not return the result within 5 seconds, this vendor will be discarded for this time, otherwise, the result will be stored into the memory for the use by the next process.

Figure 31:
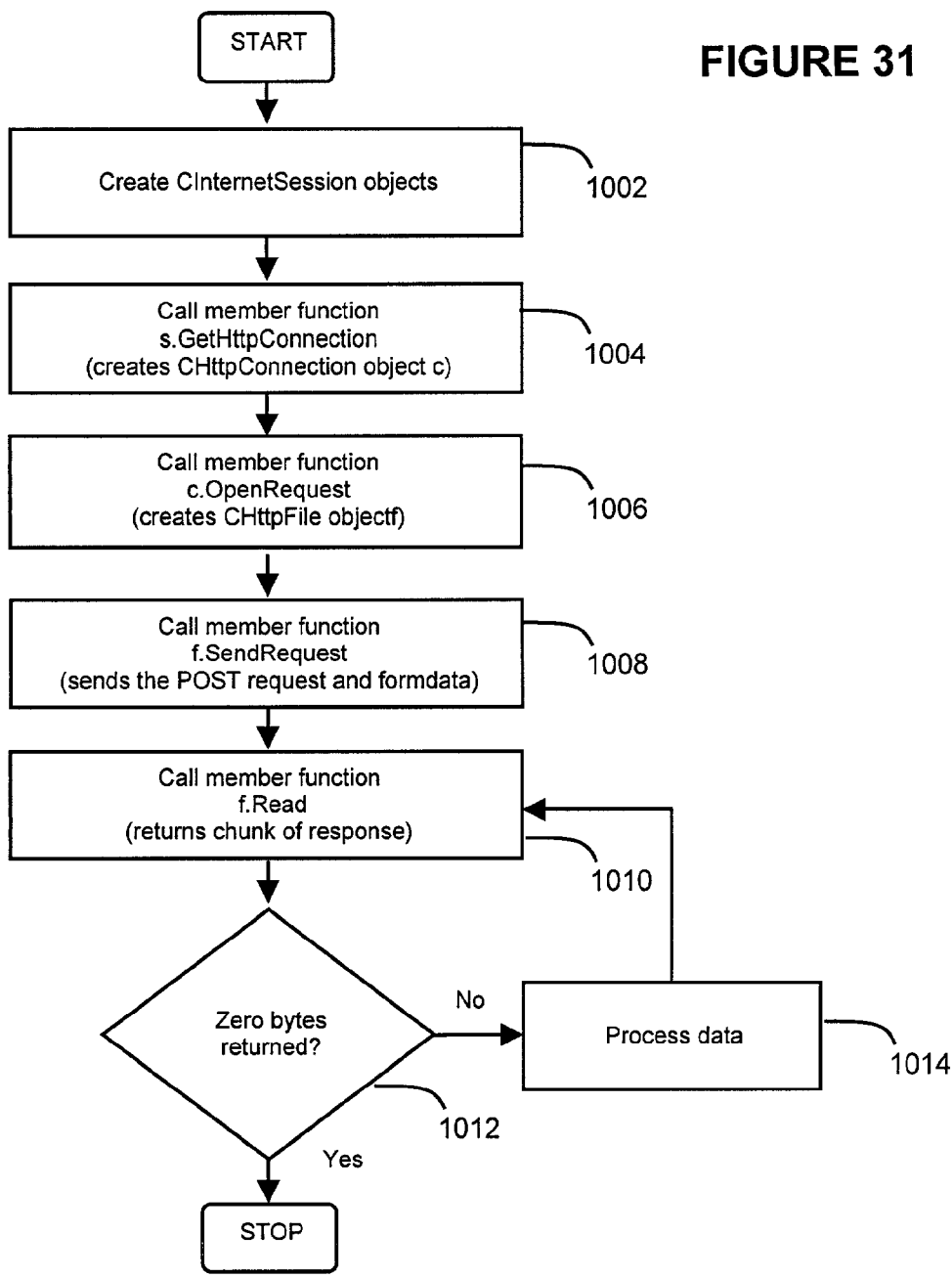
FIG. 31 is an illustration of how the Semantics Recognition Buyer Agent virtually posts a search form to an online vendor site.

When the user inputs in a provided box a keyword of the purchase request on the portal of the present invention, it is determined whether there are any related vendor descriptions; i.e. vendor descriptions which contain the keyword. All related vendor descriptions containing wrappers and URLs are then retrieved from the offline database. Afterwards, the Semantics Recognition Buyer Agent 20 goes in parallel with each online vendor's searchable index, fills it in and submits it to the vendor site. On the vendor site, the Buyer Agent will call a member function httpPost to complete the task. The httpPost member function posts a URL and form data to a vendor according to the vendor description and returns a HTML response as a string variable. The httpPost member function returns a Boolean value, where true indicates a successful retrieval of the HTML document, and false indicates that an error has occurred. If the return value is true, the generated item name and price will be extracted from the HTML document. The flow of posting a form is shown in FIG. 31.

In step 1002 a Cinternet Session object for the session is created. The Cinternet Session class connects to a server for an Internet session. Typically this class is used early in a session to establish a connection to a Web server.

In step 1004 a CHttpConnection object is created by calling the Cinternet Session object's GetHttpConnection member function. The CHttpConnection class establishes an HTTP connection with a server.

In step 1006 a CHttpFile object is created by calling the OpenRequest member function of the CHttpConnection object. The CHttpFile class let file transfer over the Internet to be treated as if working with a local disk file. It works with the CHttpConnection object to read or write Internet data.

Step 1008 calls the SendRequest member function of the CHttpFile object to send the POST request and form data to the remote HTTP server.

Steps 1010, 1012 and 1014 repeatedly call the CHttpFile object's Read member function, which returns chunks of response data to the program. When Read returns 0, no data is left to retrieve.

Extracting Price

After getting the result pages, the Semantics Recognition Buyer Agent 20 will match each result page against the generalized failure template. If the page does not match the template, it is assumed to be a successful search. Then the buyer agent 20 will use the wrapper for the corresponding vendor to strip header and trailer information from the successful pages. For example, assume that a user searches for a MD product with the model number MD203, that a given wrapper is {7,<B>,</B>,<I>,</I>,</TABLE>}, and that the result page is shown below.

```
<HTML>
<TITLE>A Simple Product Catalogs</TITLE>
<BODY>
<H2>MD Price </H2>
<TABLE BORDER=1>
<TR BGCOLOR=ORANGE>
<TH>ModelNumber</TH>
<TH>PRICE(US$)</TH>
</TR>
<TR><TD><B>HM381MD</B><TD><I>399.95</I></TD></TR>
<TR><TD><B>MD2070</B><TD><TD><I>599.95</I></TD></TR>
<TR><TD><B>MD203</B></TD><TD><I>249.95</I></TD></TR>
<TR><TD><B>MDR3</B></TD><TD><I>399.95</I></TD></TR>
</TABLE>
<HR WIDTH=200 ALIGN=LEFT>
</BODY>
</TABLE>
```

In the wrapper, the useful information starts from line 7 and ends at </TABLE>, so the Semantics Recognition Buyer Agent 20 will cut the useless information before extracting the model number and price. The HTML file, after header and trailer information are stripped away, is

```
Number</TH><TH>PRICE(US$)</TH></TR>
<TR><TD><B>HM381 MD</B><TD><I>399.95</I></TD></TR>
<TR><TD><B>MD2070</B></TD><TD><I>599.95</I></TD></TR>
<TR><TD><B>MD203</B></TD><TD><I>249.95</I></TD></TR>
```

<TR><TD><B>MDR3</B></TD><TD><I>399.95</I></TD></TR>

Then the Semantics Recognition Buyer Agent 20 will use pattern matching to extract the model number and the price of the product. In the wrapper, the pattern for the model number is <B>*</B> and the pattern for the price is </1>#</1>, where * represents the model number and # represents the price. The agent will firstly extract the model number HM381MD and compare it with the user's request model number "MD203." As it does not match, the Semantics Recognition Buyer Agent 20 looks for another model number until it finds the model number MD203. After the model number is found, the Semantics Recognition Buyer Agent 20 uses the price pattern to extract the first price after the model number. When the model number and price have been extracted, the Semantics Recognition Buyer Agent 20 stops extracting information from the page and put the information into a array called array_item[ ].

Critical Section

The array_Item[ ] is shared data for those N threads, and all the threads can access this member variable. There is a risk that more than one thread accesses the array_item[] at the same time which causes an access violation. In order to protect this shared data in a consistent state, a critical section is used to prevent more than one thread from modifying the data at the same time. It is declared as, CriticalSection m_csDoor;

Before inserting an element into the array item, the line m_csDoor,Lock( );

is added which is used to start the critical section. All the variables inside the critical section will be locked to prevent other threads from accessing the particular variable. After finishing the insertion, the line m_osDoor.Unlock( );

is added, which is used to state the end of the critical section. All the locked variables will be unlocked to allow other threads to access to the member variable. By doing so, the member variable of array_Item can be safely shared by all threads.

Sorting the Price

In a specified time interval, the array sort_item which stores the product price will be sorted by a quick sort method. The quick sort method can be implemented as follows:

IF left<right THEN
BEGIN
   pivot:=partition (list, left, right);
   Quicksort (list, left, pivot−1);
   Quicksort (list, pivot+1,right);
END A "key" value of the structure is selected to be positioned in every recursion of the code. The function then repeatedly scans through the structure in two directions. Values less than the key are passed to the left side of the structure and those greater are passed to the right side. These "left to right" and "right to left" scans and swaps continue until a flag condition tells them to stop.

Return Response to the User

An HTML file is returned to the user which will be stored in the member variable m_output, and which displays the sorted results of the search conducted by the SRBA 20.

//String used to display content to browser
*define HTTP_HEADER "Content-type: text/htm\n\n"
//Codes to display to browser Submitted with this application on the afore-stated compact disc is a computer program listing appendices which provide code sections which implement selected features of the present invention. In particular, in the portion labeled "3.1 The Learning Phase," source codes are provided for "3.1.1 Main COOSA Application Class"—the main class file for the COOSA application; for "3.1.2 Add Vendor Class—adding a vendor class to the database; "3.13 COOSADoc Class"—invocation of the display of documents and screens for the Semantics Recognition Learner Interface; "3.1.4 COOSA View Class"—Learner Interface's and its function's screens; "3.1.5 Training Data Class"—invocation of the Semantics Recognition Learner Agent; and "3.1.6 Vendor Class"—Declaration of labeling algorithm to process through all vendor Web pages. In the portion labeled "Shopping Phase," source codes are provided for "3.2.1 Agent Class"—declaration of the Semantics Recognition Buyer Agent; and "3.2.2 Thread Process"—part of the Semantics Recognition Buyer Agent's process.

Figure 32:
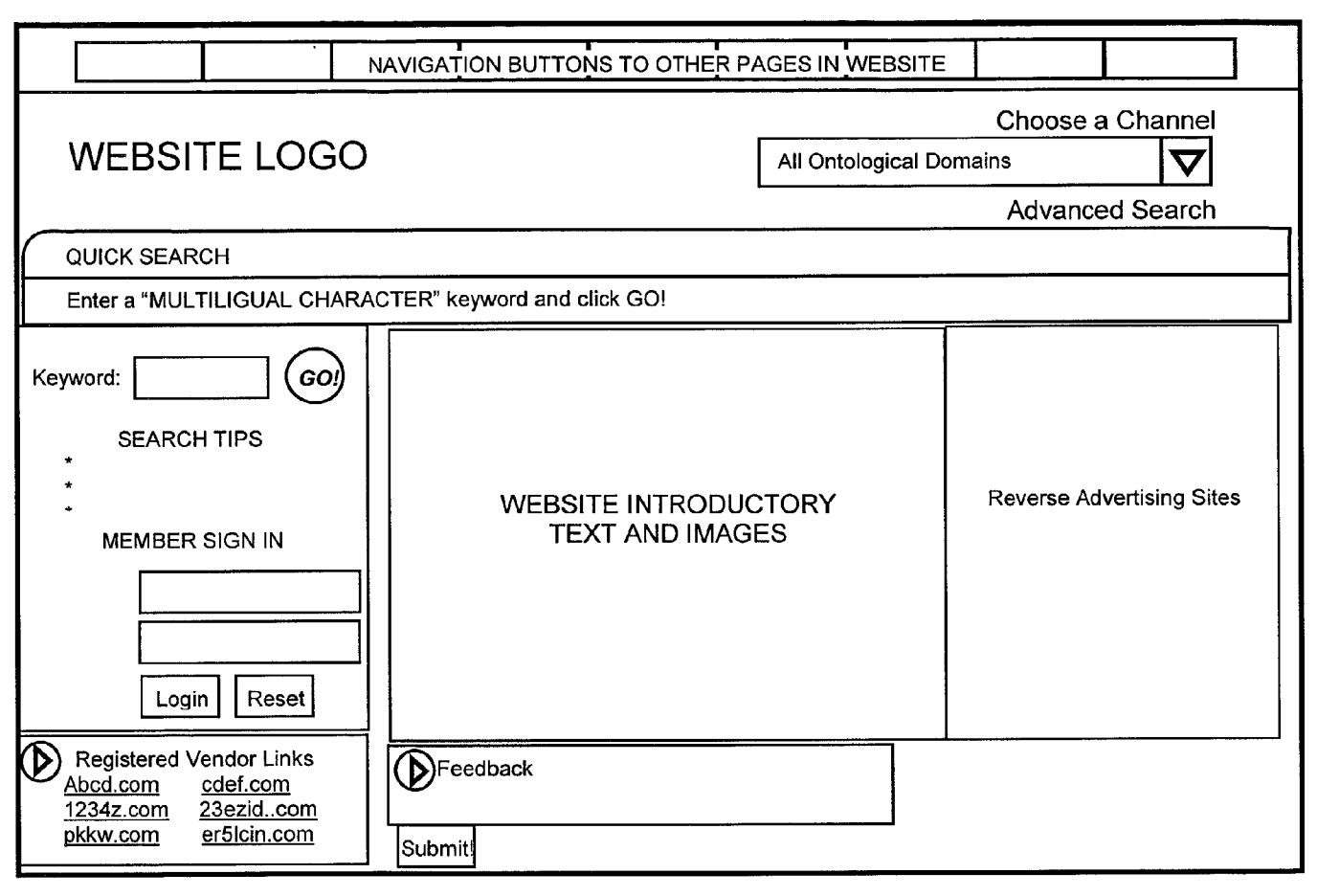

Referring now to FIGS. 32 through 39, a GUI or Interactive-Agent-Character Shopper/Buyer interface for use in connection with the present invention will now be elaborated. In FIG. 32, a simplified illustration of a "main menu" screen for a GUI or Interactive-Agent-Character Shopper/Buyer interface (IACS/BI) for use with the present invention. It is to be noted that there is a choice of "channels" (categories) of products provided for the user in the upper right hand corner of this "main menu" screen. A "Quick Search" feature is also provided in the left hand side of the screen. Right beneath it, there is a provided box in which an animated feature of self-typing instructs the online human user how to use the quick search option. The left hand screen panel also provides a set of boxes for member sing-in as a temporary trial or life member. (Note that most of the portal's functions of the present invention are disabled until the user authentication is validated.) At the bottom left hand corner is provided a set of links to online vendors that have been registered with the portal of the present invention whereas on the right, it can be observed that a big message box labeled "feedback" is provided for the online user to enter messages with comments through e-mail to the e-mail server, preferably running the Outlook Express brand e-mail server of Microsoft Corporation.

Figure 33:
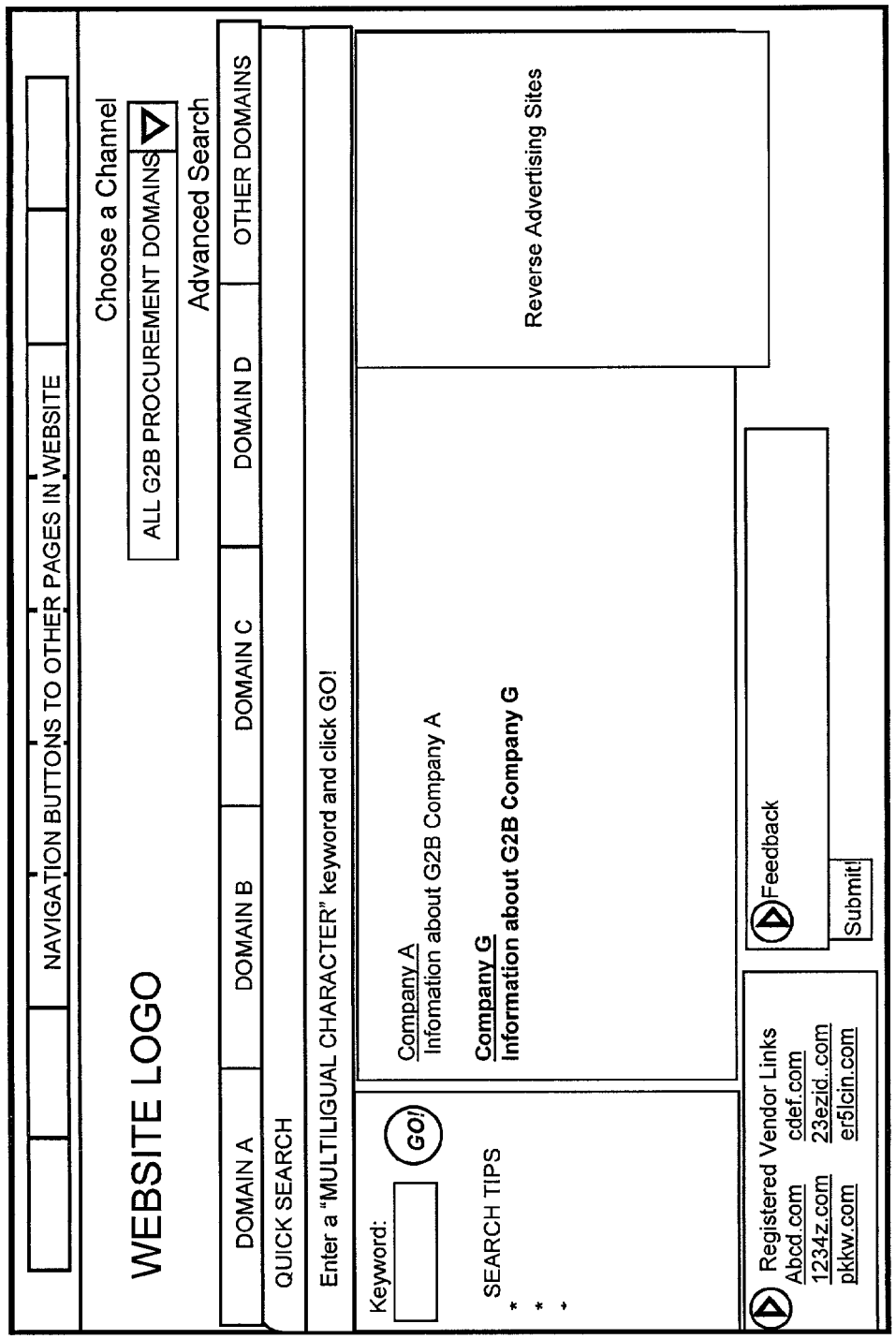
FIG. 33 is a simplified illustration of a screen of a GUI or Shopper/Buyer Interface for use with the present invention in which companies are displayed in response to a "Government-to-Business" textual icon which has been clicked on the previous screen (not shown) by the online buyer/user. However, note that this very screen cannot function because these companies, or so-called Government-to-Business e-commerce service or platform providers currently restrict strictly for member's privilege the access to their Web servers' databases by incorporating an authentication security interface in entirely closed-connected computer networked environment.

FIG. 33 is a simplified illustration of a screen of a GUI or Shopper/Buyer Interface for use with the present invention in which companies are displayed in response to a "Government-to-Business" textual icon which has been clicked on a previous screen—not shown—by the online buyer/user. However, note that this very screen cannot function because these companies, or so-called Government-to-Business e-commerce service or platform providers currently restrict strictly for member's privilege the access to their Web servers' databases by incorporating an authentication security interface in entirely closed-connected computer networked environment.

FIG. 34 is a simplified illustration of a screen display of a GUI or Shopper/Buyer Interface for use with the present invention in which details are provided about a company selected by the user from among the choices provided after the user has clicked the "Advanced Search" option on the screen in FIG. 33. Note that on this screen, the banner in the frame of the panel just right below the tabs of the five types of domains, the capitalized message "ADVANCED AGENTS ARE ON!" is observed. Besides, at the bottom of the screen, the user is provided with dialog boxes which can be filled-in for running a search using the Semantics Recognition Buyer Agent functionality provided by the present invention. Again, however, note that this very screen cannot function because this company, or so-called Government-to-Business e-commerce service or platform provider currently restricts strictly for member's privilege the access to their Web server's databases by incorporating an authentication security interface in entirely closed-connected computer networked environment.

FIG. 35 is a simplified illustration of a screen of a GUI or Shopper/Buyer interface for use with the present invention in which companies are displayed in response to "Business-to-Business" textual icon which has been clicked on a previous screen (not shown) by the online buyer/user. However, note that this very screen cannot function because these companies, or so-called Business-to-Business e-commerce service/platform providers currently restrict strictly for member's privilege the access to their Web servers' databases by incorporating an authentication security interface in entirely closed-connected computer networked environment.

FIG. 36 is a simplified illustration of a screen display of a GUI or Shopper/Buyer Interface for use with the present invention in which details are provided about companies selected by the user from among the choices provided after the user has clicked the "Advanced Search" option on the screen in FIG. 35.

Figure 37:
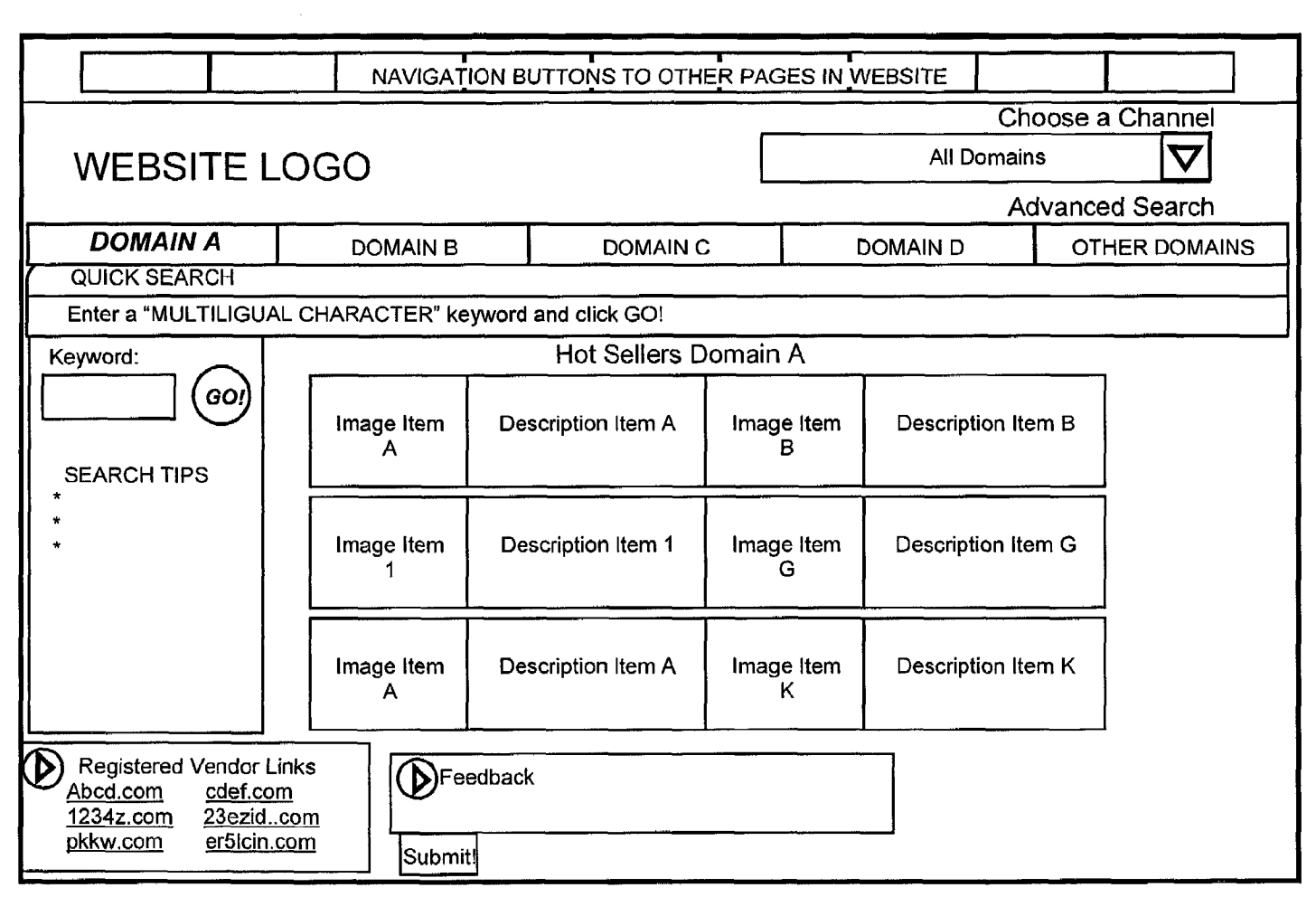

FIG. 37 is a simplified illustration of a screen of a GUI or Shopper/Buyer Interface for use with the present invention in which selected items and their descriptions are displayed in response to the user selecting the "Domain A" tab.

Figure 38:
FIG. 38 is a simplified illustration of a screen display of a GUI or Shopper/Buyer Interface for use with the present invention in which vendors that are listed sell items in Domain A in response to the user who has clicked "Advanced Search" option on the screen in FIG. 37.

FIG. 38 is a simplified illustration of a screen display of a GUI or Shopper! Buyer Interface for use with the present invention in which vendors that are listed sell items in Domain A in response to the user who has clicked "Advanced Search" option on the screen in FIG. 37.

FIG. 39 is a simplified illustration of a screen display of a GUI or Shopper/Buyer Interface for use with the present invention in which details are provided of the results of a search conducted using the Semantics Recognition Buyer Agents feature of the present invention. The Shopper/Buyer Interface responds to the user submitting a search request through the search parameters interface as shown at the bottom of the screen in FIG. 38.

It is to be further understood that while the present invention has been described in terms of the Internet and the World Wide Web, the present invention is equally suitable for use in recently introduced systems and next generation systems. To exemplify, the wireless application development tool, J2ME (Java to Micro Edition), can be used to incorporate the online intelligent multilingual- and domain-independent price comparison capabilities into mobile/wireless platforms including all models of 3G or Web phones, Interactive and Ultimate TVs, pocket PCs, Palm organizers, all-in-one Web-enabled Palm Synchronizers, wireless tablets, etc for delivering to mobile workers and Netizens numerous products and multilingual value-added Business-Web services on a home page as point-of-access all in one-stop anywhere on a 24/7/365 basis.

Furthermore, the present invention can be used to deliver via wired and mobile/wireless platforms various products and multilingual value-added Business-Web services having such enablement and functions and features as price comparison, e-Wallet integration, Inter-Agent Communication with Negotiation Ability—Agent-to-Agent (A-to-A) contract-negotiation—real world simulation capabilities to multiple e-commerce segments, including Consumer-to-Business, Consumer-to-Consumer, and Business-to-Business auctions, Government-to-Business transactions, etc. These A-to-A commerce or A-commerce's activities will be constructed and activated on a Global Ensemble Marketplace Framework just-in-time in a dynamic fashion in combination with the use of either keyboard, mouse, and pointing device.

The terms and expressions which have been employed herein are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. A method for real-time online search processing over inter-connected computer networks, the method comprises the steps of:
   a. accessing an offline database having vendor descriptions for a plurality of vendor sites, including vendor sites in different native languages, over inter-connected computer networks, the vendor descriptions having information about each of the plurality of vendor sites that include:
      i. a URL for each of the plurality of vendor sites;
      ii. a search form URL for each of the plurality of vendors;
      iii. description of domains found in each of the plurality of vendor sites;
      iv. generalized rules about how product information is organized on each of the plurality of vendor sites;
      v. samples of price and product information retrieved from the plurality of vendors;
   b. receiving from an online user, in one of the different native languages, a price comparison request for a desired product;
   c. identifying from the vendor descriptions, vendor sites which may have price information relevant to the price comparison request;
   d. constructing search requests for the desired product using the vendor descriptions for each of the identified vendor sites, including the corresponding search form URL;
   e. submitting directly to the identified vendor sites the constructed search requests;
   f. extracting price and product information from search results received in response to the submitted search requests, wherein the extracted price and product information are in the one of the different native languages; and
   g. displaying the extracted price and product information to the user.

2. The method of claim 1 wherein the general rules include delimiters which can uniquely identify the occurrence of price and associated information within each of the plurality of vendors.

3. The method of claim 1 wherein the URLs of the plurality of vendor sites, and the extracted price and product information are stored in a database.

4. The method of claim 3 wherein the URLs of the plurality of vendor sites, and the extracted price and product information which are stored in the database are updated periodically.

5. The method of claim 4 wherein the URLs of the plurality of vendor sites and the extracted price and product information, which are stored in the database, are automatically updated daily.

6. The method of claim 1 wherein each of the plurality of vendor descriptions is specific to a different online store.

7. The method of claim 6 wherein only one vendor description for each different online store is stored in a database.

8. The method of claim 1 wherein the extracting step includes the step of verifying accurate matches in the search results received in response to the submitted search requests with the desired product.

9. The method of claim 1 wherein the displaying step includes the step of displaying price and product information for the desired product only from the vendor site having the best price.

10. The method of claim 1 wherein the displaying step includes the step of displaying price and product information for the desired product in a selectable arrangement.

11. The method of claim 1 wherein the displaying step includes the step of displaying price and product information for the desired product and which has been sorted according to price.

12. The method of claim 1, further includes a step of user authentication comprising a security interface.

13. The method of claim 12, wherein the security interface categorizes users as temporary trial and life members.

14. The method of claim 1, wherein vendors in the plurality of vendor sites are registered or non-registered vendors.

15. The method of claim 1, wherein the vendor descriptions are automatically constructed through an inductive learning method.

16. The method of claim 15, wherein the inductive learning method can work in multilingual environments.

17. The method of claim 15, wherein the inductive learning method is domain independent.

18. The method of claim 15, wherein the inductive learning method operates in multiple domains such as books, electronic products, movies, or other products.

19. The method of claim 15, wherein the inductive learning method uses a small set of training data.

20. The method of claim 19, wherein the training data includes product examples and the URL from online stores.

21. The method of claim 19, wherein the inductive learning method can extract and identify data independent of presentation style of the online store.

22. A method for real-time online search processing over inter-connected computer networks, the method comprises the steps of:
   a. maintaining in an offline database information for a plurality of vendor sites, including vendor sites in different native languages, over inter-connected computer networks, the information includes URLs, search form URLs, description of domains, and vendor descriptions, wherein the vendor descriptions include generalized rules about how product information is organized on each of the vendor sites;
   b. processing parameters for a price comparison request, received from an online user in one of the different native languages, for a desired product using the information maintained in the offline database, including identifying from the vendor descriptions vendor sites which may have price information relevant to the price comparison request;
   c. extracting real-time price and product information from the identified ones of the plurality of vendor sites from information received in response to search requests constructed using the information maintained in the offline data base for each of the identified vendor sites, including a search form URL, and submitted directly to the identified vendor sites, wherein the extracted price and product information are in the one of the different native languages; and
   d. displaying the extracted price and product information to the user.

23. The method of claim 22, wherein the step of receiving a price comparison request further comprises the step of receiving from the user at least one search parameter and an identification of at least one online vendor on said computer network; and further wherein the extracting step includes the steps of
   i. posting a request using the processed parameters to at least one of the plurality of vendors online, in real-time; and
   ii. retrieving data related to the price and product information from search results obtained in response to the posting step;
   iii. sorting the retrieved data by price; and
   iv. displaying processed data for the desired product from at least one of the plurality of vendors.

24. The method of claim 23, wherein the step of receiving a price comparison request is initiated by the online user.

25. The method of claim 23, wherein in the step of posting a request, the processed parameters are the combination of the search parameters and vendor identification received from the user, vendor description for the identified vendor, and the URL of the identified vendor.

26. The method of claim 23, wherein the vendor descriptions maintained in the offline database includes patterns which identify information in vendor sites, and further wherein the step of retrieving data employs the patterns.

27. The method of claim 23, wherein the step of extracting real-time price and product information is domain-independent and language-independent.

28. The method of claim 23, wherein the step of displaying the processed data is based on composing information to be displayed in HTML.

* * * * *

UNITED STATES PATENT AND TRADEMARK OFFICE
CERTIFICATE OF CORRECTION

| | |
|---|---|
| PATENT NO. | : 7,555,448 B2 |
| APPLICATION NO. | : 09/967233 |
| DATED | : June 30, 2009 |
| INVENTOR(S) | : Hsieh |

It is certified that error appears in the above-identified patent and that said Letters Patent is hereby corrected as shown below:

Title page, item (56), under "Other Publications", in Column 2, Line 1, delete "Millennuium" and insert -- Millennium --.

Page 2, item (56), under "Other Publications", in Column 2, Line 2, delete "v6i5pg66," and insert -- vol. 6, iss. 5, p. 66, --.

Page 2, item (56), under "Other Publications", in Column 2, Line 15, delete "v6i9pg49," and insert -- vol. 6, iss. 9, p. 49, --.

Page 2, item (56), under "Other Publications", in Column 2, Line 20, delete "v11i20pg48," and insert -- vol. 11, iss. 20, p. 48, --.

Page 2, item (56), under "Other Publications", in Column 2, Line 22, delete "1998:" and insert -- 1998; --.

Column 40, line 21, in Claim 23, delete "steps of" and insert -- steps of: --.

Signed and Sealed this
Tenth Day of April, 2012

David J. Kappos
*Director of the United States Patent and Trademark Office*